US011986850B2

(12) United States Patent
Schroeder et al.

(10) Patent No.: US 11,986,850 B2
(45) Date of Patent: May 21, 2024

(54) HANDHELD AIRLESS SPRAYER FOR PAINTS AND OTHER COATINGS

(71) Applicant: Graco Minnesota Inc., Minneapolis, MN (US)

(72) Inventors: James C. Schroeder, Ramsey, MN (US); Aaron R. Laho, Big Lake, MN (US); Steve J. Wrobel, Rogers, MN (US); Joshua D. Roden, Blaine, MN (US)

( * ) Notice: Subject to any disclaimer, the term of this patent is extended or adjusted under 35 U.S.C. 154(b) by 135 days.

(21) Appl. No.: 17/046,484

(22) PCT Filed: Apr. 9, 2019

(86) PCT No.: PCT/US2019/026503
§ 371 (c)(1),
(2) Date: Oct. 9, 2020

(87) PCT Pub. No.: WO2019/199760
PCT Pub. Date: Oct. 17, 2019

(65) Prior Publication Data

US 2021/0154691 A1 May 27, 2021

Related U.S. Application Data

(60) Provisional application No. 62/655,700, filed on Apr. 10, 2018.

(51) Int. Cl.
*B05B 9/08* (2006.01)
*B05B 12/00* (2018.01)
(Continued)

(52) U.S. Cl.
CPC .......... *B05B 9/0861* (2013.01); *B05B 12/002* (2013.01); *B05B 12/34* (2018.02);
(Continued)

(58) Field of Classification Search
CPC ....... B05B 9/0861; B05B 15/62; B05B 12/34; B05B 12/002; B05B 13/005; E01C 23/22;
(Continued)

(56) References Cited

U.S. PATENT DOCUMENTS

| | | | |
|---|---|---|---|
| 1,650,377 | A | 11/1927 | Nixon |
| 1,911,603 | A | 5/1933 | Breuer |

(Continued)

FOREIGN PATENT DOCUMENTS

| | | | |
|---|---|---|---|
| CN | 2225310 | Y | 4/1996 |
| CN | 1185525 | A | 6/1998 |

(Continued)

OTHER PUBLICATIONS

Google translation of DE 630 568, Robert Bosch GmbH, Spraying process for paints, varnishes or similar means for surface treatment, May 1936, German Patent DE 630 568. (Year: 1936).*

(Continued)

*Primary Examiner* — Chee-Chong Lee

(57) ABSTRACT

A handheld sprayer (10') includes a fluid module (12') mounted to a drive module (14') at a static connection (16') and a dynamic connection (18'). The static connection (16') supportably attached the fluid module (12') to the drive module (14'). The dynamic connection (18') connects a drive (84) of the drive module (14') to a pump (24') of the fluid module (12') such that the drive (84) can power the pump (24') by the dynamic connection (18'). The fluid contacting components of the handheld sprayer (10') are in the fluid module (12'). The fluid module (12') can be mounted to and dismounted from the drive module (14') by a sliding motion.

22 Claims, 34 Drawing Sheets

(51) Int. Cl.

| | |
|---|---|
| ***B05B 12/34*** | (2018.01) |
| ***B05B 13/00*** | (2006.01) |
| ***B05B 15/62*** | (2018.01) |
| ***E01C 23/22*** | (2006.01) |
| ***F04B 1/146*** | (2020.01) |
| ***F04B 15/02*** | (2006.01) |
| ***F04B 17/03*** | (2006.01) |
| ***F04B 17/06*** | (2006.01) |
| ***F04B 23/02*** | (2006.01) |

(52) U.S. Cl.
CPC ............ *B05B 13/005* (2013.01); *B05B 15/62* (2018.02); *E01C 23/22* (2013.01); *F04B 1/146* (2013.01); *F04B 15/02* (2013.01); *F04B 17/03* (2013.01); *F04B 17/06* (2013.01); *F04B 23/025* (2013.01)

(58) Field of Classification Search
CPC .......... F04B 1/146; F04B 15/02; F04B 17/03; F04B 17/06; F04B 23/025
USPC .......................................................... 239/332
See application file for complete search history.

(56) References Cited

U.S. PATENT DOCUMENTS 2,195,929 A 4/1940 Klett
2,405,006 A 7/1946 Ashton
2,407,792 A 9/1946 McMillan
2,488,789 A 11/1949 Williams
2,491,230 A 12/1949 Theis
2,540,357 A 2/1951 Stanley
2,629,539 A 2/1953 Drewes, Jr.
2,736,606 A 2/1956 Kmiotek
2,752,854 A 7/1956 Prior et al.
2,999,646 A 9/1961 Wagner
3,120,347 A * 2/1964 Duke, Jr. .............. B05B 9/0861 239/332
3,173,584 A * 3/1965 Giavasis ................ A47G 19/32 222/404
3,207,080 A 9/1965 Schlosser
3,250,225 A 5/1966 Taplin
3,255,967 A * 6/1966 Kenney ..................... B05B 1/24 239/351
3,276,389 A 10/1966 Bower, Jr.
3,317,141 A 5/1967 Mann
3,403,818 A 10/1968 Enssle
3,416,461 A 12/1968 McFarland
3,462,082 A 8/1969 Everett
3,633,828 A 1/1972 Larson
3,658,257 A 4/1972 Rood
3,680,789 A 8/1972 Wagner
3,680,981 A 8/1972 Wagner
3,741,689 A 6/1973 Rupp
3,769,879 A 11/1973 Lofquist, Jr.
3,775,030 A 11/1973 Wanner
3,871,557 A 3/1975 Smrt
3,893,627 A 7/1975 Siczek et al.
3,901,449 A * 8/1975 Bochmann ............ B05B 15/652 239/587.2
3,916,449 A 11/1975 Davis
3,955,709 A 5/1976 Coley et al.
3,955,763 A 5/1976 Pyle et al.
3,993,250 A * 11/1976 Shure .................... B05B 9/0861 222/383.2
3,999,896 A 12/1976 Sebastiani
4,008,984 A 2/1977 Scholle
4,033,511 A 7/1977 Chamberlin
4,068,982 A 1/1978 Quarve
4,154,375 A * 5/1979 Bippus ................. H01H 3/0206 200/61.86
4,160,525 A 7/1979 Wagner
4,162,037 A 7/1979 Koyama
4,165,836 A 8/1979 Eull
4,187,959 A * 2/1980 Pelton ................... B05B 9/0866 222/383.2
4,235,377 A 11/1980 Davis et al.
4,294,408 A 10/1981 Snyder et al.
4,301,971 A 11/1981 Cornelius et al.
4,365,745 A 12/1982 Beck
4,386,739 A 6/1983 Kwok
4,403,924 A 9/1983 Gebauer et al.
4,442,977 A 4/1984 Beiswenger et al.
4,484,707 A 11/1984 Calder
4,549,467 A 10/1985 Wilden et al.
4,693,423 A 9/1987 Roe et al.
4,756,481 A 7/1988 Leuenberger
4,778,356 A 10/1988 Hicks
4,800,801 A 1/1989 van Zweeden
4,883,412 A 11/1989 Malizard et al.
4,902,206 A 2/1990 Nakazawa et al.
4,971,249 A 11/1990 Tam et al.
5,051,067 A 9/1991 Terauchi
5,054,947 A 10/1991 Frank et al.
5,066,199 A 11/1991 Reese et al.
5,092,750 A 3/1992 Leroy et al.
5,100,058 A 3/1992 Wei
5,106,274 A 4/1992 Holtzapple
5,137,431 A 8/1992 Kiyoshi et al.
5,145,339 A 9/1992 Lehrke et al.
5,150,841 A 9/1992 Silvenis et al.
5,165,869 A 11/1992 Reynolds
5,174,731 A 12/1992 Korver
5,211,611 A 5/1993 Lammers et al.
5,213,485 A 5/1993 Wilden
5,219,274 A 6/1993 Pawlowski et al.
5,249,932 A 10/1993 Van Bork
5,271,537 A 12/1993 Johnson
5,340,029 A 8/1994 Adams
5,362,212 A 11/1994 Bowen et al.
5,378,122 A 1/1995 Duncan
5,391,058 A 2/1995 Goto et al.
5,443,211 A 8/1995 Young et al.
5,527,160 A 6/1996 Kozumplik, Jr. et al.
5,567,118 A 10/1996 Grgurich et al.
5,616,005 A 4/1997 Whitehead
5,649,809 A 7/1997 Stapelfeldt
5,699,967 A 12/1997 Conatser et al.
5,716,007 A 2/1998 Nottingham et al.
5,769,321 A 6/1998 Cyphers
5,816,778 A 10/1998 Elsey, Jr. et al.
5,839,612 A 11/1998 Burke
5,927,954 A 7/1999 Kennedy et al.
6,106,246 A 8/2000 Steck et al.
6,142,749 A 11/2000 Jack et al.
6,158,982 A 12/2000 Kennedy et al.
6,168,093 B1 1/2001 Greer, Jr. et al.
6,264,115 B1 7/2001 Liska et al.
6,280,149 B1 8/2001 Able et al.
6,299,415 B1 10/2001 Bahrton
6,364,622 B1 4/2002 Lishanski et al.
6,390,386 B2 5/2002 Krohn et al.
6,402,486 B1 6/2002 Steck et al.
6,488,180 B1 12/2002 Bayat
6,599,107 B2 7/2003 Cooper et al.
6,644,564 B2 11/2003 Perkitny
6,669,114 B1 12/2003 Williams et al.
6,702,198 B2 3/2004 Tam et al.
6,708,900 B1 3/2004 Zhu et al.
D490,500 S 5/2004 Ye et al.
6,752,067 B1 6/2004 Davidson et al.
6,752,330 B2 6/2004 DiMaggio et al.
6,811,099 B2 11/2004 Krestine et al.
6,817,544 B2 11/2004 Hanson
6,933,634 B2 8/2005 Frank et al.
6,978,944 B1 12/2005 Carey et al.
7,018,181 B2 3/2006 Cooper et al.
7,025,087 B2 4/2006 Weinberger et al.
7,066,406 B2 6/2006 Williams et al.
7,097,119 B2 8/2006 Hornsby et al.
7,182,280 B2 2/2007 Ye et al.
7,207,500 B2 4/2007 Hudson et al.
7,219,848 B2 5/2007 Sweeton

(56) References Cited

U.S. PATENT DOCUMENTS

| | | | |
|---|---|---|---|
| 7,244,464 | B2 | 7/2007 | Robens et al. |
| 7,255,294 | B2 | 8/2007 | Sweeton et al. |
| 7,350,723 | B2 | 4/2008 | Reedy |
| 7,354,255 | B1 | 4/2008 | Lishanski et al. |
| 7,399,168 | B1 | 7/2008 | Eberwein |
| 7,451,900 | B2 | 11/2008 | Hornsby et al. |
| 7,478,979 | B2 | 1/2009 | Zhou et al. |
| 7,517,199 | B2 | 4/2009 | Reed et al. |
| 7,600,985 | B2 | 10/2009 | Meloche et al. |
| 7,624,898 | B2 | 12/2009 | Hornsby et al. |
| 7,654,801 | B2 | 2/2010 | Spude |
| 7,658,598 | B2 | 2/2010 | Reed et al. |
| 7,708,084 | B2 | 5/2010 | Duesselberg et al. |
| 7,731,105 | B2 | 6/2010 | Lishanski et al. |
| 7,758,321 | B2 | 7/2010 | Fukano et al. |
| 7,891,588 | B2 | 2/2011 | Jones et al. |
| 8,123,500 | B2 | 2/2012 | Juterbock et al. |
| 8,167,586 | B2 | 5/2012 | Towne |
| 8,182,247 | B2 | 5/2012 | Gallwey et al. |
| 8,267,332 | B1 | 9/2012 | Jones et al. |
| 8,292,600 | B2 | 10/2012 | Reed et al. |
| 8,313,313 | B2 | 11/2012 | Juterbock et al. |
| 8,382,445 | B2 | 2/2013 | Roseberry |
| 8,393,881 | B2 | 3/2013 | Usui et al. |
| 8,413,911 | B2 | 4/2013 | Munn |
| 8,485,792 | B2 | 7/2013 | McCourt et al. |
| 8,550,376 | B2 | 10/2013 | Munn et al. |
| 8,585,372 | B2 | 11/2013 | Bacher et al. |
| 8,628,029 | B2 | 1/2014 | Munn et al. |
| 8,740,111 | B2 | 6/2014 | Munn et al. |
| 8,746,597 | B2 | 6/2014 | Sides |
| 8,944,348 | B2 | 2/2015 | Zhou et al. |
| 9,192,949 | B2 | 11/2015 | Lang et al. |
| 9,604,236 | B2 | 3/2017 | Sandahl et al. |
| 10,322,424 | B2 | 6/2019 | Wright |
| 10,589,298 | B2 | 3/2020 | Wright |
| 2001/0035515 | A1 | 11/2001 | Kennedy et al. |
| 2001/0038041 | A1 | 11/2001 | Leer et al. |
| 2001/0048882 | A1 | 12/2001 | Layman |
| 2002/0028103 | A1 | 3/2002 | Frank et al. |
| 2002/0166905 | A1 | 11/2002 | Huang |
| 2003/0173420 | A1 | 9/2003 | Hanson |
| 2004/0057853 | A1 | 3/2004 | Ross et al. |
| 2004/0069791 | A1 | 4/2004 | Neal |
| 2004/0155118 | A1 | 8/2004 | Rice |
| 2004/0217205 | A1 | 11/2004 | Kohs et al. |
| 2004/0226969 | A1 | 11/2004 | Shew |
| 2004/0251321 | A1 | 12/2004 | Ye et al. |
| 2004/0256490 | A1 | 12/2004 | Sweeton |
| 2005/0016448 | A1 | 1/2005 | Dilou |
| 2005/0189445 | A1 | 9/2005 | Hartle et al. |
| 2006/0040044 | A1 | 2/2006 | Robens et al. |
| 2006/0076434 | A1 | 4/2006 | Hornsby et al. |
| 2006/0086824 | A1 | 4/2006 | Pearce, III et al. |
| 2006/0108981 | A1 | 5/2006 | Watson et al. |
| 2006/0153707 | A1 | 7/2006 | Sweeton et al. |
| 2006/0208005 | A1 | 9/2006 | Sweeton |
| 2006/0257271 | A1 | 11/2006 | Juterbock et al. |
| 2007/0025863 | A1 | 2/2007 | Liedtke et al. |
| 2007/0092385 | A1 | 4/2007 | Petrie Pe |
| 2007/0125878 | A1 | 6/2007 | Hahn et al. |
| 2007/0129469 | A1 | 6/2007 | Befurt et al. |
| 2007/0131109 | A1 | 6/2007 | Bruggeman et al. |
| 2007/0134050 | A1 | 6/2007 | Bruggeman et al. |
| 2007/0137938 | A1 | 6/2007 | Carpenter et al. |
| 2007/0170285 | A1 | 7/2007 | Schouten |
| 2007/0212241 | A1 | 9/2007 | Lishanski et al. |
| 2007/0224358 | A1 | 9/2007 | Insausti-Eciolaza et al. |
| 2007/0228186 | A1 | 10/2007 | Hornsby et al. |
| 2007/0252019 | A1 | 11/2007 | Peterson et al. |
| 2007/0261913 | A1 | 11/2007 | Rossner et al. |
| 2007/0272707 | A1 | 11/2007 | Peralta et al. |
| 2007/0278326 | A1 | 12/2007 | Wu |
| 2007/0278787 | A1 | 12/2007 | Jones et al. |
| 2008/0065001 | A1 | 3/2008 | DiNucci et al. |
| 2008/0104780 | A1 | 5/2008 | Dayton et al. |
| 2008/0173705 | A1 | 7/2008 | Girard et al. |
| 2009/0068036 | A1 | 3/2009 | Hsu et al. |
| 2009/0145980 | A1 | 6/2009 | Jones |
| 2009/0152382 | A1 | 6/2009 | Charpie |
| 2009/0321670 | A1 | 12/2009 | Huang |
| 2010/0045096 | A1 | 2/2010 | Schonlau et al. |
| 2010/0072300 | A1 | 3/2010 | Miller et al. |
| 2010/0196176 | A1 | 8/2010 | Kaufmann et al. |
| 2011/0198413 | A1 | 8/2011 | Thompson et al. |
| 2012/0037726 | A1 | 2/2012 | Johnson et al. |
| 2012/0063925 | A1 | 3/2012 | Parker |
| 2012/0227389 | A1 | 9/2012 | Hinderks |
| 2012/0243630 | A1 | 9/2012 | Golovins |
| 2012/0298771 | A1 | 11/2012 | Johnson et al. |
| 2013/0101445 | A1 | 4/2013 | Schutze |
| 2015/0226205 | A1 | 8/2015 | Hines et al. |
| 2015/0226206 | A1 | 8/2015 | Hines et al. |
| 2015/0352570 | A1 | 12/2015 | Lins et al. |
| 2016/0074888 | A1 | 3/2016 | Lang et al. |
| 2016/0243570 | A1 | 8/2016 | Lampe et al. |
| 2016/0263600 | A1 | 9/2016 | Luczak |
| 2017/0173607 | A1 | 6/2017 | Wright |
| 2017/0291181 | A1 | 10/2017 | Wright |
| 2018/0085765 | A1 | 3/2018 | Wright |
| 2019/0060922 | A1 | 2/2019 | Wright |
| 2019/0201927 | A1 | 7/2019 | Sides |
| 2020/0121867 | A1 | 4/2020 | Wright |

FOREIGN PATENT DOCUMENTS

| | | | | |
|---|---|---|---|---|
| CN | 1974282 | A | 6/2007 | |
| CN | 2912820 | Y | 6/2007 | |
| CN | 101022891 | A | 8/2007 | |
| CN | 101049587 | A | 10/2007 | |
| CN | 200998701 | Y | 1/2008 | |
| CN | 201101999 | Y | 8/2008 | |
| CN | 101273198 | A | 9/2008 | |
| CN | 201205534 | Y | 3/2009 | |
| CN | 102066710 | A | 5/2011 | |
| CN | 103180050 | A | 6/2013 | |
| CN | 104619426 | A | 5/2015 | |
| DE | 630 568 | * | 5/1936 | ........... B05B 9/0861 |
| DE | 630568 | C | 5/1936 | |
| DE | 2433841 | A1 | 2/1976 | |
| DE | 10315483 | A1 | 11/2004 | |
| EP | 0312862 | A2 | 4/1989 | |
| EP | 0714709 | A1 | 6/1996 | |
| EP | 0781922 | A1 | 7/1997 | |
| EP | 1479448 | A2 | 11/2004 | |
| EP | 1627689 | A1 | 2/2006 | |
| EP | 2168686 | A2 | 3/2010 | |
| EP | 2594337 | A1 | 5/2013 | |
| FR | 2307983 | A1 | 11/1976 | |
| GB | 1576075 | | 10/1980 | |
| GB | 2302254 | A | 1/1997 | |
| GR | 1005628 | B | 9/2007 | |
| JP | S31010693 | A | 12/1956 | |
| JP | S5138325 | A | 3/1976 | |
| JP | S57131866 | U | 8/1982 | |
| JP | S57200678 | A | 12/1982 | |
| JP | S60178368 | A | 9/1985 | |
| JP | S6183474 | U | 6/1986 | |
| JP | S61255280 | A | 11/1986 | |
| JP | S6259989 | B2 | 12/1987 | |
| JP | S63100963 | A | 5/1988 | |
| JP | S6421769 | U | 2/1989 | |
| JP | H01148356 | A | 6/1989 | |
| JP | H02500459 | A | 2/1990 | |
| JP | H02196173 | A | 8/1990 | |
| JP | 4346862 | A | 12/1992 | |
| JP | 194997 | A | 8/1995 | |
| JP | H10290942 | A | 11/1998 | |
| JP | 2001506720 | A | 5/2001 | |
| JP | 2004261720 | A | 9/2004 | |
| JP | 2005324089 | A | 11/2005 | |
| JP | 2007222787 | A | 9/2007 | |
| JP | 2007330750 | A | 12/2007 | |
| JP | 2008246404 | A | 10/2008 | |

(56) References Cited

FOREIGN PATENT DOCUMENTS

| | | | |
|---|---|---|---|
| JP | 2012506316 | A | 3/2012 |
| KR | 1019970700134 | A | 1/1997 |
| KR | 102110089287 | A | 8/2011 |
| TW | 454575 | U | 9/2001 |
| WO | WO2007079932 | A1 | 7/2007 |
| WO | WO2011094246 | A1 | 8/2011 |
| WO | WO2014120732 | A1 | 8/2014 |
| WO | 2016179015 | A1 | 11/2016 |
| WO | WO2017112781 | A1 | 6/2017 |
| WO | WO2017206933 | A1 | 12/2017 |

OTHER PUBLICATIONS

International Search Report and Written Opinion for PCT Application No. PCT/US2019/026503, dated Jul. 1, 2019, pp. 21.
First Chinese Office Action for CN Application No. 2019800384799, dated Sep. 23, 2021, pp. 36.
First Communication Pursuant to Article 94(3) EPC for EP Application No. 19720242.7, dated Jun. 9, 2022, pp. 7.
International Preliminary Report on Patentability for PCT Application No. PCT/US2019/026503, dated Oct. 22, 2020, pp. 15.
Second Chinese Office Action for CN Application No. 201980038479.9, dated Apr. 6, 2022, pp. 31.
Second Communication Pursuant to Article 94(3) EPC for EP Application No. 19720242.7, dated Feb. 9, 2023, pp. 6.

* cited by examiner

HANDHELD AIRLESS SPRAYER FOR PAINTS AND OTHER COATINGS

CROSS-REFERENCE TO RELATED APPLICATION(S)

This application claims the benefit of U.S. Provisional Application No. 62/655,700 filed Apr. 10, 2018, and entitled "Handheld Airless Sprayer for Paints and Other Coatings" by J. Schroeder, A. Laho, S. Wrobel, and J. Roden, the disclosure of which is hereby incorporated by reference in its entirety.

BACKGROUND

This disclosure is related to fluid sprayers. More specifically, this disclosure is related to handheld airless sprayers for applying paints and other coatings.

Handheld sprayers can be utilized to apply paints and other fluids to various surfaces. For example, handheld sprayers can apply paints, water, oils, stains, finishes, aggregate, coatings, and solvents, among other fluid options; onto structures, walls, ceilings, roofs, floors, vehicles, grounds, and various assemblies, amongst other surface options. Handheld sprayers provide a high quality finish amongst common sprayer systems, as handheld sprayers can finely atomize liquid paint and spray the paint through small, shaped orifices. In some examples, handheld sprayers can pressurize liquid paint to upwards of 3,000 psi [pounds per square inch] (~20.7 MPa) to spray the paint.

Some applications can require the user to utilize multiple fluid types (e.g., different colors and/or oil based vs. water based). The user can flush the fluid passages of the handheld spryer to facilitate fluid changes. In some examples, a spray job can require multiple fluid changes in a short time period, such as ground marking applications that require multiple color changes to complete one spray job. Wear components of the handheld sprayer can also require maintenance and replacement, during which time the handheld sprayer is out of service.

SUMMARY

According to one aspect of the disclosure, a handheld sprayer includes a fluid module comprising a fluid reservoir and a pump that pumps fluid from the fluid reservoir for spraying; and a drive module comprising a motor, a handle, and a trigger, the drive module removably connected to the fluid module by a static connection and a dynamic connection, the static connection fixing the fluid module to the drive module, the drive module powering the pump of the fluid module by mechanical motion conveyed from the drive module to fluid module through the dynamic connection.

According to another aspect of the disclosure, a fluid module for a handheld fluid sprayer configured to be powered by a drive module of the handheld fluid sprayer includes a fluid supply; a pump housing; a pump supported by the pump housing, the pump configured to draw fluid from the fluid supply and pump the fluid, the pump including a piston at least partially disposed in the pump housing and configured to reciprocate relative to the pump housing; a fluid module static connector configured to mount the pump housing to the drive module; and a fluid module dynamic connector configured to convey mechanical motion from the drive module to the fluid module to drive the pump. The fluid supply, the pump housing, the pump, the fluid module static connector, and the fluid module dynamic connector are connected together. The fluid module is configured to mount to the drive module by a static connection and a dynamic connection. The fluid module can be mounted to the drive module by connecting the fluid module static connector and the fluid module dynamic connector to the drive module. The fluid module can be dismounted from the drive module by disconnecting the fluid module static connector and the fluid module dynamic connector from the drive module.

According to yet another aspect of the disclosure, a fluid module for a handheld fluid sprayer is configured to be powered by a drive module of the handheld fluid sprayer and is removably connected to the drive module at a static connection and a dynamic connection. The fluid module includes a pump housing and a pump supported by the pump housing. The pump housing is configured to receive fluid from a fluid supply and to output the fluid. The pump is configured to draw fluid from the fluid supply and pump the fluid through the pump housing, the pump includes a piston at least partially disposed in the pump housing and that is configured to reciprocate relative to the pump housing. The pump housing is configured to connect to the drive module by the static connection, and the pump is configured to connect to the drive module by the dynamic connection.

According to yet another aspect of the disclosure, a handheld sprayer includes a fluid module configured to pressurize and spray fluid; and a drive module removably connected to the fluid module by a static connection and a dynamic connection, the drive module powering the fluid module by the dynamic connection.

According to yet another aspect of the disclosure, a method includes mounting a fluid module to a drive module by sliding the fluid module onto the drive module to thereby engage a static connection between a pump housing of the fluid module and a drive housing of the drive module and engage a dynamic connection between a pump of the fluid module and a drive assembly of the drive module; and dismounting the fluid module by sliding the fluid module off of the drive module.

According to yet another aspect of the disclosure, a wheeled ground striping system includes a wheeled cart and a handheld sprayer mountable and removable from the cart.

DETAILED DESCRIPTION

Figure 1:
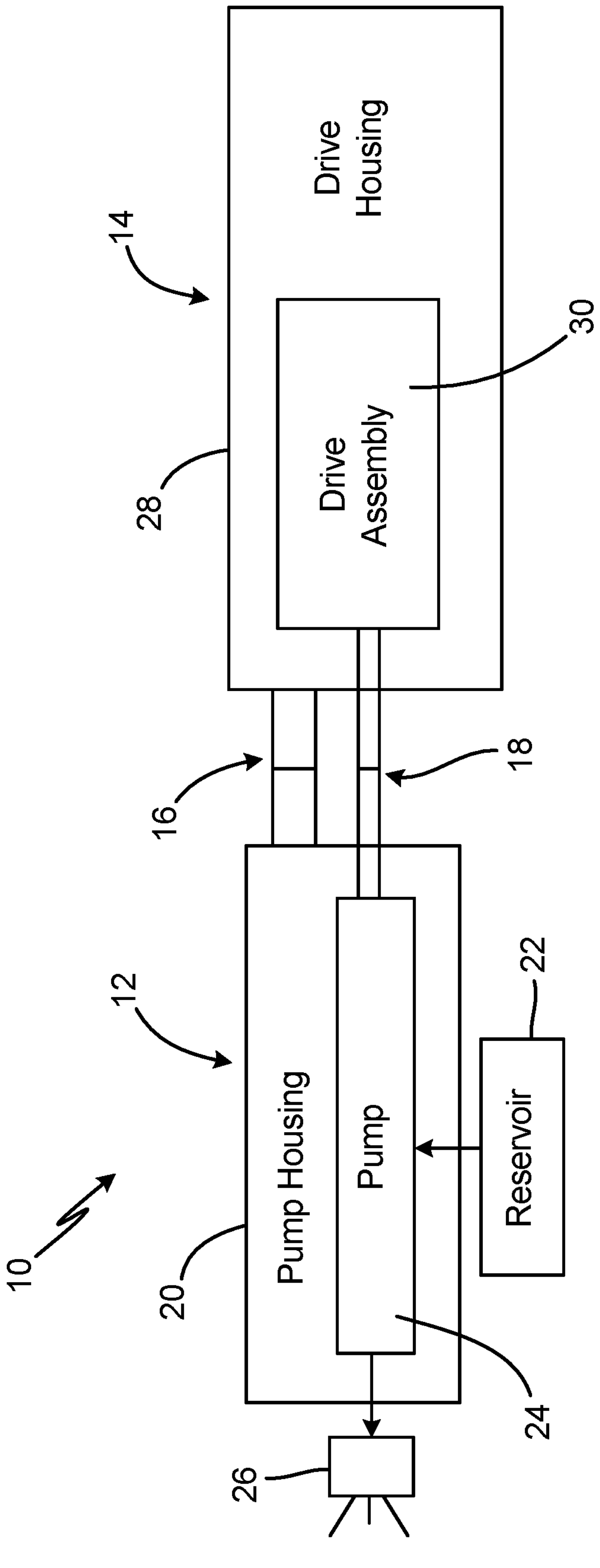
FIG. 1 is a schematic block diagram of a handheld sprayer.

FIG. 1 is a schematic block diagram of handheld sprayer 10. Handheld sprayer 10 includes fluid module 12 and drive module 14. Fluid module 12 is connected to drive module 14 by static connection 16 and dynamic connection 18. Fluid module 12 includes pump housing 20, reservoir 22, pump 24, and spray tip 26. Drive module 14 includes drive housing 28 and drive assembly 30.

Handheld sprayer 10 spray various fluids, examples of which include paint, water, oil, stains, finishes, aggregate, coatings, and solvents, among other options, onto a surface. In some examples, handheld sprayer 10 is configured to generate high pressures for spraying on various surfaces, such as structures, walls, ceilings, roofs, floors, vehicles, and various assemblies, amongst other options. In some examples, handheld sprayer 10 is configured to spray on the ground for ground marking, such as utility marking.

Handheld sprayer 10 is configured to apply paints and other fluids to various surfaces. For example, handheld sprayers can apply paints, water, oils, stains, finishes, aggregate, coatings, and solvents, among other fluid options; onto structures, walls, ceilings, roofs, floors, vehicles, grounds, and various assemblies, amongst other surface options. In some examples, handheld sprayer 10 can pressurize liquid paint to upwards of 3,000 pounds per square inch (psi) (~20.7 MPa) to spray the paint.

Some applications can require the user to utilize multiple fluid types (e.g., different colors and/or oil based vs. water based). The user can flush the fluid passages of the handheld spryer to facilitate fluid changes. In some examples, a spray job can require multiple fluid changes in a short time period, such as ground marking applications that require multiple color changes to complete one spray job. Wear components of the handheld sprayer can also require maintenance and replacement, during which time the handheld sprayer is out of service.

Fluid module 12 is connected to drive module 14 by each of static connection 16 and dynamic connection 18. Static connection 16 connects pump housing 20 to drive housing 28 in a static manner. Drive housing 28 is configured to be held and manipulated by the user during spraying, and drive housing 28 supports pump housing 20, and thus other components of fluid module 12, via static connection 16. For example, static connection 16 can be formed by a fitting mounted in a slot, can include snaps connecting with slots, and/or can be of any other desired configuration suitable for securing fluid module 12 to drive module 14. The components forming static connection 16 can be formed on either one of pump housing 20 and drive housing 28. The portion of static connection 16 forming part of fluid module 12 can be referred to as the fluid module static connector, and the portion of dynamic connection 18 forming part of fluid module 12 can be referred to as the fluid module dynamic connector. Similarly the portion of static connection 16 forming part of drive module 14 can be referred to as the drive module static connector, and the portion of dynamic connection 18 forming part of drive module 12 can be referred to as the drive module dynamic connector.

Dynamic connection 18 connects drive assembly 30 to pump 24. Drive assembly 30 transmits power to pump 24 via dynamic connection 18 to drive pump 24. Dynamic connection 18 is a connection between moving parts of drive assembly 30 and pump 24. For example, dynamic connection 18 can be a connection between a reciprocating drive of drive assembly 30 and a piston of pump 24. In some examples, drive assembly 30 includes a motor configured to generate a rotary output and a drive mechanism configured to convert the rotary output of the motor into linear reciprocating motion. Dynamic connection 18 can provide the linear reciprocating motion to pump 24 to drive the piston of pump 24. In other examples, drive assembly 30 generates a rotary output and fluid module 12 includes each of the drive mechanism for converting the rotary output to linear reciprocating motion. As such, dynamic connection 18 can be a rotary connection or a linear reciprocating connection.

Pump 24 is a positive displacement pump. In some examples, pump 24 is an airless pump. For example, pump 24 can include a single piston or more than one piston. In some examples, dynamic connection 18 includes multiple dynamic connections between each of the more than one piston and drive assembly 30. In other examples where pump 24 includes more than one piston, dynamic connection 18 can be between one piston and drive assembly 30. The one piston can be linked to the other pistons in any desired manner. For example, pump 24 can include multiple pistons disposed in plane with each other, with one of the multiple pistons connected to drive assembly 30. The other piston(s) can be connected to the piston forming part of dynamic connection 18 by mechanical linkages such that the other piston(s) are driven by movement of the piston forming part of the dynamic connection 18. In some examples, the multiple pistons are linked such that the multiple pistons reciprocate out of phase with each other. In one example, pump 24 includes three pistons.

Each of static connection 16 and dynamic connection 18 are configured to be simultaneously made. For example, fluid module 12 can be installed on drive module 14 by a simple sliding motion, as discussed further herein. Pump housing 20 can be slid onto drive module 14 from a front of drive module 14, from a side of drive module 14, from a top of drive module 14, or from a bottom of drive module 14. As such, pump housing 20 can be shifted onto drive module 14 horizontally or vertically. Sliding fluid module 12 onto drive module 14 engages each of static connection 16 and dynamic connection 18.

Drive module 14 includes the driving elements of handheld sprayer 10. The fluid within reservoir 22 does not flow within or through any components of drive module 14. As such, drive module 14 can also be referred to as the dry portion of handheld sprayer 10. Drive assembly 30 is disposed in drive housing 28. Drive assembly 30 can be of any suitable configuration for powering pump 24, such as an electric motor or a motor and mechanical drive for converting rotational motion to linear reciprocating motion, among other options. Drive assembly 30 can therefore include a motor configured to generate a rotational output, and the rotational output of the motor can be converted into linear reciprocating motion of a component of pump 24, such as a piston. In some examples, the rotational to linear conversion is accomplished in drive module 14, such that dynamic connection 18 is a linear, reciprocating connection. In other examples, the rotational to linear conversion is accomplished in fluid module 12, such that dynamic connection 18 is a rotary connection.

Fluid module 12 includes all components of handheld sprayer 10 contacted by the fluid. As such, fluid module 12 can also be referred to as the wet portion of handheld sprayer 10. Pump 24 is disposed in pump housing 20. Reservoir 22 is mounted to pump housing 20 and is configured to store a supply of fluid for spraying. Spray tip 26 is disposed downstream of pump 24 and is configured to spray the fluid pumped by pump 24. Spray tip 26 can include a nozzle configured to generate a spray pattern of the fluid prior to the fluid being applied to a desired surface. Pump 24 is configured to draw fluid from reservoir 22, pressurize the fluid, and drive the fluid downstream to spray tip 26.

Fluid module 12 is connected to drive module 14 by making each of dynamic connection 18 and static connection 16. As discussed further herein, handheld sprayer 10 is configured such that each of dynamic connection 18 and static connection 16 can be made by a single motion, as discussed further herein.

The user can also break each of static connection 16 and dynamic connection 18 by simply pulling fluid module 12 off of drive module 14. In some examples, static connection 16 can be locked by a locking mechanism, such as a clamp, detent, clasp, door, or other locking mechanism. Locking static connection 16 ensures that static connection 16 is maintained throughout the spraying process. To remove fluid module 12 from drive module 14, the user shifts the locking mechanism to an unlocked state and simply reverses the movement that installed fluid module 12 on drive module 14. For example, where fluid module 12 is installed by axial movement from front to back, then fluid module 12 is uninstalled by axial movement from back to front.

Static connection 16 and dynamic connection 18 can be the only two connections between fluid module 12 and drive module 14. Attaching fluid module 12 to drive module 14 by dynamic connection 18 and static connection 16 provides significant advantages. Fluid module 12 can be attached to and detached from drive module 14 by simply movements to engage or disengage each of static connection 16 and dynamic connection 18. As such, the user can utilize multiple fluid modules 12 with a single drive module 14, providing increased efficiency and less down time during spraying. For example, the user can have multiple fluid modules 12 each holding a different color and/or type of paint. Instead of flushing the fluid module 12 to utilize a different paint color/type, the user can simply attach a new fluid module 12 to drive module 14 and can continue spraying.

Moreover, the modularity of fluid module 12 also facilitates fast repairs of the wear parts of handheld sprayer 10. Paint and other fluids can be particularly abrasive on components, particularly pump 24. Therefore the components of fluid module 12, such as pump 24, that are exposed to paint wear and fail faster than components that are not exposed to paint. A user can keep a spare fluid module 12 and if the original fluid module 12 fails, then the original fluid module 12 can be removed from drive module 14 and the spare fluid module 12 can be mounted to drive module 14. The user has thereby replaced the wear components of handheld sprayer 10 and can continue operating handheld sprayer 10. As such, the user can replace all of the wear parts by breaking static connection 16, pulling fluid module 12 off of drive module 14, and attaching a new fluid module 12 to drive module 14.

In some cases, different fluid modules 12 can be configured differently for different spray performance. For example, a pump 24 in one fluid module 12 can have a different displacement from a pump 24 in a different fluid module 12. When higher spray volume output is desired, the fluid module 12 with the high displacement pump 24 can be mounted to drive module 14. The fluid module 12 having the smaller displacement pump 24 can then be mounted to drive module 14 for higher spray pressure and/or efficiency.

Figure 2A:
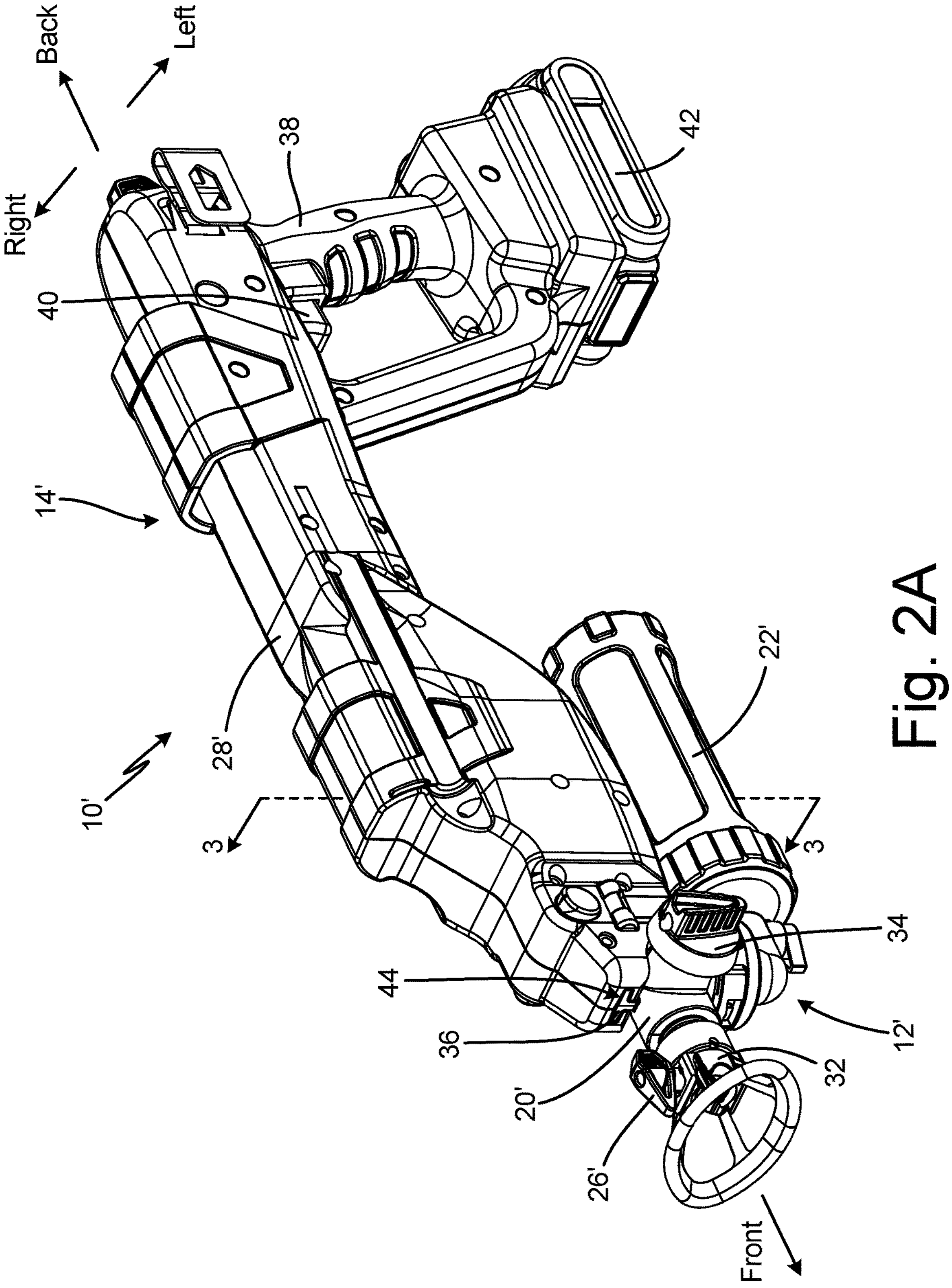
FIG. 2A is an isometric view of a handheld sprayer.
Figure 2B:
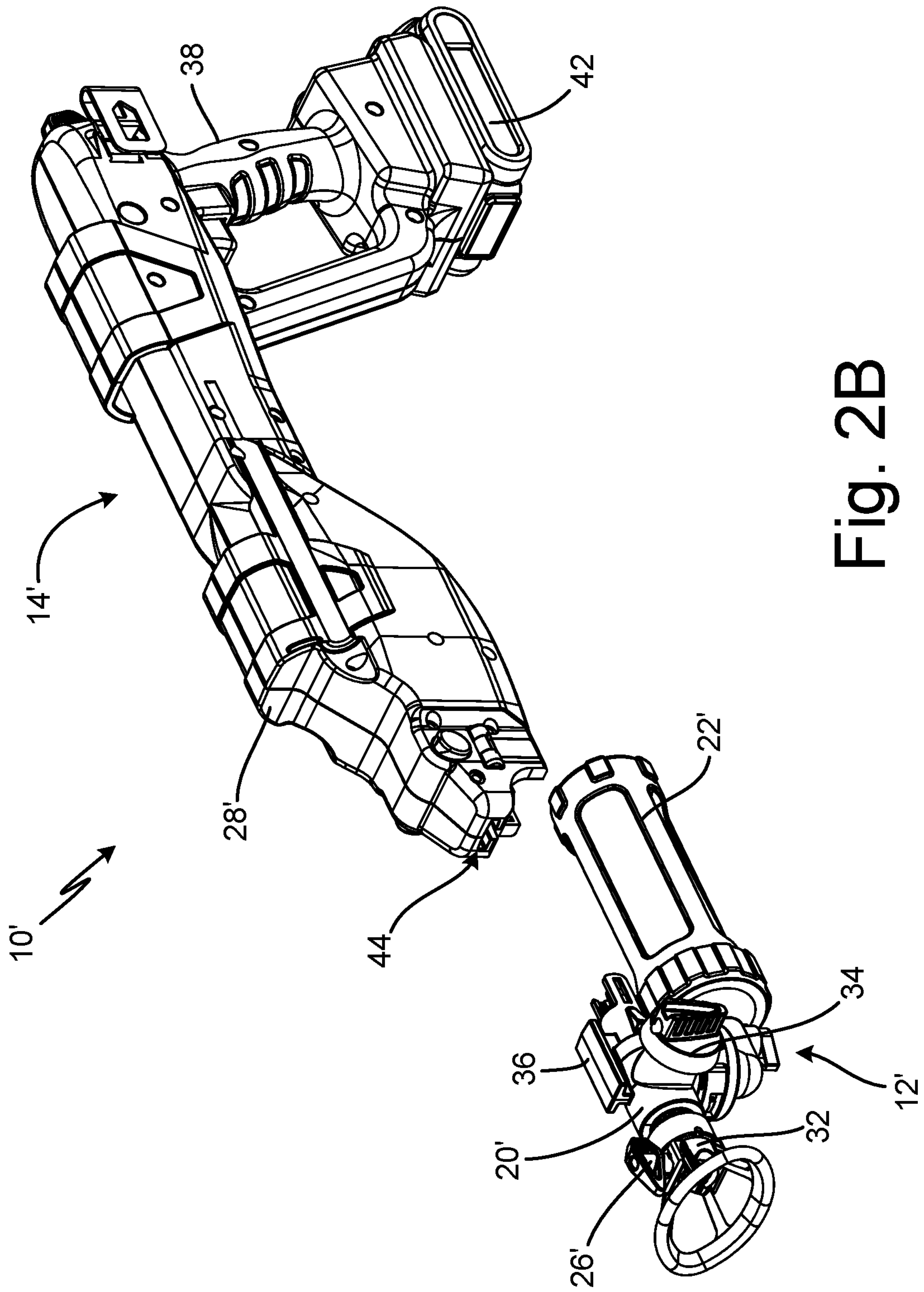
FIG. 2B is an exploded view of a handheld sprayer.

FIG. 2A is an isometric view of handheld sprayer 10'. FIG. 2B is an exploded view of handheld sprayer 10'. Handheld sprayer 10' includes fluid module 12' and drive module 14'. Fluid module 12' includes pump housing 20', reservoir 22', spray tip 26', tip housing 32, and priming valve 34. Pump housing 20' includes fitting 36. Drive module 14' includes drive housing 28', handle 38, trigger 40, and power source 42. Drive housing 28' includes slot 44. Fitting 36 and slot 44 can form a static connection 16 (FIG. 1).

Handheld sprayer 10' can be used for spraying paint on various surfaces. While the particular handheld sprayer 10' shown is particularly well-suited for spraying paint on the ground, such as for utility marking, this and other sprayers herein can be used for spraying surfaces, structures, walls, ceilings, roofs, floors, vehicles, and various assemblies, amongst other options. Directions, such as front (or forward), back (or rear or backwards), up (or top), down (or bottom), left, and right are indicated. Left and right directions can be along a lateral axis. Up and down directions can be along a vertical axis. Front and back directions can be along a horizontal axis. Fluid is ejected axially along spray axis A-A through spray tip 26'. As such, the horizontal axis can also be referred to as the spray axis.

Fluid module 12' is detachable from drive module 14'. Fluid module 12' contains the fluid storing and routing components of handheld sprayer 10'. Drive module 14' contains the power components of handheld sprayer 10'.

Pump housing 20' is mounted to drive housing 28' to secure fluid module 12' to drive module 14'. Fitting 36 projects from the top of pump housing 20'. Slot 44 is formed in drive housing 28'. Fitting 36 is configured to slide into slot 44 to form static connection 16' between fluid module 12' and drive module 14'. Fitting 36 can be referred to as the fluid module static connector, and slot 44 can be referred to as the drive module static connector.

Reservoir 22' is configured to store a supply of fluid for spraying. Reservoir 22' is mounted to pump housing 20'. Priming valve 34 is mounted to pump housing 20' and is configured to facilitate priming of pump 24' (FIG. 1) prior to spraying. Tip housing 32 is supported by pump housing 20'. Spray tip 26' is disposed in tip housing 32. Spray tip 26' is configured to generate a spray of fluid as the fluid exits fluid module 12'.

Drive housing 28' contains various components of drive module 14', such as drive assembly 30' (FIG. 1). While drive housing 28' is shown as elongate, it is understood that drive housing 28' can of any desired configuration depending on the spray task. For example, an elongate drive housing 28' is useful for ground marking. A more compact drive housing 28' is useful for spraying on walls or other structures.

Handle 38 is configured to be grasped by the user during spraying. Handle 38 can be grasped by a single hand of the user to manipulate handheld sprayer 10' during spraying. In some examples, handle 38 can be integrally formed with drive housing 28'. It is understood, however, that handle 38 can be separately formed and attached to drive housing 28'. Trigger 40 projects from handle 38. The user actuates trigger 40 to control spraying by handheld sprayer 10'. Power source 42 is mounted to drive housing 28' and is configured to provide electric power to components of handheld sprayer 10'.

Fluid module 12' can be mounted to drive module 14' by aligning fitting 36 with slot 44 and shifting fluid module 12' axially onto drive housing. Fitting 36 slides into slot 44 and can be secured within slot by a locking mechanism. Fluid module 12' can then be easily dismounted from drive module 14' by sliding fluid module 12' in the direction opposite the mounting direction. In the example shown, fitting 36 is a T-shaped projection and slot 44 is a correspondingly-shaped slot configured to receiver fitting 36. It is understood, however, that fitting 36 can slot 44 can have any desired configuration suitable for securing fluid module 12' to drive module 14'. In some examples, fitting 36 projects from drive housing 28' and slot 44 is formed in pump housing 20'.

Figure 3A:
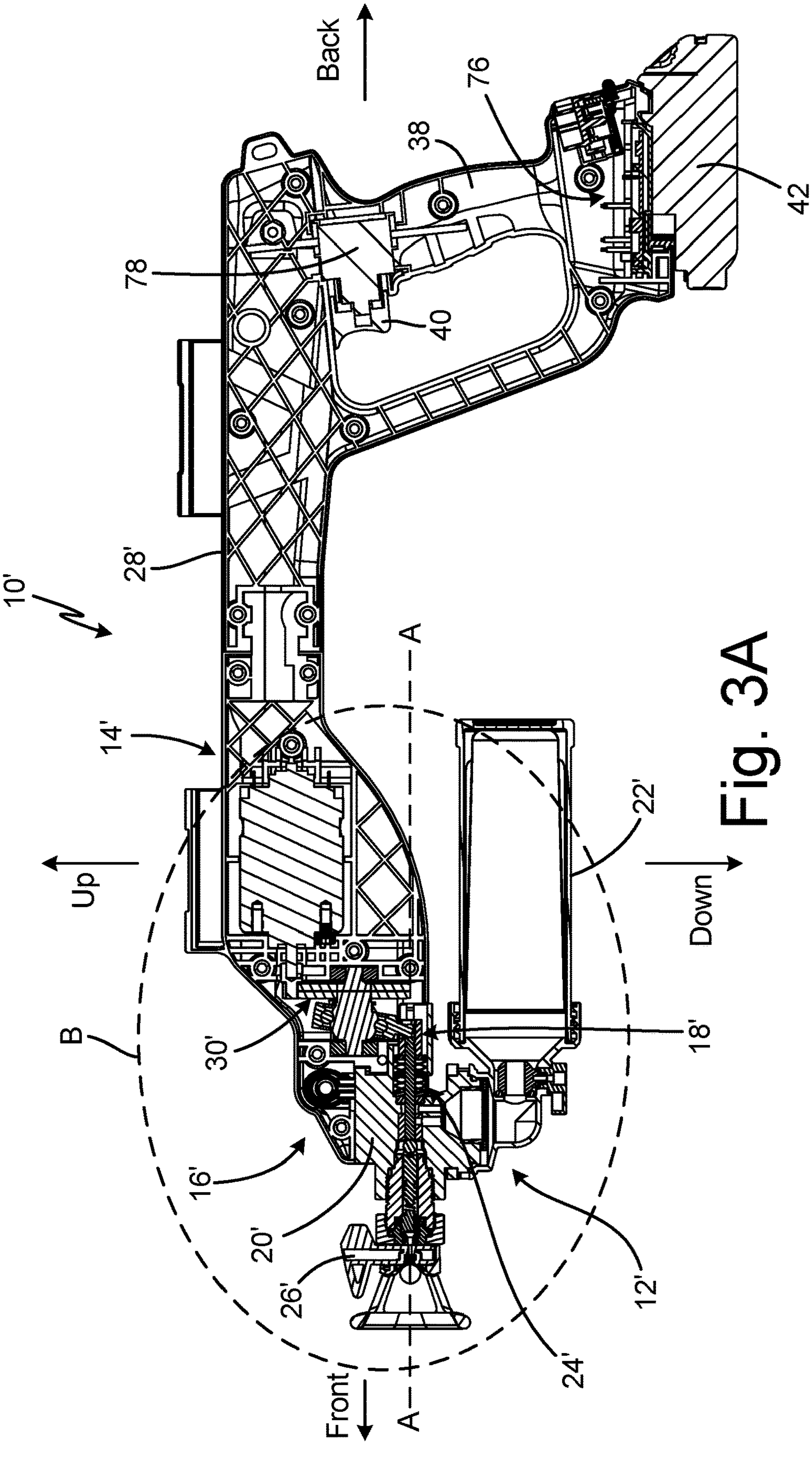
FIG. 3A is a cross-sectional view of the handheld sprayer of FIG. 2A taken along line 3-3 in FIG. 2A.
Figure 3B:
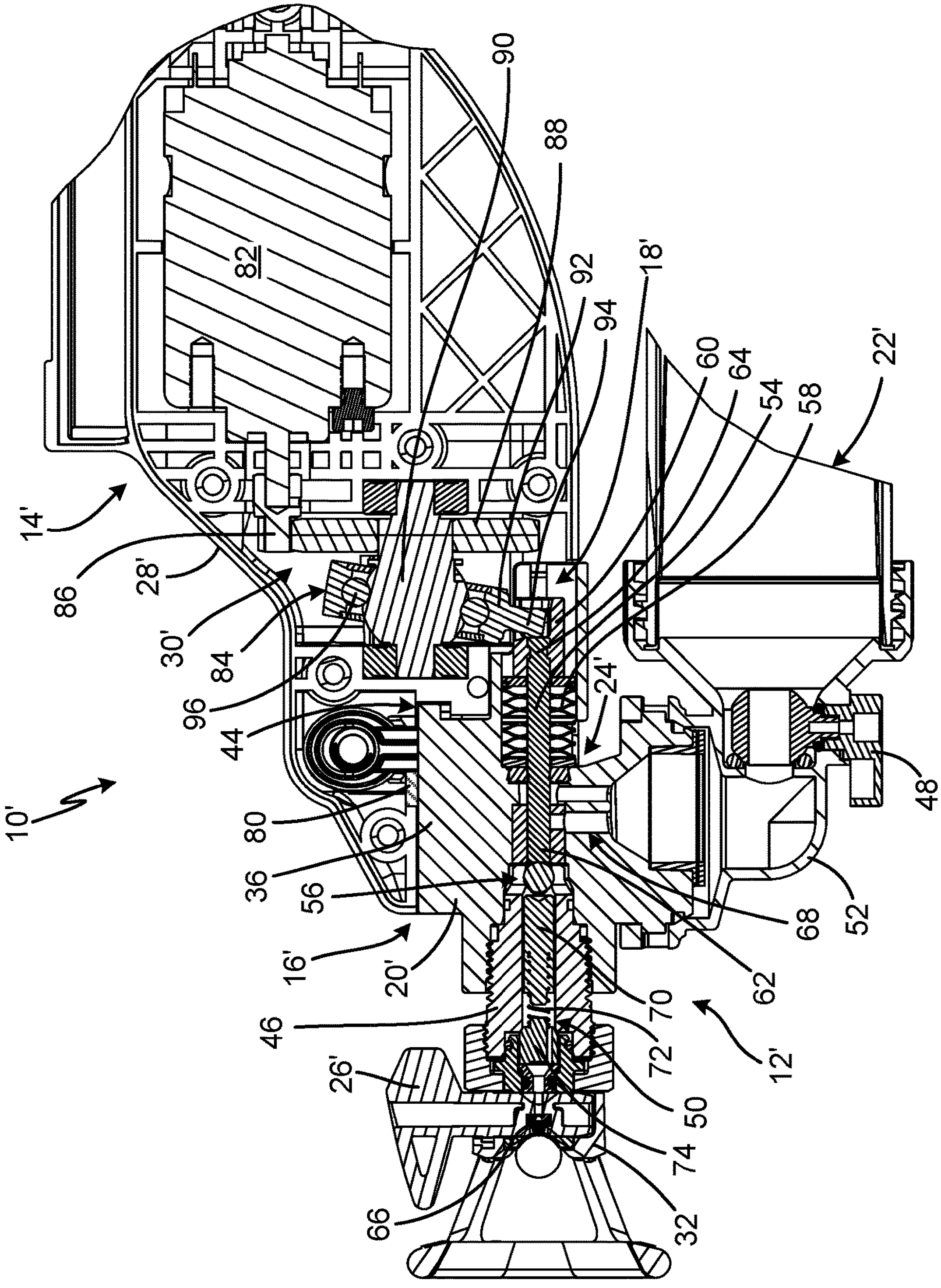
FIG. 3B is an enlarged view of detail B in FIG. 3A.

FIG. 3A is a cross-sectional view of handheld sprayer 10' taken along line 3-3 in FIG. 2A. FIG. 3B is an enlarged view of detail B in FIG. 3A. FIGS. 3A and 3B will be discussed together. Handheld sprayer 10' includes fluid module 12', drive module 14', static connection 16', and dynamic connection 18'. Fluid module 12' includes pump housing 20', reservoir 22', pump 24', spray tip 26', tip housing 32, valve housing 46, reservoir valve 48, spray valve 50, and elbow connector 52. Pump 24' includes piston 54, check valve 56, return spring 58, and receiver 60. Piston 54 includes first end 62 and second end 64. Spray tip 26' includes nozzle 66. Pump housing 20' includes fitting 36 and fluid inlet 68. Spray valve 50 includes valve stop 70, valve spring 72, and flow regulator 74. Drive module 14' includes drive housing 28', drive assembly 30', handle 38, trigger 40, power source 42, circuitry 76, trigger sensor 78, and safety sensor 80. Drive housing 28' includes slot 44. Drive assembly 30' includes motor 82 and mechanical drive 84. Motor 82 includes pinion 86. Mechanical drive 84 includes gear 88, eccentric 90, collar 92, drive connector 94, and bearings 96.

Drive module 14' is connected to fluid module 12' by static connection 16' and dynamic connection 18'. Specifically, pump housing 20' of fluid module 12' is connected to drive housing 28' of drive module 14' by static connection 16'. Pump 24' is connected to drive assembly 30' by dynamic connection 18'.

Drive housing 28' of drive module 14' contains and supports other components of drive module 14'. Drive housing 28' can be formed from metal and/or polymer. Drive housing 28' can, in some examples, be formed by two lateral (left and right) sides or hemispheres fitted together as a clamshell. Handle 38 is disposed at a rear of drive module 14'. It is understood, however, that handle 38 can extend from any desired portion of drive module 14'. Handle 38 is configured to be gripped by the hand of a user and to support the entire weight of handheld sprayer 10' with one hand while spraying various surfaces. Trigger 40 projects from handle 38, such that the hand holding handle 38 can also actuate trigger 40. Actuating trigger 40 activates drive assembly 30', thereby powering pump 24' and causing handheld sprayer 10' to spray the fluid disposed in reservoir 22'. Releasing trigger 40 removes power from drive assembly 30', causing handheld sprayer 10' to stop spraying paint. In some examples, handle 38 is formed as part of drive housing 28'. It is understood, however, that handle 38 can be formed separately and attached to drive housing 28'. As such, handle 38 can be formed from the same or a different material from drive housing 28'.

Power source 42 is part of drive module 14' and is configured to provide power to motor 74. In the example shown, power source 42 is a battery. The use of a battery allows handheld sprayer 10' to be completely untethered from external power sources. Power source 42 is attachable and detachable with respect to drive housing 28'. It is understood that other and/or additional power sources 42, such as an electrical cord for connecting to electrical outlet, can be used.

Circuitry 76 is disposed in drive module 14' and can manage power from power source 42 to other components of handheld sprayer 10'. Circuitry 76 can also include an input for controlling one or more spray parameters. Circuitry 76 can include one or more circuit boards. Circuitry 76 can also include wired connections, such as a wired connection between motor 82 and power source 42. For example, a knob, or other control, can extend from drive housing 28', and the user can adjust the position of the control to alter the pressure developed by pump 24' based on an input, such as a potentiometer dial corresponding to user-desired pressure. Additionally or alternatively, a control can be used to set and/or change the speed of motor 82, to output more or less paint based on such a user input. Circuitry 76 can further include trigger circuitry, which can include trigger sensor 78 for detecting actuation and release of trigger 40 to cause handheld sprayer 10' to begin spraying and stop spraying. In various embodiments, actuation of trigger 40 toggles trigger sensor 78, which senses the position of trigger 40 and sends a signal to circuitry 76. In response to reception of the signal indicating actuation of trigger 40, circuitry 76 sends power to motor 82 to activate motor 82. When trigger sensor 78 detects that trigger 40 is no longer actuated, trigger sensor 78 can send a signal to various other components of circuitry 76 indicating the non-actuated state, and in response, circuitry 76 can stop the delivery of power to motor 82, thereby deactivating motor 82.

Safety sensor 80 is disposed at static connection 16'. Safety sensor 80 is configured to sense when fluid module 12' is mounted on drive module 14', and to prevent activation of drive assembly 30' when fluid module 12' is not mounted on drive module 14'. As such, safety sensor 80 prevents activation of drive assembly 30' when various components of drive assembly 30' are exposed that could create pinch hazards, such as drive connector 94. Safety sensor 80 can be of any configuration suitable for sensing mounting of fluid module 12' on drive module 14'. Safety sensor 80 can be electronic or mechanical. As such, in some examples safety sensor 80 can be part of circuitry 76. For example, safety sensor 80 can be a reed switch. In other examples, safety sensor 80 can be a mechanical interference with trigger 40 that allows trigger actuation only when fluid module 12' is mounted on drive module 14'. For example, mounting fluid module 12' on drive module 14' can toggle a lever, configured to physically inhibit trigger 40 actuation, to a position where the lever does not inhibit trigger 40 actuation. Removing fluid module 12' from drive module 14' can cause the lever to move back to the original position to inhibit trigger 40 actuation.

Drive assembly 30' is disposed within drive housing 28' and is configured to power pump 24'. Motor 82 is disposed within drive housing 28' and receives power from power source 42. Actuating trigger 40 causes power source 42 to provide power to motor 82, thereby causing motor 82 to drive rotation of pinion 86. Mechanical drive 84 is disposed within drive housing 28' and is powered by motor 82. Mechanical drive 84 is configured to convert the rotational input from motor 82 into a linear, reciprocating output, which output powers pump 24'. In the example shown, mechanical drive 84 is a wobble drive. It is understood, however, that mechanical drive 84 can be of any suitable configuration for converting the rotational input from motor 82 into a linear, reciprocating output.

Gear 88 of mechanical drive 84 interfaces with and is driven by pinion 86. Gear 88 is attached to eccentric 90. Eccentric 90 is mounted to drive housing 28' by bearings disposed at opposite ends of eccentric 90. Collar 92 surrounds eccentric 90, and bearings 96 are disposed between collar 92 and eccentric 90. Bearings 96 ride in grooves formed in collar 92 and eccentric 90. Rotation of eccentric 90 causes collar 92 to wobble as eccentric 90 rotates, but collar 92 does not rotate with eccentric 90. Drive connector 94 projects from collar 92. Drive connector 94 can be a knob. In some examples, collar 92 can include multiple drive connectors 94 configured to interface with and power multiple pistons 54. Drive connector 94 extends from collar 92 which does not rotate with eccentric 90, such that drive connector 94 also does not rotate with eccentric 90. The wobble of collar 92 causes linear, reciprocating motion of drive connector 94. The forward motion of drive connector 94 drives the pump stroke of pump 24' and the rearward motion of drive connector 94 drives the suction stroke of pump 24'. As such, mechanical drive 84 converts the rotational motion output by motor 82 into linear, reciprocating motion of piston 54. While mechanical drive 84 is shown as a wobble-type mechanical drive, it is understood that handheld sprayer 10' can include any desired drive mechanism capable of converting a rotational input into a linear reciprocating output for driving pump 24'.

Pump housing 20' is attached to drive housing 28' by static connection 16' and supports the various other components of fluid module 12'. Pump housing 20' can be formed from polymer or metal. Part or all of pump 24' is disposed within and supported by pump housing 20'. In the example shown, fitting 36 is disposed in slot 44. It is understood, however, that any arrangement suitable for physically connecting pump housing 20' to drive housing 28' can be utilized.

Valve housing 46 is attached to pump housing 20', such as by interfaced threading. Tip housing 32 is attached to valve housing 46, such as by interfaced threading. Spray tip 26' is mounted in tip housing 32. Nozzle 66 is disposed in spray tip 26'. Nozzle 66 can be formed from a metal such as carbide. Nozzle 66 is configured to atomize the paint forced through the nozzle 66 under pressure to form a spray fan or other pattern of sprayed paint. Spray tip 26' is configured to rotate within tip housing 32 between a spray position and a de-clog position. While in the de-clog position the direction of paint flow through nozzle 66 is reversed to dislodge any clogs that may develop in nozzle 66 over time.

Reservoir 22' is supported by pump housing 20'. More specifically, reservoir 22' is attached to elbow connector 52, and elbow connector 52 is mounted to pump housing 20'. Elbow connector 52 mechanically connects reservoir 22' to pump housing 20'. As such, reservoir 22' is mechanically connected to, and supported by, pump housing 20' via elbow connector 52. Elbow connector 52 further fluidly connects reservoir 22' to pump 24'. Elbow connector 52 is shown having a flow path that takes a 90° turn between reservoir 22' and pump 24', though other degrees of turning are possible. In some examples, reservoir 22' can be directly connected to pump housing 20' and/or elbow connector 52 can be integrally formed with either of pump housing 20' or reservoir 22'.

Reservoir 22' is configured to hold a supply of paint or other fluid for spraying. Reservoir valve 48 is disposed between reservoir 22' and elbow connector 52. Reservoir valve 48 can be rotated between an open position and a closed position. In the closed position, reservoir valve 48 closes off a flowpath through reservoir valve 48 between reservoir 22' and elbow connector 52. With reservoir valve 48 in the closed position, fluid cannot flow out of reservoir 22' to elbow connector 52, and thus cannot flow to pump 24' and be sprayed by handheld sprayer 10'. Rotation of reservoir valve 48 to the open position opens the pathway through reservoir valve 48 between reservoir 22' and elbow connector 52 to allow the paint or other fluid within reservoir 22' to flow downstream to pump 24'. While a single reservoir 22' is shown in this embodiment, various other embodiments can include multiple reservoirs 22' (e.g., two) containing different types of paint (e.g., different colors; water-based vs. oil-based) and/or different fluids. One or more reservoir valves 48 can manage the flow of the different types of paint or fluid to pump 24'.

Priming valve 34 is connected to pump housing 20' and can be actuated between a spray state and a prime state, as discussed further herein. In the prime state, priming valve 34 is open and configured to route fluid pumped by pump 24' back to a location upstream of pump 24'. Routing the fluid to a location upstream of pump 24' allows pump 24' to discharge any air that may be located upstream of pump 24', such as in elbow connector 52 and/or reservoir 22', prior to beginning spraying, thereby ensuring the quality of the spray produced by handheld sprayer 10'. In the spray state, priming valve 34 is closed such that pump 24' drives the fluid downstream through spray valve 50 and out of nozzle 66.

Part or all of pump 24' is disposed in and supported by pump housing 20'. Piston 54 is configured to reciprocate within pump housing 20' to pump fluid from reservoir 22' and out through nozzle 66. First end 62 of piston 54 is configured to pressurize the fluid and drive the fluid downstream out of nozzle 66. Receiver 60 is disposed on second end 64 of piston 54. Return spring 58 is disposed around piston 54 and interfaces with receiver 60. Return spring 58 is configured to bias receiver 60, and thus piston 54 rearward. Check valve 56 is disposed at a downstream end of piston 54. Check valve 56 prevents paint being pumped downstream by pump 24' from backflowing upstream to pump 24' across check valve 56.

Valve housing 46 is disposed downstream of pump 24' and is mounted to pump housing 20'. Valve stop 70, valve spring 72, and flow regulator 74 are each fully or at least partially disposed within valve housing 46. In some examples, valve housing 46 is threaded into pump housing 20'. Valve housing 46 contains part or all of check valve 56. Valve stop 70 is disposed within valve housing 46. Valve stop 70 is configured to limit the downstream extent of travel of the valve element of check valve 25, such as a ball where check valve 25 includes a ball. Valve stop 70 is cylindrical and is located within a cylindrical pathway within valve housing 46. A gap is formed between the outer diameter of valve stop 70 and the inner diameter of the cylindrical passage within valve housing 46. The gap allows paint to flow downstream past valve stop 70 and to nozzle 66. Valve spring 72 is configured to bias valve stop 70 upstream towards piston 54. However, the flow of paint generated by pump 24' can push valve stop 70 downstream within the cylindrical passage within valve housing 46. The positioning of valve stop 70 can be balanced by the flow of paint and valve spring 72 to set the limit of travel of the valve element of check valve 56. Valve spring 72 also engages flow regulator 74. Flow regulator 74 is located at least partially within valve housing 46 and the downstream end of valve housing 46. Flow regulator 74 can include a narrow passageway extending through flow regulator 74 to prevent dripping or drooling of paint from the fluid pathway when handheld sprayer 10' is not spraying. For example, the paint can be sufficiently viscous that the paint cannot flow through the orifice formed in flow regulator 74 when pressure is below the spray pressure generated by pump 24'.

Tip housing 32 is mounted on valve housing 46. In some examples, tip housing 32 is threaded to valve housing 46. Tip housing 32 supports spray tip 26' and allows spray tip 26' to rotate within a cylindrical cavity of tip housing 32. Spray tip 26' is configured to rotate to allow reverse flow of paint through nozzle 66 to de-clog nozzle 66, as previously described.

During operation, piston 54 is driven through alternating pump strokes and suction strokes to pump fluid from reservoir 22' to nozzle 66 and generate the spray. Dynamic connection 18' between drive module 14' and fluid module 12' drives pump 24' during spraying. To initiate spraying, the user depresses trigger 40, which activates motor 82. Motor 82 rotates pinion 86, which drive rotation of gear 88. Gear 88 rotates eccentric 90, which causes collar 92 and drive connector 94 to wobble, causing a linear reciprocating movement of drive connector 94. Dynamic connection 18' is formed between receiver 60 mounted on second end 64 of piston 54 and drive connector 94 extending from collar 92. Receiver 60 can also be referred to as the fluid module dynamic connector. Drive connector 94 can also be referred to as the drive module dynamic connector.

As drive connector 94 moves forward, drive connector 94 exerts a forward force on receiver 60, thereby driving piston 54 forward through a pump stroke. As drive connector 94 moves rearward, return spring 58 drives receiver 60 rearward. Receiver 60 pulls piston 54 rearward through a suction stroke due to the connection of piston 54 and receiver 60. The user can release the trigger 40 to stop spraying. The user can remove all fluid carrying components from handheld sprayer 10' by unlocking static connection 16' and pulling fluid module 12' off of drive module 14'. The user can then resume spraying by mounting the same or a new fluid module 12' onto drive module 14'.

Figure 4A:
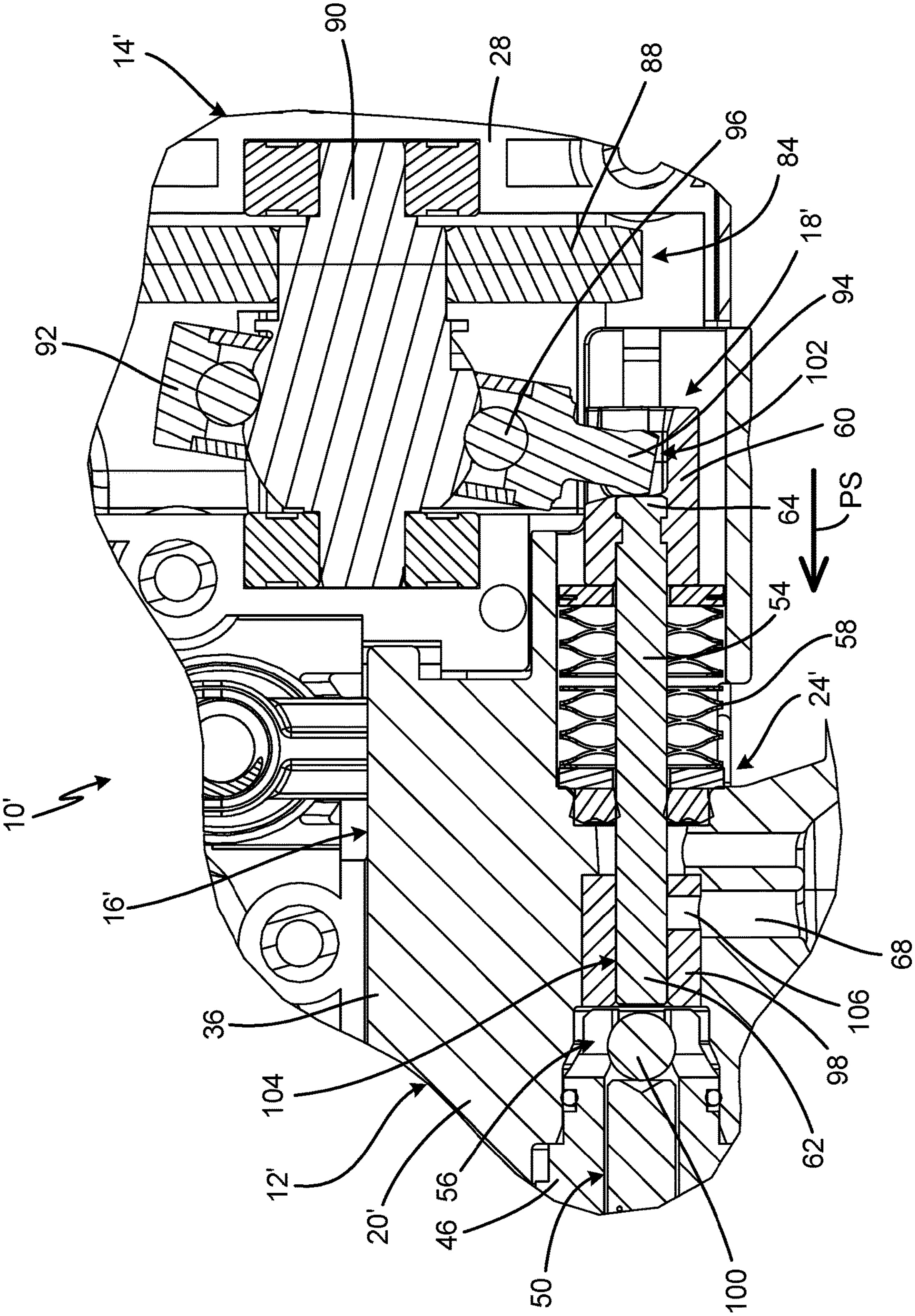
FIG. 4A is a detailed cross-sectional view of a portion of a handheld spryer showing the piston in a pump stroke.
Figure 4B:
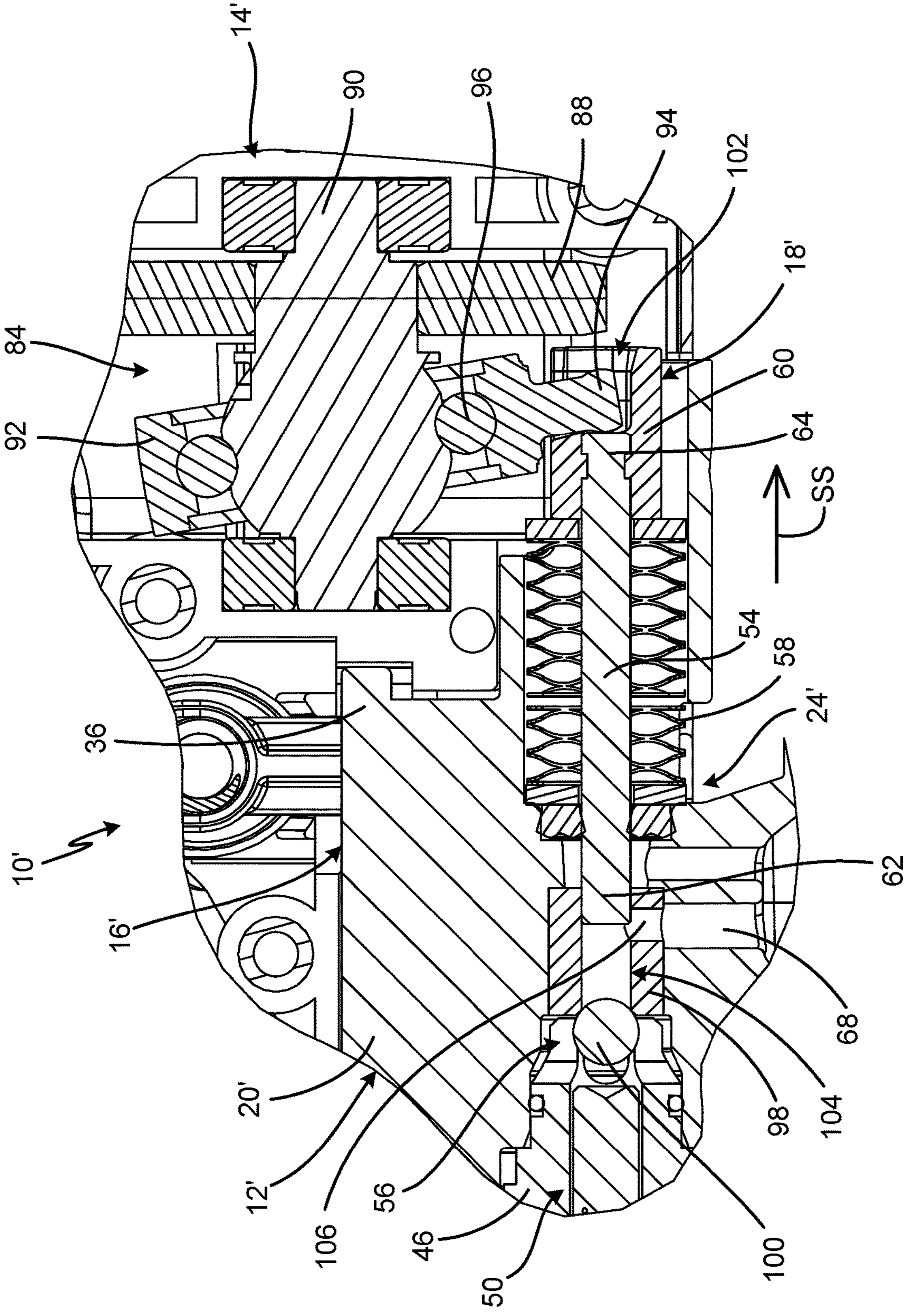
FIG. 4B is a detailed cross-sectional view of a portion of the handheld sprayer showing the piston in a suction stroke.

FIG. 4A is a detailed cross-sectional view of handheld sprayer 10' showing piston 54 in a forward position of a pump stroke. FIG. 4B is a detailed cross-sectional view of handheld sprayer 10' showing piston in rearward position of a suction stroke. FIGS. 4A and 4B will be discussed together. Pump housing 20', pump 24, valve housing 46, spray valve 50, and cylinder 98 of fluid module 12' are shown. Fitting 36 and fluid inlet 68 of pump housing 20' are shown. Pump 24' includes piston 54, check valve 56, return spring 58, and receiver 60. Piston 54 includes first end 62 and second end 64. Check valve 56 includes ball 100. Receiver 60 includes socket 102. Cylinder 98 defines chamber 104 and includes port 106. Drive housing 28' and mechanical drive 84 of drive module 14' are shown. Mechanical drive 84 includes gear 88, eccentric 90, collar 92, drive connector 94, and bearings 96.

Fluid module 12' is mounted to drive module 14' by both static connection 16' and dynamic connection 18'. Static connection 16' is formed between pump housing 20' and drive housing 28'. In the example shown, static connection 16' is formed by fitting 36 of pump housing 20' and slot 44 of drive housing 28'. Dynamic connection 18' is formed between pump 24' and drive assembly 30'.

Pump 24' is at least partially disposed in and is supported by pump housing 20'. Piston 54 is configured to reciprocate along axis A-A to pump fluid from reservoir 22' (best seen in FIGS. 2A and 2B) to nozzle 66 (best seen in FIG. 2B). First end 62 of piston 54 extends into cylinder 98 and is configured to reciprocate within cylinder 98. Receiver 60 is disposed on second end of piston 54. Receiver 60 surrounds and is fixed to a head on second end 64 of piston 54. For example, receiver 60 can be a polymer that is over molded on the head of piston 54, though other options are possible. Piston 54 extends through return spring 58. Return spring 58 interfaces with receiver 60 and pump housing 20'. Return spring 58 is configured to bias receiver 60 rearward to drive piston 54 through the suction stroke.

Receiver 60 is configured to connect to drive connector 94 to transmit driving forces to piston 54. Socket 102 is formed in receiver 60. Socket 102 is configured to receive drive connector 94 extending from collar 92. In some examples, receiver 60 can be a cradle. In some examples, receiver 60 can be a piston head. In some examples, receiver 60 and/or socket 102 is/are formed from the same material as piston 54 and can be formed unitarily with piston 54. While drive connector 94 is shown as being located on collar 92 and receiver 60 is shown as being fixed to piston 45, the positions of these components can be reversed. For example, projecting drive connector 94 can be fixed to pump 24', such as being a knob on the end of piston 54, while receiver 60 can be located on collar 92 or on another reciprocating component of mechanical drive 84. While a drive connector 94 and receiver 60 are shown for transmitting motion from the mechanical drive 84 to piston 54, other types of connections can be used for releasably connecting the output of the mechanical drive 84 to the input of pump 24'.

In the example shown, receiver 60 is open on a back end of socket 102 to facilitate front loading of fluid module 12' onto drive module 14'. As such, as fitting 36 is slid into slot 44 from the front of handheld sprayer 10', drive connector 94 slides into socket 102 through the rear opening of socket 102. Each of static connection 16' and dynamic connection 18' are thereby simultaneously formed as fluid module 12' is mounted on drive module 14'.

Cylinder 98 is disposed in pump housing 20'. Cylinder 98 can be retained in pump housing 20' by valve housing 46. Cylinder 98 can be formed from carbide or other type of metal. As discussed above, first end 62 of piston 54 is configured to reciprocate within cylinder 98 during pumping. Cylinder 98 defines chamber 104, and port 106 extends through cylinder 98 into chamber 104. Fluid inlet 68 is a flowpath formed within pump housing 20' that is in fluid communication with reservoir 22'. During operation, pump 24' draws fluid through fluid inlet 68 and into chamber 104 through port 106. Pump 24' then drives the fluid downstream through check valve 56 and spray valve 50 and to nozzle 66. Ball 100 of check valve 56 is disposed downstream of cylinder 98. In some examples, the downstream end of cylinder 98 forms the seat of check valve 56, such that ball 100 seats on the downstream end of cylinder 98 when check valve 56 is closed.

As discussed above, mechanical drive 84 receives a rotary input from motor 82 (best seen in FIGS. 2A and 2B) and is configured to convert that rotary input into a linear reciprocating output. Forward movement of drive connector 94 pushes piston 54 forward, by drive connector 94 engaging the head of piston 54 via receiver 60. On the pump stroke (FIG. 4A), sometimes referred to as the downstroke or forward stroke, piston 54 is driven forward by drive connector 94, as shown by arrow PS in FIG. 4A. Forward movement of piston 54 through cylinder 98 increases the pressure in chamber 104 and drives paint within chamber 104 of cylinder 98 downstream past check valve 56. Ball 100 is pushed off of a seat (in this embodiment, the downstream end of cylinder 98) by paint within chamber 104 being driven downstream by piston 54 moving forward through cylinder 98. Forward movement also compresses return spring 58 between receiver 60 and pump housing 20'. After the pump stroke is complete, pump 24' proceeds through a suction stroke.

To start the suction stroke (FIG. 4B) (sometimes referred to as the up or back stroke), drive connector 94 is moved rearward by the wobble of collar 92. Rearward travel of drive connector 94 means that drive connector 94 no longer pushes on, or limits the travel of, piston 54. In the example shown, the suction stroke of piston 54 is driven by return spring 58 expanding and pushing receiver 60 rearward as drive connector 94 moves rearwards. On the suction stroke, piston 54 is pulled rearward as shown by arrow SS in FIG. 4B. First end 62 of piston 54 moves rearward within chamber 102 creating a vacuum condition in chamber 102. The vacuum condition pulls ball 100 onto cylinder 98 to close check valve 56 and prevent the fluid downstream of check valve 56 from flowing upstream into chamber 104. When first end 62 uncovers port 104, the vacuum pulls paint into chamber 104 through port 106 and fluid inlet 68. At the completion of the suction stroke, drive connector 94 begins to move forward and pump 24' enters another pump stroke.

Figure 5A:
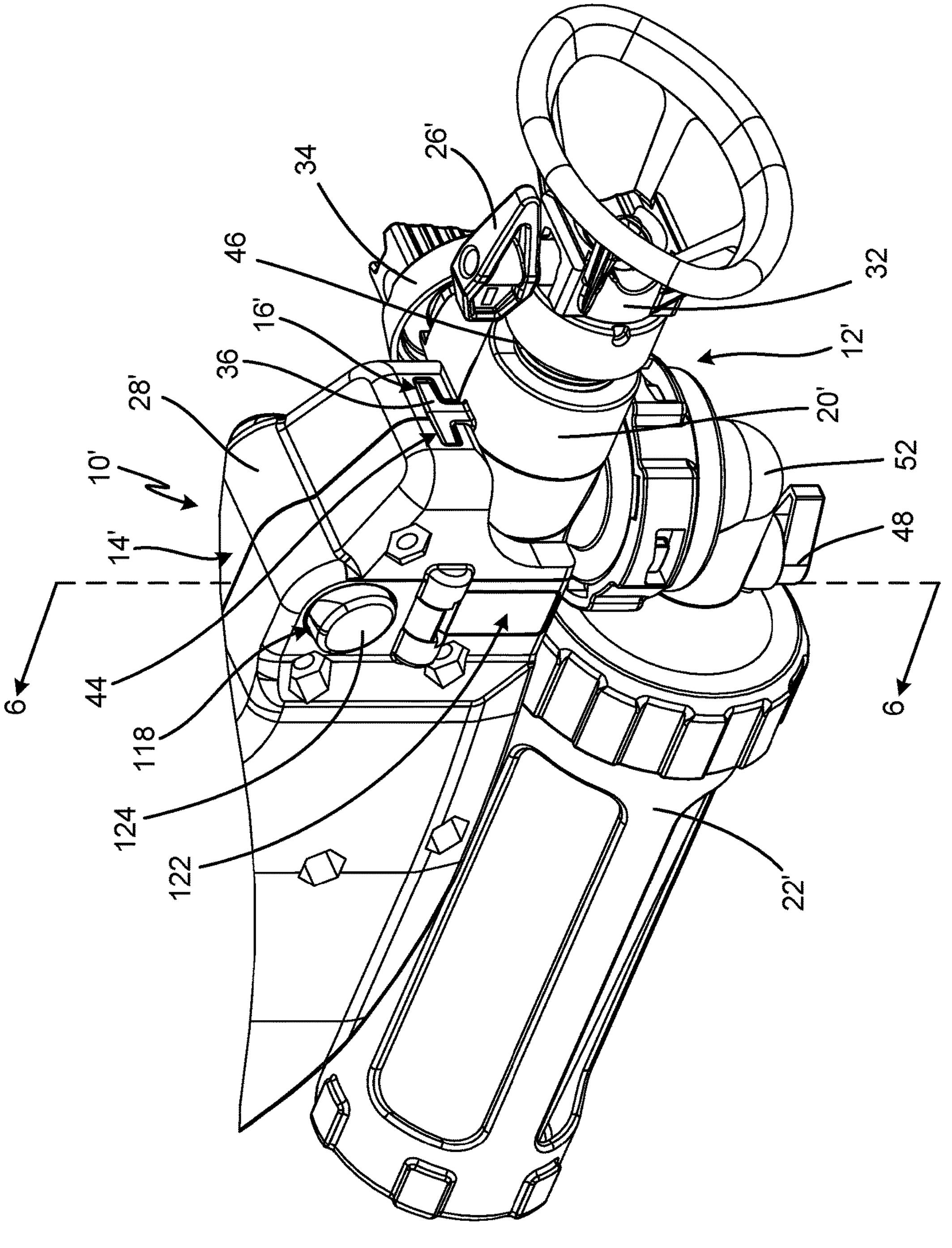
FIG. 5A is an isometric view of a front portion of a handheld sprayer.
Figure 5B:
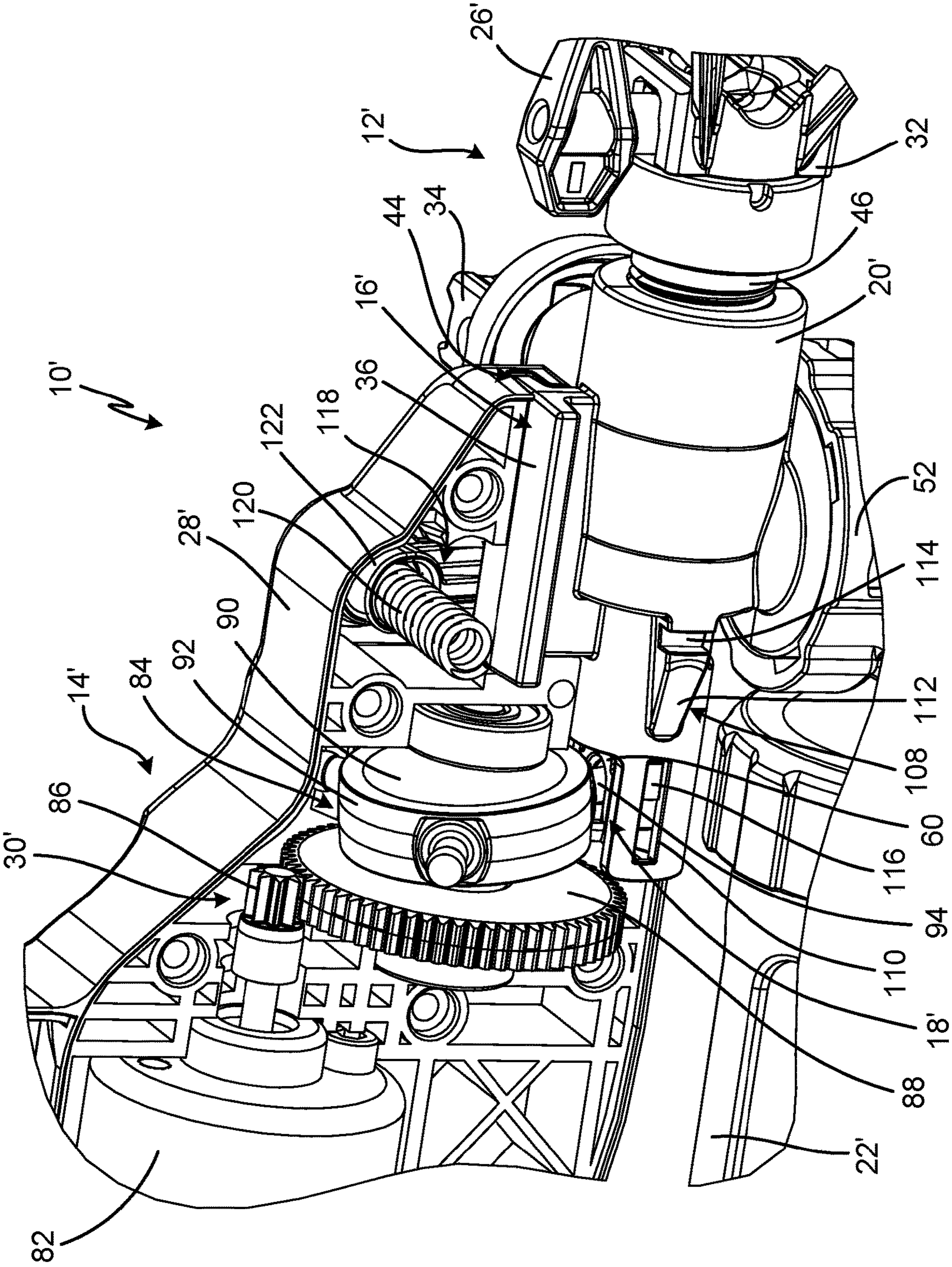
FIG. 5B is an isometric view of a front portion of a handheld sprayer with a portion of the drive housing removed.

FIG. 5A is an isometric view of a portion of the front end of handheld sprayer 10'. FIG. 5B is an isometric view of a portion of the front end of handheld sprayer 10', with half of drive housing 28' removed. Handheld sprayer 10' includes fluid module 12', drive module 14', static connection 16', and dynamic connection 18'. Pump housing 20', reservoir 22', spray tip 26', tip housing 32, priming valve 34, valve housing 46, reservoir valve 48, and elbow connector 52 of fluid module 12' are shown. Pump housing 20' includes fitting 36, stop 108, and slot 110. Stop 108 includes ramp 112 and groove 114. Receiver 60 is shown, and receiver 60 includes projection 116. Drive housing 28', drive assembly 30', and locking mechanism 118 of drive module 14' are shown. Drive housing 28' includes slot 44. Drive assembly 30' includes motor 82 and mechanical drive 84. Motor 82 includes pinion 86. Gear 88, eccentric 90, collar 92, and drive connector 94 of mechanical drive 84 are shown. Locking mechanism 118 includes lock spring 120 and catches 122. Each catch 122 includes a button 124.

In the view shown in FIG. 5B a portion of drive housing 28', such as one half of a clamshell forming drive housing 28', is removed to expose drive assembly 30'. Pinion 86 extends from motor 82 and provides the rotational output from motor 82. Pinion 86 is rotated by motor 82 and interfaces with gear 88 of mechanical drive 84. As discussed above, rotation of gear 88 drives rotation of eccentric 90. Rotation of eccentric 90 causes collar 92 to wobble, thereby causing drive connector 94 to reciprocate linearly.

Receiver 60 is mounted to piston 54 (best seen in FIGS. 4A and 4B) and interfaces with drive connector 94. Projection 116 extends laterally from receiver 60 and into slot 110 formed in the portion of pump housing 20' within which receiver 60 reciprocates. Projection 116 reciprocates within slot 110 as receiver 60 reciprocates by drive connector 94 and return spring 58 (best seen in FIGS. 4A and 4B). Projection 116 is disposed in slot 110 to prevent any undesired rotation of receiver 60 and to maintain the desired alignment of receiver 60 with drive connector 94.

Pump housing 20' can be generally cylindrical, though other outer profiles are also possible. Fitting 36 extends from pump housing 20'. As shown in FIG. 5A, fitting 36 can be fully disposed within slot 44 when fluid module 12' is mounted on drive module 14'. When fitting 36 is disposed within slot 44, fitting 36 prevents any relative movement of pump housing 20' relative to drive housing 28', except for linear sliding movement forwards and backwards as fitting 36 slides within slot 44. Limiting the relative movement between pump housing 20' and drive housing 28' to linear sliding movement helps ensure proper alignment between drive assembly 30' and pump 24' when making dynamic connection 18'. Locking mechanism 118 prevents linear sliding movement of fitting 36 in slot 44 when fluid module 12' is mounted on drive module 14'.

As shown, fitting 36 is integrally formed with pump housing 20'. It is understood, however, that fitting 36 can be formed separately from pump housing 20' and attached to pump housing 20', such as by adhesive and/or fasteners. Slot 44 is formed in drive housing 28'. Fitting 36 and slot 44 form static connection 16' between drive module 14' and fluid module 12'. Fitting 36 has a T beam profile. The inner surface of slot 44 and the outer surface of fitting 36 are complementary to fit in a lock-and-key manner for a secure, but decoupleable fit.

While fitting 36 is shown as being part of pump housing 20' and slot 44 is shown as part of drive housing 28', it is understood that the arrangement can be reversed. For example, fitting 36 can project from drive housing 28' and slot 44 can be formed in pump housing 20', such that fitting 36 projecting from drive housing 28' is received in slot 44 formed in pump housing 20'. Moreover, while fitting 36 is shown as a T-beam, it is understood that fitting 36 can be of any desired shape suitable for providing a static connection and for supporting pump housing 20' on drive housing 28'. It is further understood that slot 44 can also be of any desired complementary shape to receive fitting 36. For example, each of fitting 36 and slot 44 can be triangular, round, rectangular, trapezoidal, pentagonal, or of any other desired shape.

Locking mechanism 118 is at least partially disposed in drive housing 28' and is configured to lock static connection 16' between fluid module 12' and drive module 14'. Locking mechanism 118 is accessible from outside of drive housing 28' to allow the user to easily unlock static connection 16'. In the example shown, buttons 124 project through drive housing 28' and are accessible to the user. Each catch 122 extends from a button 124. In some examples, buttons 124 are integrally formed on catches 122. Catches 122 are pivotably mounted on drive housing 28', such that the user can cause each catch 122 to pivot by depressing the button 124 associated with that catch 122. Lock spring 120 is disposed in drive housing 28' and extends between buttons 124. Lock spring 120 is configured to bias buttons 124 laterally outward to maintain catches 122 in the locked position, where catches 122 are engaged with stop 108 of pump housing 20' to maintain pump housing 20' on drive housing 28'. While handheld sprayer 10' is shown as including multiple catches 122 on each lateral side of drive housing 28', it is understood that handheld sprayer 10' can, in some examples, include a single catch 122.

Pump housing 20' includes stop 108. In the example shown, stop 108 includes ramp 112 and groove 114. Groove 114 is configured to interface with another component (such as catch 122) to selectively prevent sliding removal of fitting 36 from slot 44. As pump housing 20' is slid onto drive housing 28', ramp 112 drives catch 122 outwards as ramp 112 passes by catch 122. Lock spring 120 then causes catch 122 to snap into groove 114 and lock pump housing 20' onto drive housing 28'. As such, stop 108 forms a portion of a lock (together with locking mechanism 118) that maintains static connection 16' between drive module 14' and fluid module 12'. While locking mechanism 118 is shown as the lock for static connection 16', it is understood that the lock for static connection 16' can be of any desired configuration. For example, locking mechanism 118 can include a plate configured to slide vertically and that is disposed at the front end of drive housing 28'. A spring can bias the plate downward to cover slot 44 and retain fitting 36 within slot 44, thereby locking static connection 16' between fluid module 12' and drive module 14'.

Figure 6A:
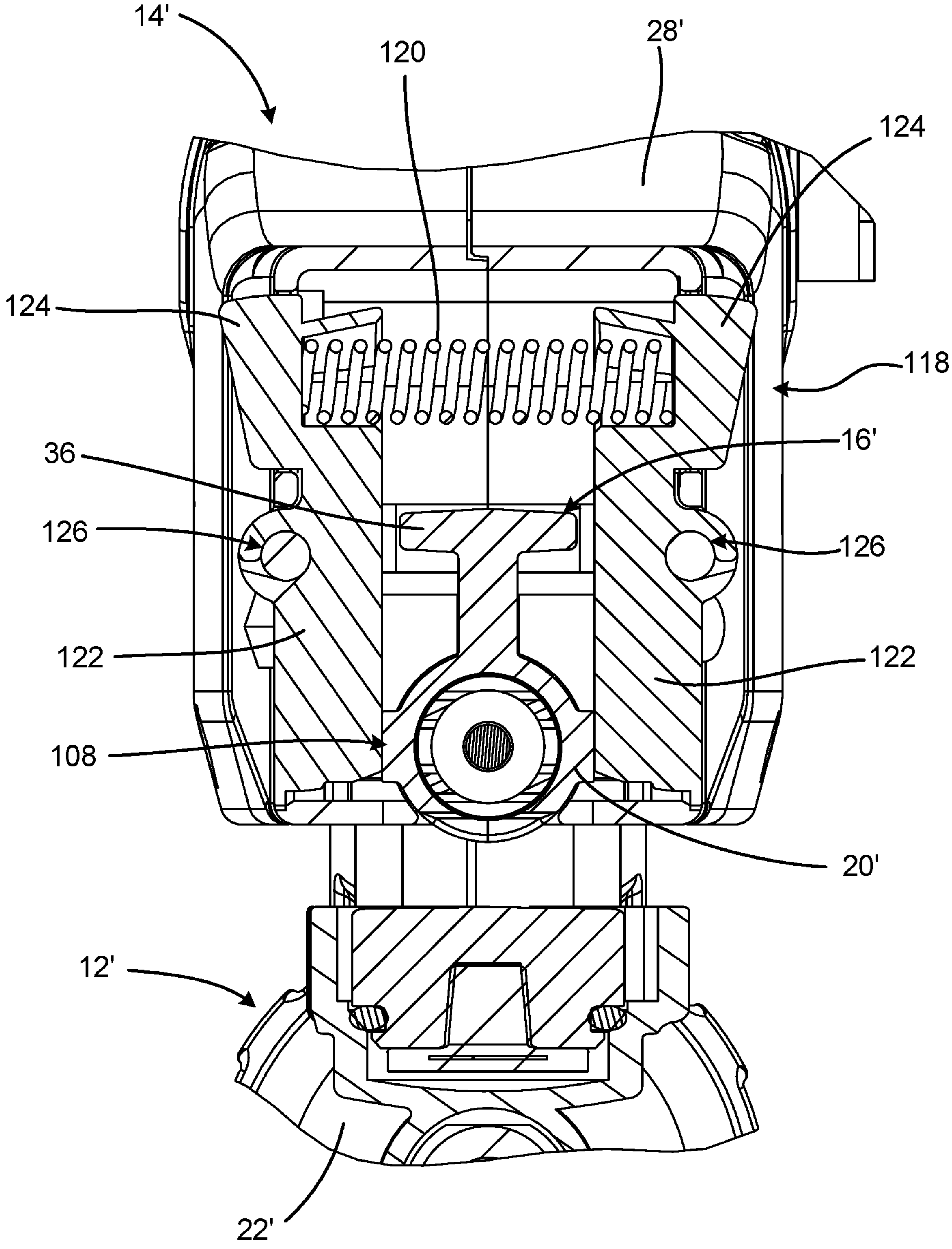
FIG. 6A is a cross-sectional view of a handheld sprayer taken along line 6-6 in FIG. 5A and showing a locking mechanism in a locked state.
Figure 6B:
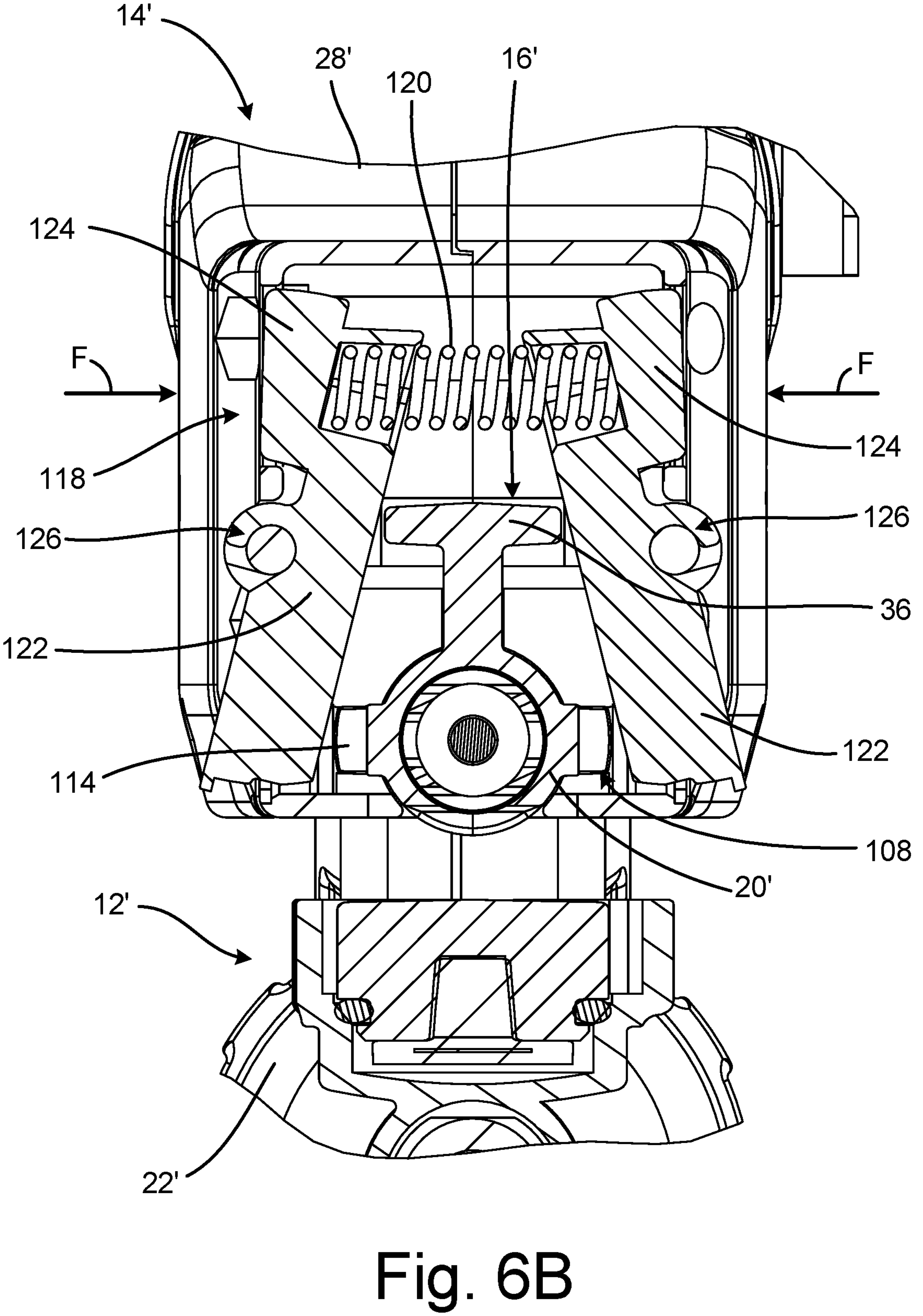
FIG. 6B is a cross-sectional view of a handheld sprayer taken along line 6-6 in FIG. 5A and showing a locking mechanism in an unlocked state.

FIG. 6A is a cross-sectional view of handheld sprayer 10' taken along line 6-6 in FIG. 5A showing locking mechanism 118 in a locked state. FIG. 6B is a cross-sectional view taken along line 6-6 in FIG. 5A showing locking mechanism 118 in an unlocked state. FIGS. 6A and 6B will be discussed together. Static connection 16' between fluid module 12' and drive module 14' is shown. Reservoir 22' and pump housing 20' of fluid module 12' are shown. Fitting 36 and stop 108 of pump housing 20' are shown, and groove 114 of stop 108 is shown. Drive housing 28' and locking mechanism 118 of drive module 14' are shown. Locking mechanism 118 includes lock spring 120, catches 122, and pivot points 126. Each catch 122 includes a button 124.

Fitting 36 extends from pump housing 20' and is disposed in slot 44 (best seen in FIGS. 5A and 5B) formed in drive housing 28'. The connection between fitting 36 and slot 44 forms static connection 16' between fluid module 12' and drive module 14'. Locking mechanism 118 locks static connection 16' to prevent unintended breaking of static connection 16'.

Locking mechanism 118 is mounted on and supported by drive housing 28'. Each catch 122 is mounted at a pivot point 126 and is configured to pivot about the pivot point 126. In the example shown, pivot points 126 can be formed as part of drive housing 28'. Each button 124 is formed at one distal end of each catch 122. As shown, buttons 124 are integrally formed with catches 122. Buttons 124 extend through drive housing 28', such that buttons 124 are accessible from the exterior of drive housing 28'. Lock spring 120 extends between buttons 124 and is configured to bias catches 122 towards the position shown in FIG. 6A. The ends of catches 122 disposed opposite buttons 124 extend into and engage grooves 114 of stops 108, which are formed in pump housing 20'. In some examples, the ends of catches 122 opposite buttons 124 can include any suitable projection or other feature that extends laterally inwards to engage with grooves 114 of stops 108.

As shown in FIG. 6A, catches 122 engage with grooves 114 such that catches 122 prevent pump housing 20' from sliding forward relative to drive housing 28' when locking mechanism 118 is in the locked state. When buttons 124 are not depressed, each catch 122 rests within the groove 114 of each stop 108. To unlock locking mechanism 118, the user applies a force, shown by arrows F in FIG. 6B, to buttons 124 to depress buttons 124 and drive locking mechanism 118 to the unlocked state shown in FIG. 6B. For example, the user's fingers can pinch buttons 124 to overcome the force of lock spring 120 and cause catches 122 to pivot on pivot points 126 and release from stops 108. When buttons 124 are depressed, catches 122 flares laterally outward and exit the grooves 114 of stops 108, thereby unlocking locking mechanism 118. With locking mechanism 118 unlocked, the user can break static connection 16' and pull fluid module 12' off of drive module 14'. Pump housing 20' can thus be slid forward and backward relative to drive housing 28' as fitting 36 slides within slot 44. Releasing button 124 while catches 122 are over grooves 114 of stops 108 causes locking mechanism 118 to shift back to the locked state shown in FIG. 6A, again fixing pump housing 20' to drive housing 28'.

With the force F removed from buttons 124, lock spring 120 pushes on buttons 124, causing catches 122 to rotate about pivot points 126 from the unlocked state shown in FIG. 6B to the locked state shown in FIG. 6A. In the locked state shown in FIG. 6A, catches 122 can push down into the grooves 114 of stops 108 formed in pump housing 20' to again lock pump housing 20' to drive housing 28'. While locking mechanism 118 is shown as including a pair of buttons 124 and catches 122, it is understood that a single button 124 and catch 122 and/or a different mechanism can be utilized.

Figure 7A:
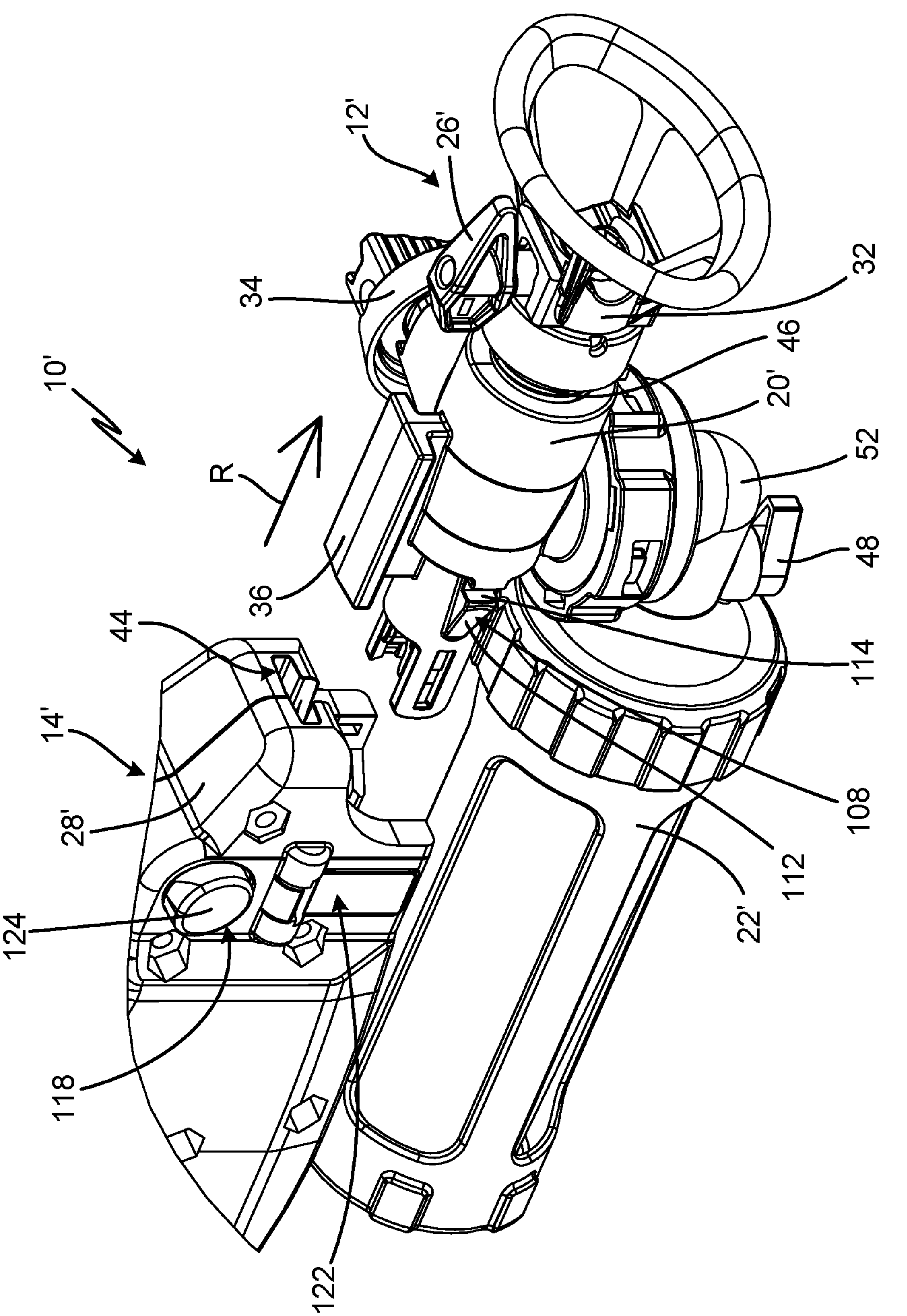
FIG. 7A is a partially exploded view of a handheld sprayer showing a fluid module disengaged from a drive module.
Figure 7B:
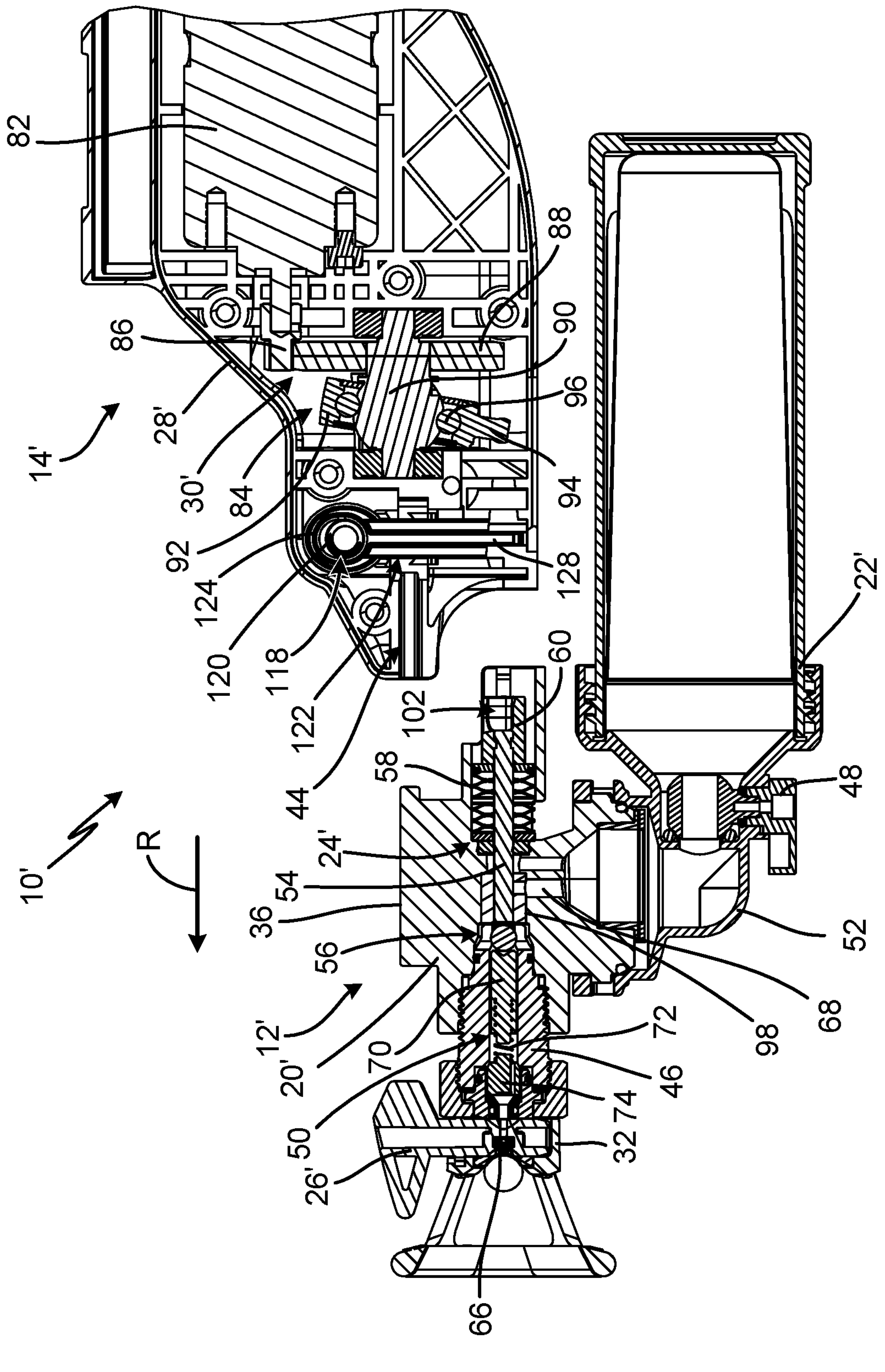
FIG. 7B is an exploded cross-sectional view of the handheld sprayer shown in FIG. 7A.

FIG. 7A is a partially exploded view of handheld sprayer 10' showing fluid module 12' disengaged from drive module 14'. FIG. 7B is an exploded cross-sectional view of handheld sprayer 10' showing fluid module 12' disengaged from drive module 14'. Fluid module 12' includes pump housing 20', reservoir 22', pump 24', spray tip 26', tip housing 32, priming valve 34, valve housing 46, reservoir valve 48, spray valve 50, elbow connector 52, and cylinder 98. Pump housing 20' includes fitting 36, fluid inlet 68, and stop 108. Pump 24' includes piston 54, check valve 56, return spring 58, and receiver 60. Receiver 60 includes socket 102. Stop 108 includes ramp 112 and groove 114. Spray tip 26' includes nozzle 66. Spray valve 50 includes valve stop 70, valve spring 72, and flow regulator 74. Drive housing 28', drive assembly 30', and locking mechanism 118 of drive module 14' are shown. Drive housing 28' includes slot 44. Drive assembly 30' includes motor 82 and mechanical drive 84. Motor 82 includes pinion 86. Mechanical drive 84 includes gear 88, eccentric 90, collar 92, drive connector 94, and bearings 96. A catch 122 and lock spring 120 of locking mechanism 118 is shown. Catch 122 includes button 124 and projection 128.

As discussed above, locking mechanism 118 can be actuated to the unlocked state (FIG. 6B) to facilitate removal of fluid module 12' from drive module 14'. During removal, pump housing 20' is pulled in a first direction, indicated by arrow R, relative to drive housing 28' until fitting 36 is slid entirely out from slot 44. Fluid module 12' can be easily reattached to drive module 14' by inserting fitting 36 into slot 44 and moving fluid module 12' rearward, in a second direction opposite arrow R, until catches 122 engage stops 108. In the example shown, projection 128 of catch 122 engages in groove 114 of stop 108. The point at which catches 122 engage stops 108 is dimensioned so that drive connector 94 is disposed within socket 102 of receiver 60, thereby making the dynamic connection 18'.

Fluid module 12' (which can also be referred to as the "wet" module) can include those components of handheld sprayer 10' which handle or otherwise contact paint. Drive module 14' (which can also be referred to as the "dry" module) can include those components which do not handle or otherwise contact paint. Drive module 14' may include only components which do not handle or otherwise contact paint. Drive module 14' can include the electrical and/or mechanical components which output mechanical reciprocating motion (e.g., at drive connector 94) to fluid module 12'. Fluid module 12' can include components which interface with drive module 14' to form each of static connection 16' and dynamic connection 18'.

Static connection 16' fixes pump housing 20' (and the components of fluid module 12' that are fixed to pump housing 20) to drive housing 28'. Dynamic connection 18' allows mechanical motion output from drive module 14' to be input to fluid module 12' for pumping and spray. More specifically, for the dynamic connection, drive connector 94 is received within socket 102 of receiver 60 so drive connector 94 can drive reciprocation of piston 54 to cause pumping and spraying. The user attaching fluid module 12' to drive module 14' via static connection 16', such that drive module 14' supports fluid module 12', also connects dynamic connection 18' such that drive module 14' powers pump 24' of fluid module 12' for spraying by fluid module 12'.

It is understood that the arrangement of each of static connection 16' and dynamic connection 18' can vary. For example, while fluid module 12' is shown as including fitting 36 and drive module 14' is shown as including slot 44, it is understood that the locations of fitting 36 and slot 44 can be reversed such that drive module 14' can include a projecting fitting 36 that connects with slot 44 on fluid module 12'. In addition, while drive module 14' is configured to output a linear reciprocating motion to pump 24', it is understood that fluid module 12' and drive module 14' can be configured such that fluid module 12' receives a rotary input from drive module 14' and converts the rotary input to linear reciprocating motion. For example, mechanical drive 84 can be part of fluid module 12', such that dynamic connection 18' is made between pinion 86 and gear 88.

It is noted that that, in the example shown, fluid module 12' slides axially to mount on and dismount from drive module 14'. Such axial sliding can simultaneously make each of static connection 16' and dynamic connection 18'. In various other embodiments, fluid module 12' can be vertically installed on drive module 14' from a bottom of drive module 14'. As such, fluid module 12' can slide vertically to mount and dismount from drive module 14'. Such embodiments can include a vertically oriented fitting 36 on pump housing 20' can slide into a vertically oriented slot 44 on drive housing 28'. It is understood, however, that the vertical mounting arrangement can include any other desired attachment mechanism. In addition, in such examples socket 102 of receiver 60 can be fully enclosed while still receiving drive connector 94. A locking mechanism, similar to locking mechanism 118 (best seen in FIGS. 6A-6B), can retain the vertically mounted fluid module 12' on drive module 14'. For example, stops 108 can include vertically oriented ramps 112 and horizontal grooves 114 configured to be engaged by horizontal projections 128 on catches 122.

As demonstrated herein, the detachment of fluid module 12' from the drive module 14' can be completed by simply undoing static connection 16', such as by undoing one or more catches 122 and pulling fluid module 12' relative to drive module 14' via a sliding motion. Likewise fluid module 12' can be reengaged with drive module 14' by a simple sliding motion. Fluid module 12' can then be operated as handheld sprayer 10'.

The connection between fluid module 12' and drive module 14' provides several advantages. One advantage is the potential use of several different (but possibly identical) fluid modules 12' with a single drive module 14'. Each fluid module 12' can contain and output paint of a different color or of a different character or output different fluids. For example, the reservoirs 22' of each of the multiple fluid modules 12' can contain different colors of paint or different types of paint (e.g., oil based and water based paints). Changing the color being sprayed can be as simple as removing a first fluid module 12' from engagement with drive module 14' and mounting a second fluid module 12' to drive module 14', the second fluid module 12' containing a different color of paint than the first fluid module 12'. In sprayers where the fluid routing components are not removable, the paint pathways through the fluid routing components would have to be drained and flushed and new paint put into the reservoir in order to change colors. Fast color changes can be particularly important for ground utility marking in which different colors signal different underground features. The paint channels through fluid modules 12' are sealed, and decoupling of fluid module 12' from the drive module 14' does not open or expose any paint or paint pathways, so paint types can be changed by changing fluid module 12' without risking paint spillage.

The modularity of fluid module 12' also facilitates fast repairs of the wear parts of handheld sprayer 10'. Paint and other fluids can be particularly abrasive on components, particularly pump 24'. Therefore pump components (such as piston 54) and other components that are exposed to paint (such as check valve 56, spray valve 50, nozzle 66, etc.) wear and fail faster than components that are not exposed to paint. A user can keep a spare fluid module 12' and if the original fluid module 12' fails, then the original fluid module 12' can be removed from drive module 14' and the spare fluid module 12' can be mounted to drive module 14'. The user has thereby replaced the wear components of handheld sprayer 10' and can continue operating handheld sprayer 10'. As such, the user can replace all of the wear parts by breaking static connection 16' and pulling fluid module 12' off of drive module 14'. This provides for faster repair of handheld sprayer 10' than disassembling the individual fluid contacting components of handheld sprayer 10'.

In some cases, different fluid modules 12' can be configured differently for different spray performance. For example, a piston 54 in one fluid module 12' can have a different diameter than another piston 54 in a different fluid module 12', thus providing higher displacement and higher spray output. When higher spray volume output is desired, the fluid module 12' with the larger diameter piston 54 can be mounted to drive module 14'. The fluid module 12' having the smaller diameter piston 54 can then be mounted to drive module 14' for higher spray pressure and/or efficiency.

Figure 8:
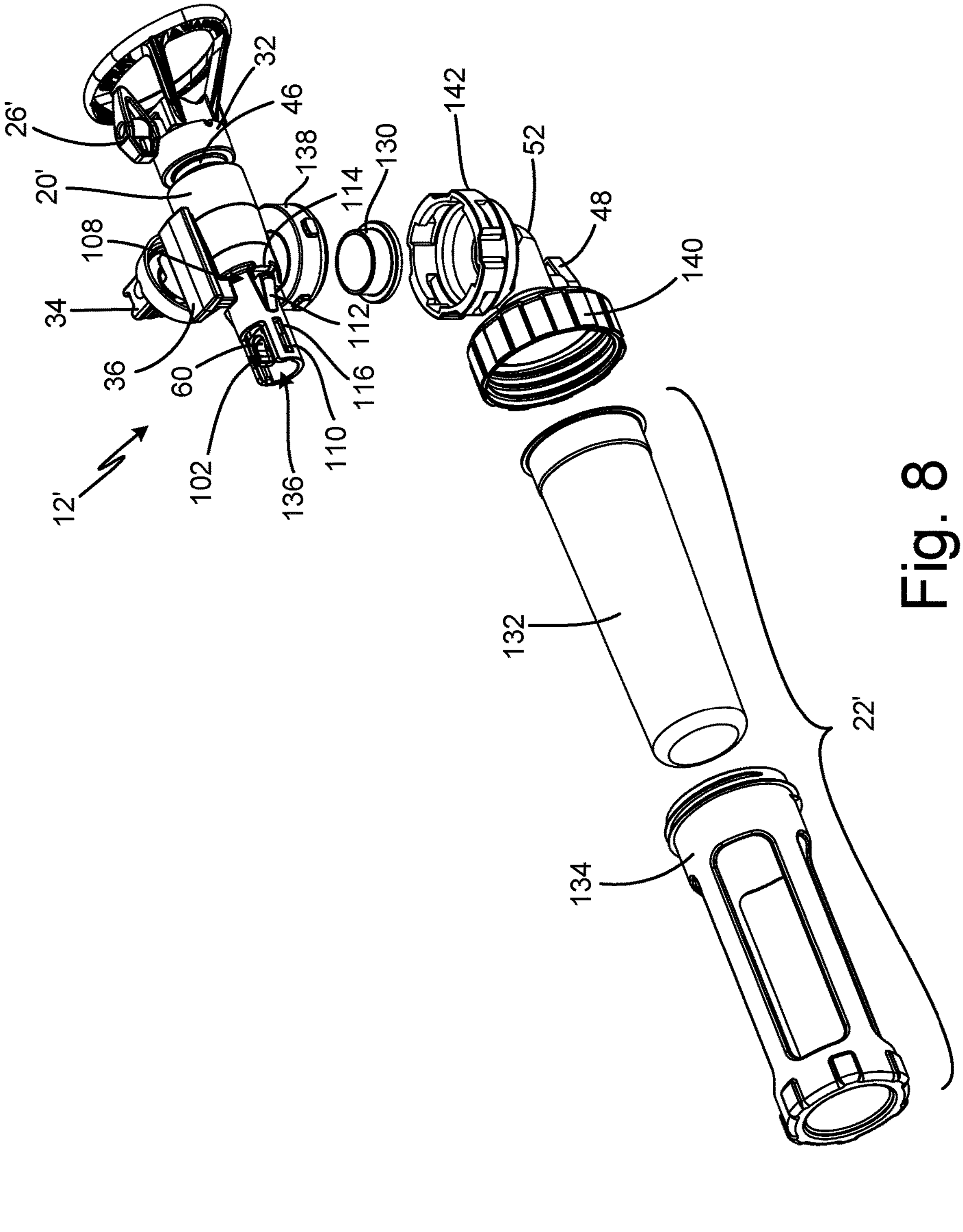
FIG. 8 is a partially exploded view of a fluid module.

FIG. 8 is a partially exploded view of fluid module 12'. Pump housing 20', reservoir 22', spray tip 26', tip housing 32, priming valve 34, valve housing 46, reservoir valve 48, elbow connector 52, receiver 60, and spacer 130 are shown. Reservoir 22' includes liner 132 and cage 134. Pump housing 20' includes fitting 36, stop 108, slot 110, open groove 136, and lower coupling 138. Stop 108 includes ramp 112 and groove 114. Elbow connector 52 includes cap 140 and housing coupling 142. Receiver 60 includes socket 102 and projection 116.

Tip housing 32 is mounted to valve housing 46. Spray tip 26' is rotatably disposed in tip housing 32. Valve housing 46 is mounted to pump housing 20'. Priming valve 34 is also mounted to pump housing 20' and can be actuated by the user to facilitate priming of pump 24' (best seen in FIG. 3B).

Fitting 36 projects from a top of pump housing 20' and is configured to connect with slot 44 (best seen in FIGS. 5A and 5B) to facilitate the static connection 16' (FIG. 1) between fluid module 12' and drive module 14' (best seen in FIGS. 2A-3A). Open groove 136 is disposed at a rear end of pump housing 20', opposite an end of pump housing 20' connected to valve housing 46. Receiver 60 is disposed within open groove 136 and configured to reciprocate within open groove 136. Open groove 136 is open on a top side to facilitate connection between drive connector 94 (best seen in FIGS. 3B-4B) and socket 102 of receiver 60, thereby facilitating dynamic connection 18' (FIG. 1). Stops 122 are disposed on opposite lateral sides of pump housing 20' and are configured to engage with locking mechanism 118 (best seen in FIGS. 6A and 6B) to maintain static connection 16'. Ramp 112 extends axially along pump housing 20' to groove 114. Groove 114 is configured to be engaged by locking mechanism 118 to lock static connection 16'.

Lower coupling 138 projects from a lower end of pump housing 20'. Lower coupling 138 is configured to engage with housing coupling 142 of elbow connector 52 to secure elbow connector 52 to pump housing 20'. The connection between lower coupling 138 and housing coupling 142 can be a bayonet type connection. It is understood, however, that other couplings can be utilized, such as a threaded or press-fit connection. Spacer 130 is disposed within elbow connector 52 and at the interface between lower coupling 138 and housing coupling 142.

Reservoir 22' includes liner 132, which can be a flexible, collapsible polymer container for contacting and holding paint or other fluids. As paint is withdrawn, liner 132 collapses. A collapsible liner 132 can prevent air from entering into the paint channel and into the pump to maintain priming of the pump. Liner 132 sits within cage 134. Cage 134 has side apertures to allow the exterior of liner 132 to be exposed to atmospheric pressure and to avoid a vacuum condition from forming between the outside of liner 132 and the inner surface of cage 134. Cap 140 is formed on elbow connector 52 and is configured to connect to cage 134. For example, cap 140 can connect to cage 134 by interfaced threading, and a lip of liner 132 can be pinched and sealed between cap 140 and cage 134. While reservoir 22' is described as including liner 132 and cage 134, it is understood that any suitable container for storing a fluid supply can be utilized. For example, reservoir 22' can be a bottle (e.g., without liner 132), the bottle being formed from polymer and having a single opening that is threaded into cap 140. Such a bottle can be a single piece instead of the multi-piece reservoir 22' shown. In other examples, reservoir 22' can include a bag holding the paint and cage 134 may not be present. In such an example, the bag can connect directly to cap 140.

Figure 9A:
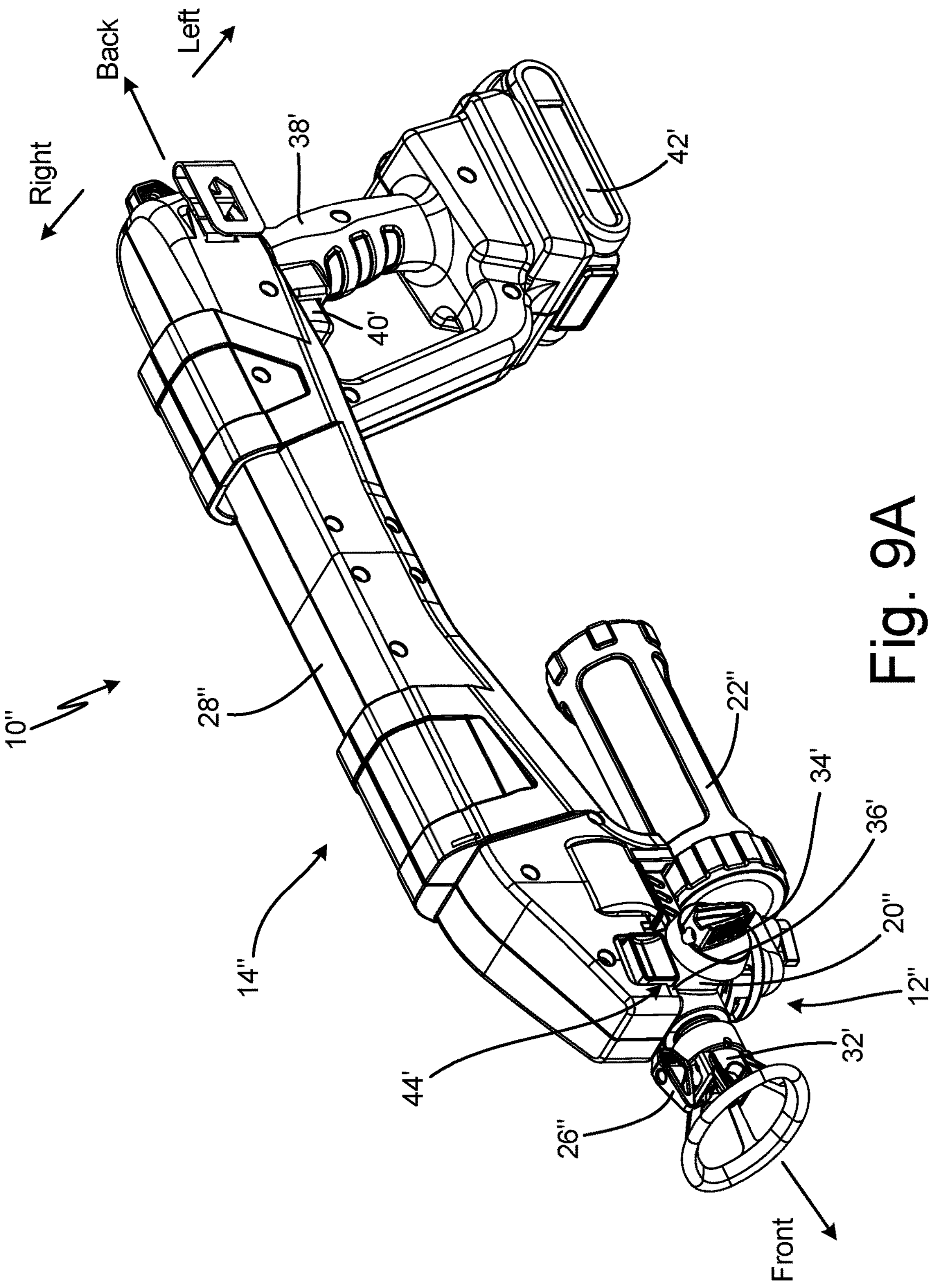
FIG. 9A is an isometric view of another handheld sprayer.
Figure 9B:
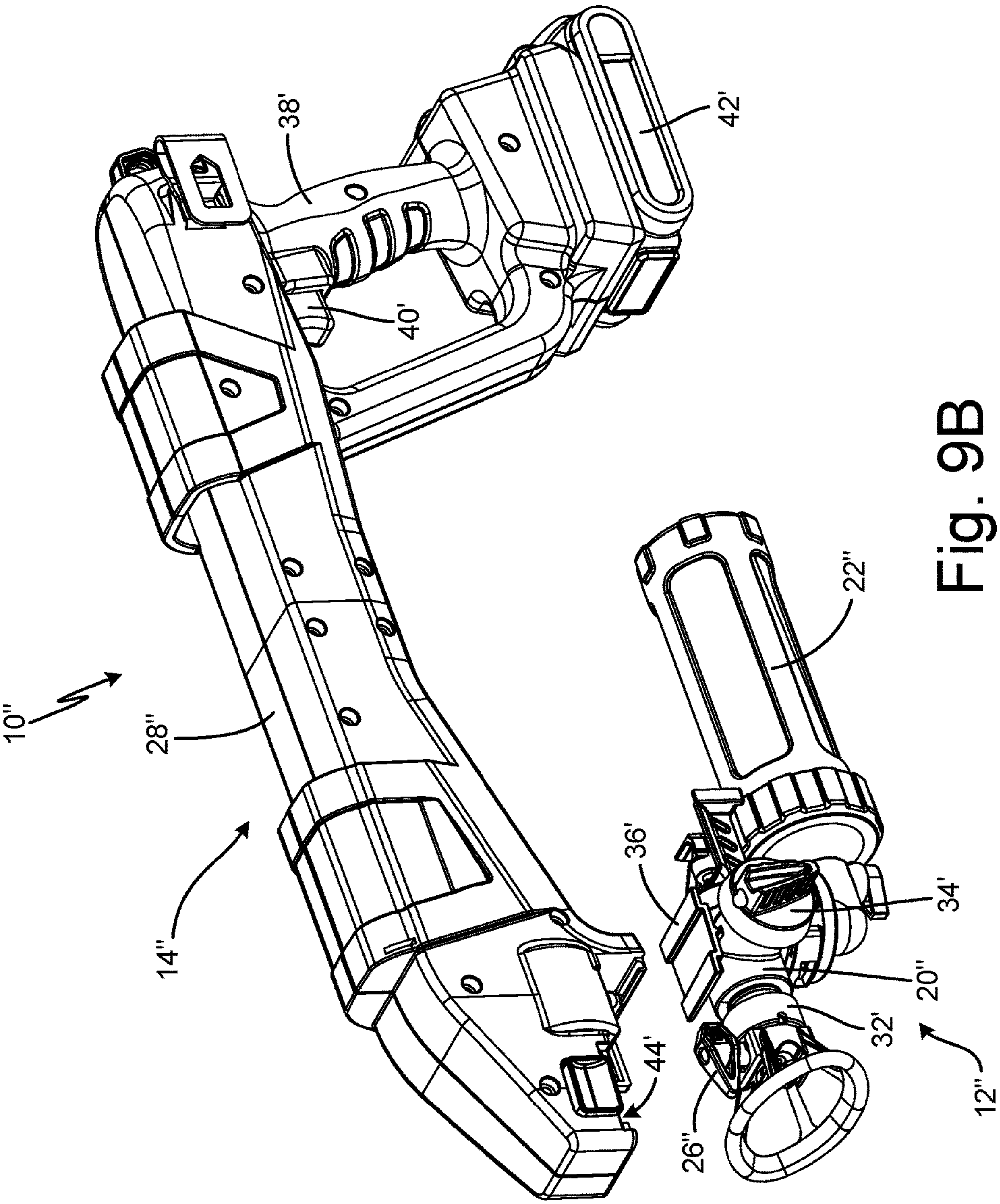
FIG. 9B is an exploded view of the handheld sprayer shown in FIG. 9A.
Figure 9C:
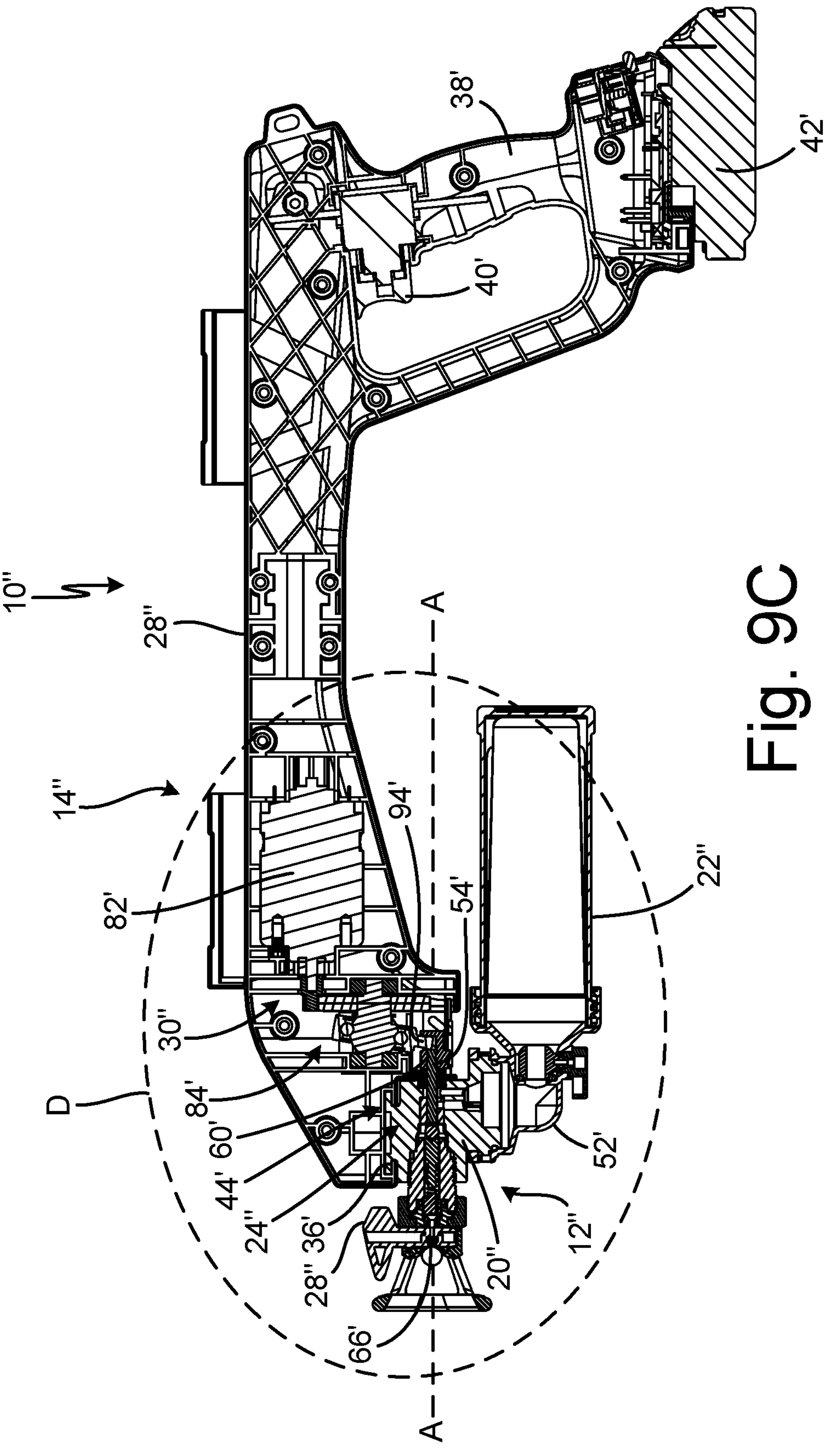
FIG. 9C is a cross-sectional view of the handheld sprayer shown in FIG. 9A.

FIG. 9A is an isometric view of handheld sprayer 10". FIG. 9B is an exploded view of handheld sprayer 10". FIG. 9C is a cross-sectional view taken along line C-C in FIG. 9A. FIGS. 9A-9C will be discussed together. Handheld sprayer 10" is the same as handheld sprayer 10 (FIG. 1) and handheld sprayer 10' (FIGS. 2A-7B), except where shown and/or described to be different. Common reference numbers are used for similar components. Components having common base reference numbers (e.g. 10, 10', and 10"; 100, 100', 100") can be identical unless shown and/or described to be different. For the sake of brevity, descriptions of components, features, functions, and benefits of the embodiment of FIGS. 9A-13 that are similar to that of the embodiments shown in FIGS. 1-8 are not repeated herein but are equally applicable to the embodiment shown in FIGS. 9A-13.

Similar to handheld sprayers 10, 10' handheld sprayer 10" includes drive module 14" and fluid module 12" that are connected by each of static connection 16" and dynamic connection 18". Static connection 16" physically secures fluid module 12" to drive module 14". In the example shown, static connection is formed between pump housing 20" and drive housing 28", such that drive housing 28" supports the various components of fluid module 12" via pump housing 20". In the example shown, fluid module 12" is mounted to and dismounted from drive module 14" at static connection 16" by sliding fluid module 12" laterally onto and off of drive module 14".

Drive housing 28" contains various components of drive module 14", such as drive assembly 30". While drive housing 28" is shown as elongate, it is understood that drive housing 28" can of any desired configuration depending on the spray task. For example, an elongate drive housing 28" is useful for ground marking. A more compact drive housing 28" is useful for spraying on walls or other structures.

Handle 38' is configured to be grasped by the user during spraying. Handle 38' can be grasped by a single hand of the user to manipulate handheld sprayer 10" during spraying. In some examples, handle 38' can be integrally formed with drive housing 28". It is understood, however, that handle 38' can be separately formed and attached to drive housing 28". Trigger 40' projects from handle 38'. The user actuates trigger 40' to control spraying by handheld sprayer 10". Power source 42' is mounted to drive housing 28" and is configured to provide electric power to components of handheld sprayer 10".

Dynamic connection 18" is formed between drive assembly 30" and pump 24". Drive assembly 30" is configured to generate rotational motion and convert the rotational motion into linear reciprocating motion. Drive assembly 30" outputs the reciprocating linear motion to pump 24" to power pump 24". Specifically, motor 82' generates a rotational output and provides the rotational output to mechanical drive 84'. Mechanical drive 84' converts the rotary motion from motor 82' into linear reciprocating motion. Pump 24" is connected to mechanical drive 84' at dynamic connection 18" and is powered by the linear reciprocating motion received from mechanical drive 84'. Specifically, piston 54' of pump 24" is driven both forward, through a pump stroke, and rearward, through a suction stroke, by drive connector 94' of mechanical drive 84'. Drive connector 94' is disposed in socket 102' of receiver 60' and is configured to drive piston 54' by connection with receiver 60'. Pump 24" draws fluid from reservoir 22", though reservoir valve 48' and elbow connector 52', and drives the fluid downstream to spray tip 26" where the fluid is ejected as a spray through nozzle 66'.

Figure 10A:
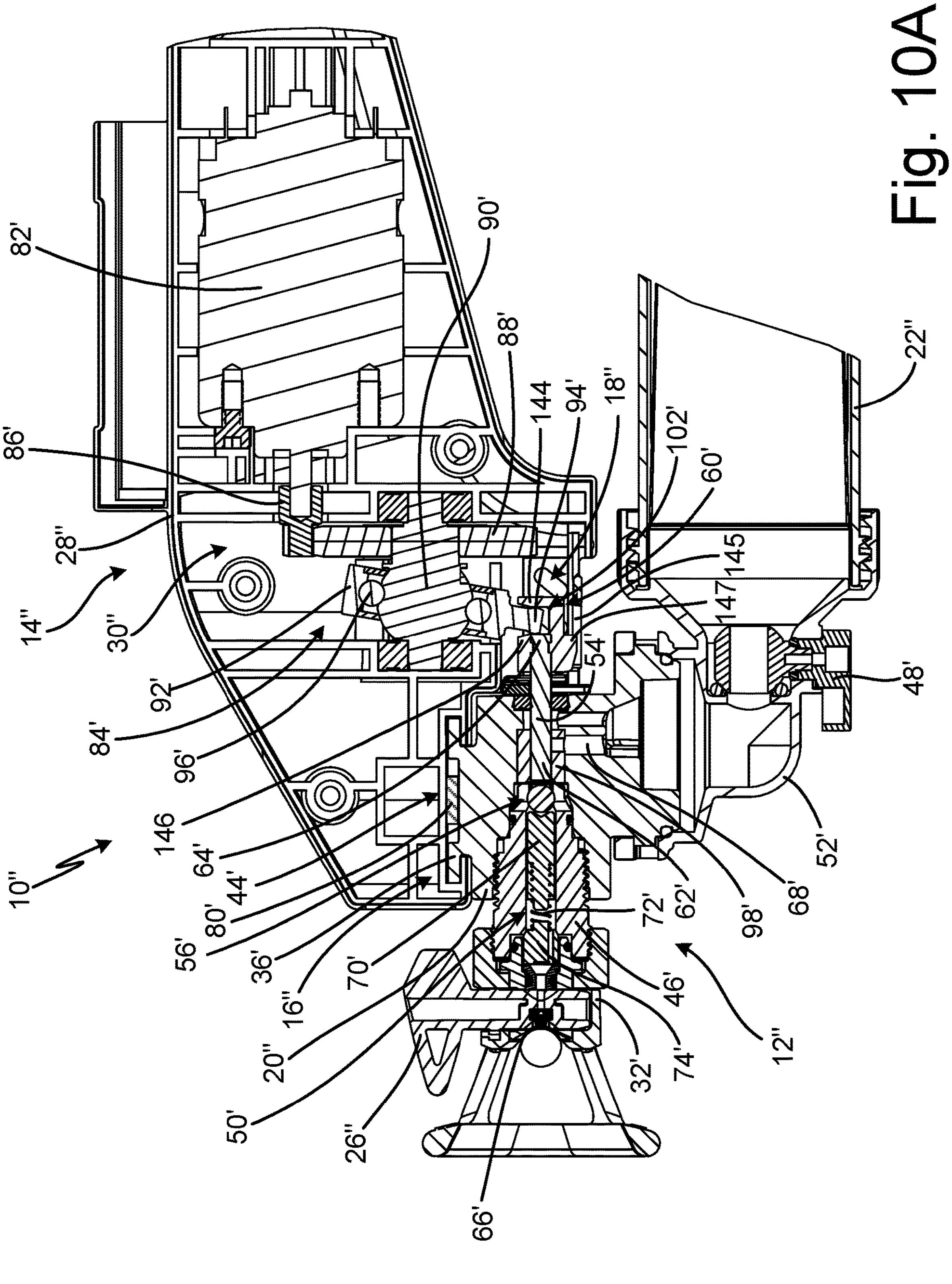
FIG. 10A is an enlarged view of detail D in FIG. 9C.
Figure 10B:
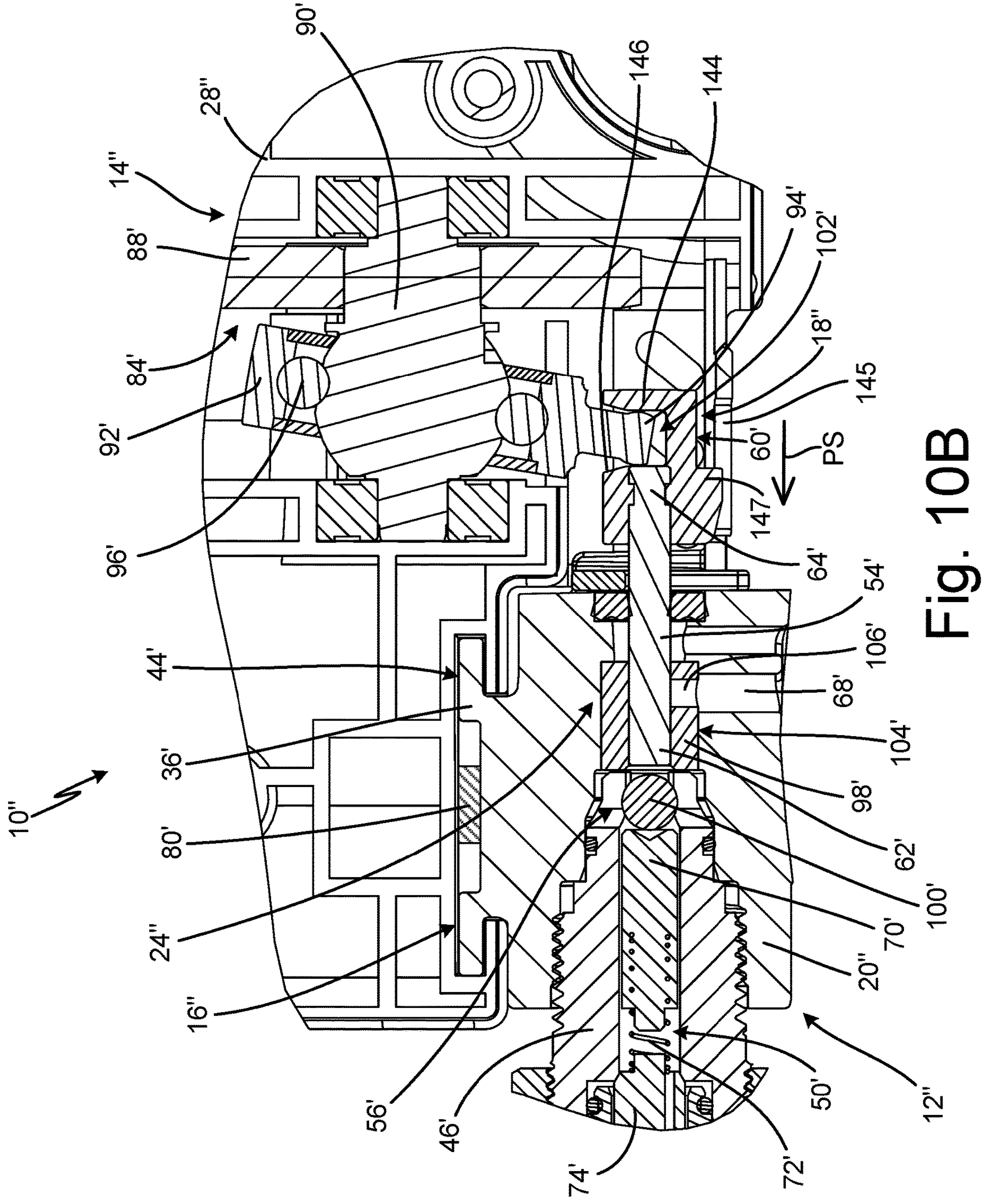
FIG. 10B is a detailed cross-sectional view of a portion of a handheld sprayer showing the piston in a pump stroke.
Figure 10C:
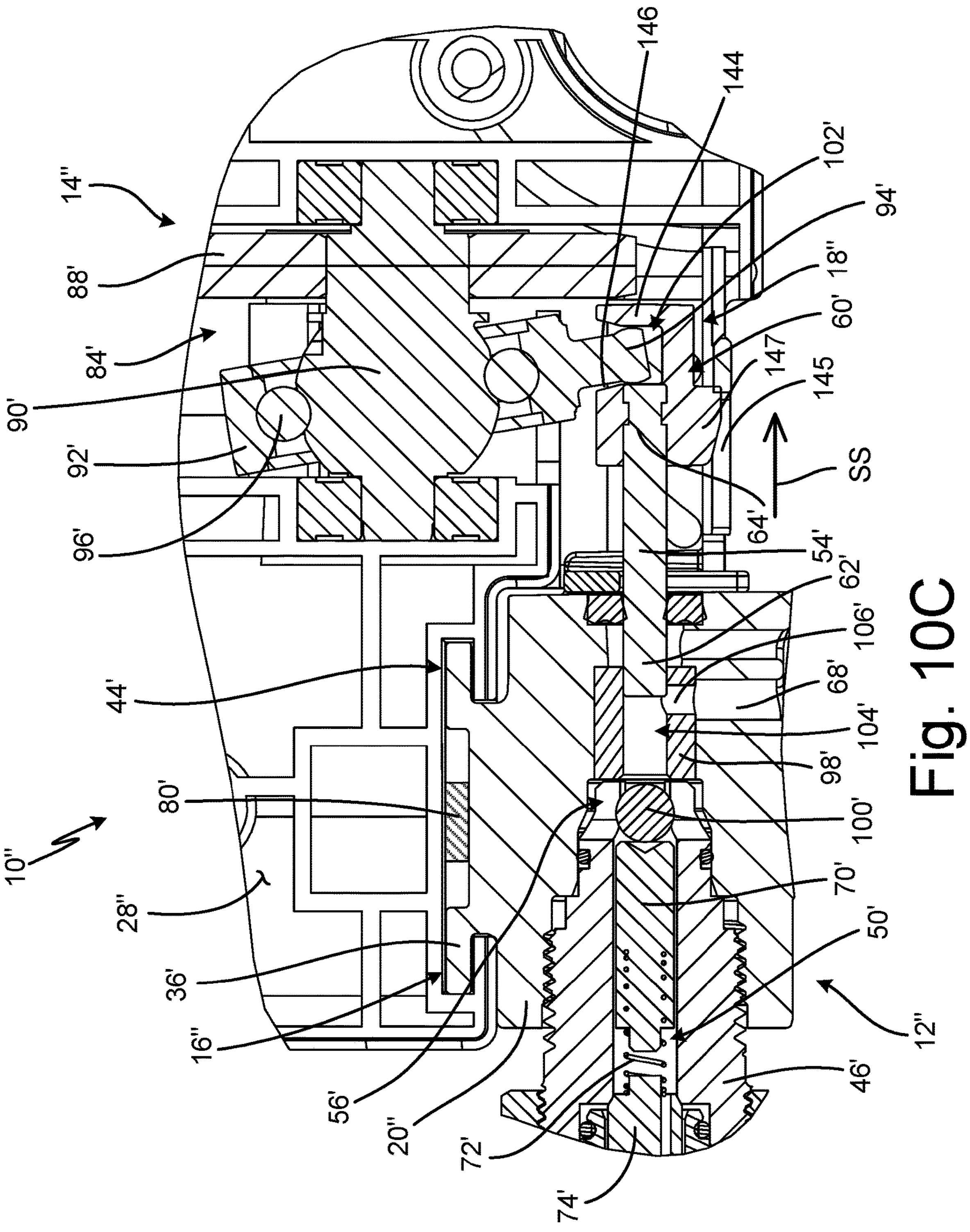
FIG. 10C is a detailed cross-sectional view of a portion of the handheld sprayer showing the piston in a suction stroke.

FIG. 10A is an enlarged cross-sectional view of detail D in FIG. 9C. FIG. 10B is a detailed cross-sectional view showing dynamic connection 18" between pump 24" and mechanical drive 84', with piston 54' in a forward position of a pump stroke. FIG. 10C is a detailed cross-sectional view showing dynamic connection 18" between pump 24" and mechanical drive 84', with piston 54' in a rearward position of a suction stroke. FIGS. 10A-10C will be discussed together. Handheld sprayer 10" includes fluid module 12", drive module 14", static connection 16", and dynamic connection 18". Fluid module 12" includes pump housing 20", reservoir 22", pump 24", spray tip 26", tip housing 32', valve housing 46', reservoir valve 48', spray valve 50', elbow connector 52', and cylinder 98'. Pump housing 20" includes fitting 36', fluid inlet 68', and lower slot 145. Pump 24" includes piston 54', check valve 56', and receiver 60'. Piston 54' includes first end 62' and second end 64'. Check valve 56' includes ball 100'. Spray tip 26" includes nozzle 66'. Receiver 60' includes socket 102', back end 144, front end 146, and lower fin 147. Spray valve 50' includes valve stop 70', valve spring 72', and flow regulator 74'. Cylinder 98' includes port 106' and defines chamber 104'. Drive housing 28" and drive assembly 30" of drive module 14" are shown. Drive housing 28" includes slot 44'. Drive assembly 30" includes motor 82' and mechanical drive 84'. Motor 82' includes pinion 86'. Mechanical drive 84' includes gear 88', eccentric 90', collar 92', drive connector 94', and bearings 96'. Handheld sprayer 10" further includes safety sensor 80'.

Drive module 14" is configured to power pump 24" to cause pumping by pump 24". Drive assembly 30" is disposed in and supported by drive housing 28". Motor 82' rotates gear 88' via a pinion 86'. Gear 88' is attached to eccentric 90' such that rotation of gear 88' drives rotation of eccentric 90'. Collar 92' surrounds eccentric 90' and is configured to wobble due to rotation of eccentric 90'. Drive connector 94' projects from collar 92' and reciprocates with the wobbling of collar 92'. Safety sensor 80' is disposed at static connection 16" and is configured to sense when fluid module 12" is mounted on drive module 14" to prevent activation of drive assembly 30" when fluid module 12" is not mounted on drive module 14". Safety sensor 80' can be of any configuration suitable for sensing mounting of fluid module 12" on drive module 14", such as electronic or mechanical.

Pump 24" is at least partially disposed in pump housing 20". Pump 24" is powered by drive assembly 30". Specifically, drive assembly 30" causes reciprocation of piston 54' along spray axis A-A (FIG. 9C). Second end 64' of piston 54' is attached to receiver 60', which includes socket 102'. As shown, socket 102' is closed on both the front end 146 and back end 144 of receiver 60'. Socket 102' is open on a side of receiver 60' to facilitate side loading of fluid module 12" onto drive module 14".

Lower fin 147 extends from a bottom of receiver 60' into lower slot 145 through pump housing 20". Lower fin 147 reciprocates within lower slot 145 as receiver 60' reciprocates during operation. Lower fin 147 being within lower slot 145 prevents undesired rotation of receiver 60' during operation and ensures that each of receiver 60' and piston 54' maintain alignment on spray axis A-A during reciprocation.

During operation, pump 24" is alternatingly driven though pump strokes and suction strokes. Socket 102' having both back end 144 and front end 146 allows drive connector 94', when received in socket 102', to drive piston 54' through each of a pump stroke and a suction stroke. Drive connector 94' can push receiver 60' and piston 54' forward through a pump stroke, as shown by arrow PS in FIG. 10B, when drive connector 94' moves forward as collar 92' wobbles (e.g., due to engagement between the drive connector 94' and the receiver 60'). Drive connector 94' can pull receiver 60' and piston 54' rearward through a suction stroke, as shown by arrow SS in FIG. 10C, as drive connector 94' moves rearward due to the wobble of collar 92'. This reciprocating motion of drive connector 94' drives reciprocation of piston 54' to power pump 24. Due to the enclosed nature of socket 102', a spring (e.g., return spring 58 (best seen FIGS. 4A and 4B)) in not needed to drive piston 54' rearward through the suction stroke. Instead, movement of drive connector 54' within socket 102' drives piston 54' through each of the pump stroke (FIG. 10B) and the suction stroke (FIG. 10C) due to the connection of receiver 60' and piston 54'.

First end 62' of piston 54' extends into chamber 104' of cylinder 98' and is configured to reciprocate within chamber 104'. During the suction stroke, drive connector 94' pulls piston 54' rearward through chamber 104'. Drive connector 94' engages back end 144 of receiver 60' to pull receiver 60' rearward, thereby pulling piston 54' rearward through the suction stroke. Pulling piston 54' rearward causes ball 100' of check valve 56' to seat on the downstream end of cylinder 98'. A vacuum is created in chamber 104' as piston 54' proceeds through the suction stroke. When first end 62' uncovers port 106' fluid flows into chamber 104' through fluid inlet 68' and port 106'. At the completion of the suction stroke, drive connector 94' reverses direction and pushes piston 54' through a pump stroke.

During the pump stroke, drive connector 94' pushes receiver 60' forward, thereby pushing piston 54' forward through the pump stroke. In some examples, drive connector 94' engages front end 146 of receiver 60' to drive piston 54' through the pump stroke. In some examples, drive connector 94' engages second end 64' of piston 54' to drive piston 54' through the pump stroke. It is understood that drive connector 94' can drive piston 54' in any desired manner. Pushing piston 54' forward pressurizes the fluid in chamber 104', causing ball 100' to lift off of cylinder 98' and driving the fluid downstream through check valve 56'.

Figure 11:
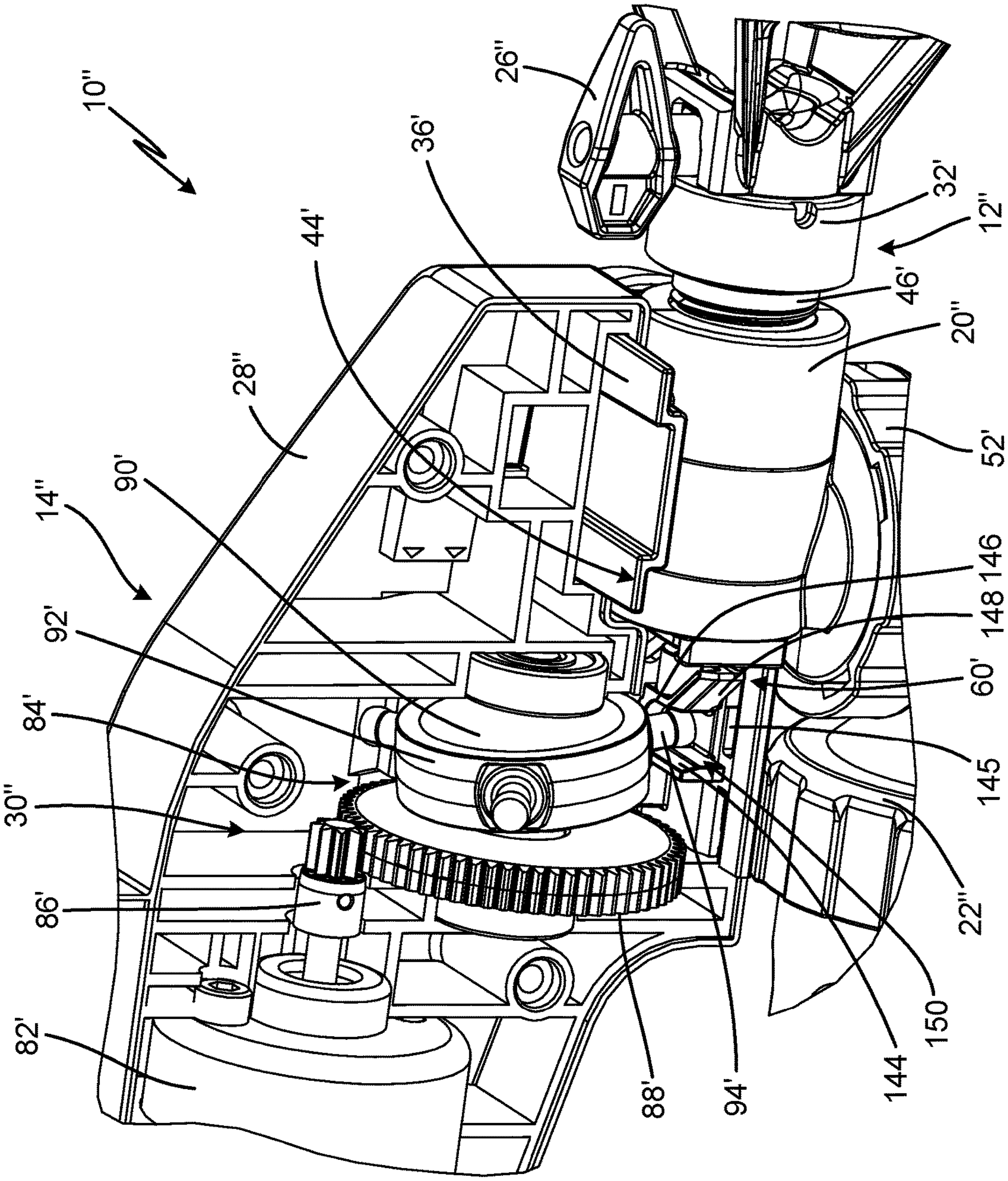
FIG. 11 is an isometric view of a front portion of a handheld sprayer with a portion of the drive housing removed.

FIG. 11 is an isometric view of a front portion of handheld sprayer 10" with a portion of drive housing 28" removed. Handheld sprayer 10" includes fluid module 12", drive module 14", static connection 16", and dynamic connection 18". Pump housing 20", reservoir 22", spray tip 26", tip housing 32', valve housing 46', and elbow connector 52' of fluid module 12" are shown. Pump housing 20" includes fitting 36' and lower slot 145. Receiver 60' is shown, and receiver 60' includes socket 102', back end 144, front end 146, slanted wall 148, and side opening 150. Drive housing 28" and drive assembly 30" of drive module 14" are shown. Slot 44' of drive housing 28" is shown. Drive assembly 30" includes motor 82' and mechanical drive 84'. Gear 88', eccentric 90', collar 92', and drive connector 94' of mechanical drive 84' are shown.

Fluid module 12" is attached to drive module 14" by each of static connection 16" and dynamic connection 18". Fluid module 12" is supported by drive module 14" via static connection 16". Fluid module 12" is powered by drive module 14" via dynamic connection 18". In the example shown, static connection 16" is made and broken via lateral movement of fluid module 12" relative to drive module 14".

Fitting 36' projects from a top of pump housing 20". Fitting 36' has a T beam profile to mate with slot 44' formed in drive housing 28". Slot 44' is oriented laterally, as opposed to slot 44' (best seen in FIGS. 5A and 5B) that is oriented axially. The inner surface of slot 44' and the outer surface of fitting 36' are complementary to fit in a lock-and-key manner for a secure, but removable fit. During installation and removal of fluid module 12" from drive module 14", fitting 36' is slid laterally into and out from slot 44', as further shown herein.

Dynamic connection 18" is formed simultaneously with static connection 16" during mounting of fluid module 12" on drive module 14". As fluid module 12" is shifted laterally onto drive module 14", receiver 60' receives drive connector 94' within socket 102'. Side opening 150 is disposed on a lateral side of receiver 60'. Side opening 150 is disposed between front end 146 and back end 144 of receiver 60'. Slanted wall 148 projects from front end 146 both forward and laterally relative to socket 102' of receiver 60'. Slanted wall 148 is configured to facilitate proper alignment of drive connector 94' within socket 102' as fluid module 12" is mounted on drive module 14". For example, if there is an axial misalignment between drive connector 94' and socket 102' as fluid module 12" is slid onto drive module 14", slanted wall 148 can contact drive connector 94', and drive connector 94' will cause piston 54' to shift axially due to the force exerted on slanted wall 148 by drive connector 94'. The axial movement of piston 54' aligns drive connector 94' with socket 102' to ensure that dynamic connection 18" is properly made. As such, slanted wall 148 can be considered to guide drive connector 94' into socket 102'.

Side opening 150 is open to allow drive connector 94' to enter socket 102' through side opening 150 when fluid module 12" is being mounted to drive module 14". Drive connector 94' is thus disposed between front end 146 and back end 144 such that drive connector 94' can directly power both the pump stroke (FIG. 10B) and suction stroke (FIG. 10C) of pump 26" (best seen in FIG. 10A). During the pump stroke, drive connector 94' is driven forward and pushes on front end 146 of receiver 60', thereby driving piston 54' forward via receiver 60'. During the suction stroke, drive connector 94' is driven rearward and pushes on back end 144, thereby pulling piston 54' rearward via receiver 60'. Likewise during removal, drive connector 94' exits socket 102' through side opening 150 as fluid module 12" is being dismounted from drive module 14".

Figure 12A:
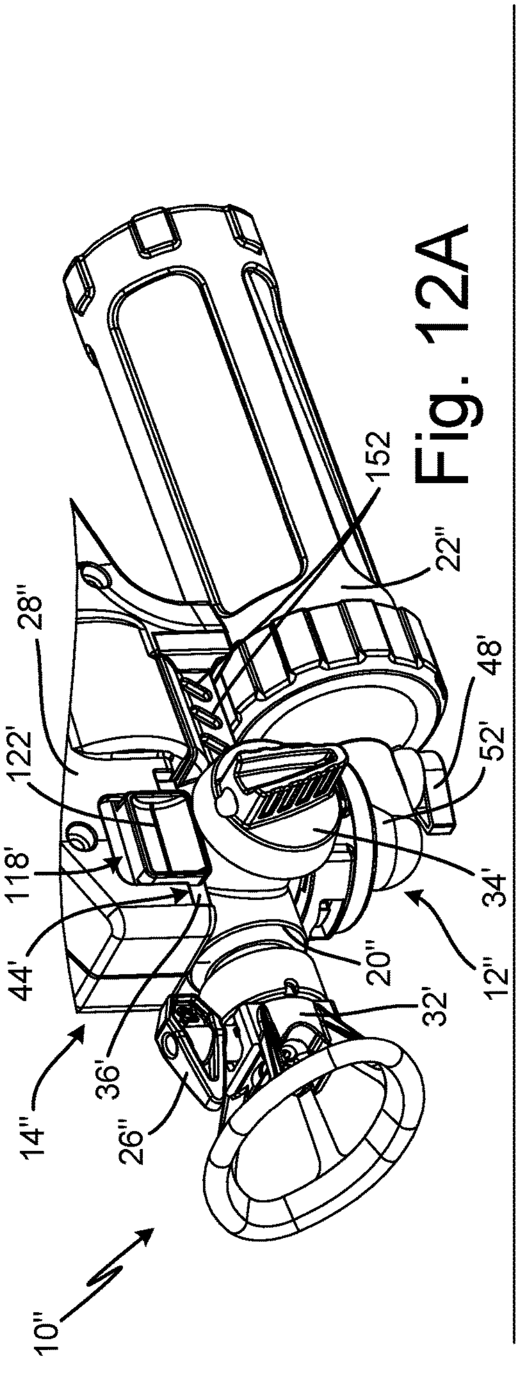
FIG. 12A is an isometric view showing a portion of a handheld sprayer.
Figure 12B:
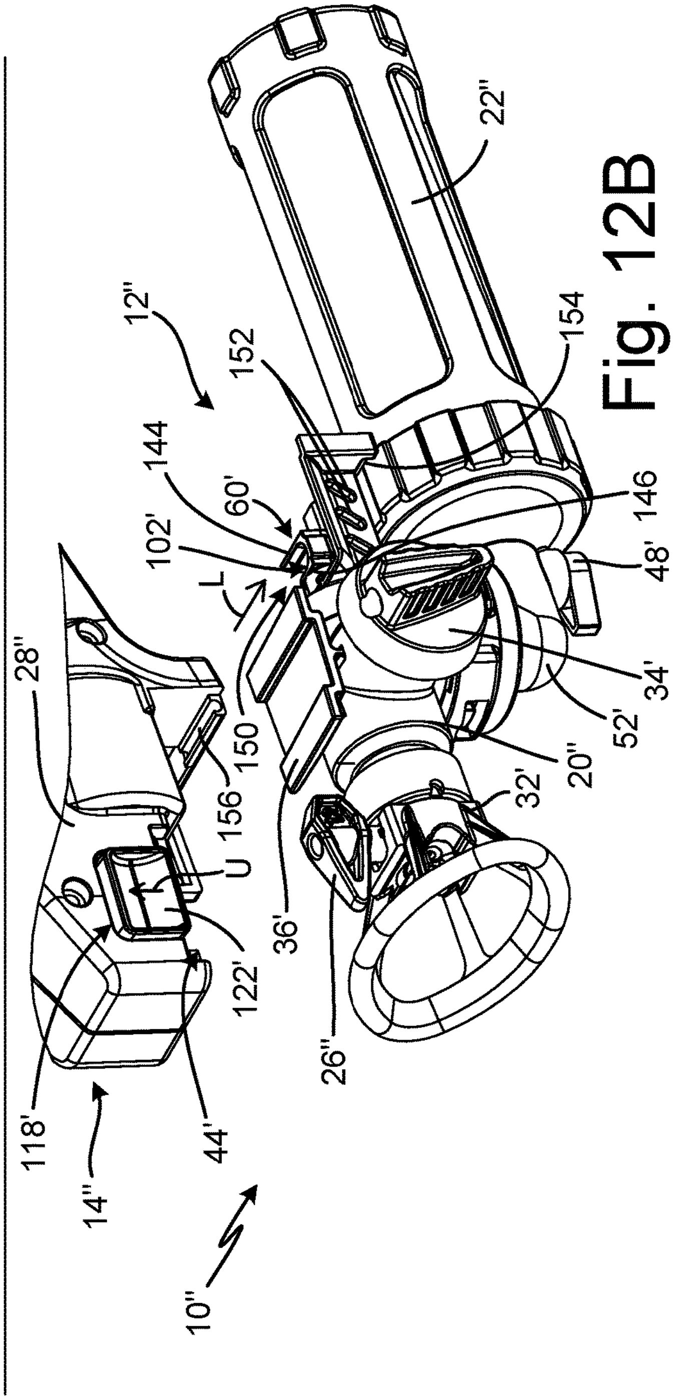
FIG. 12B is an exploded view of the portion of the handheld sprayer shown in FIG. 12A
Figure 12C:
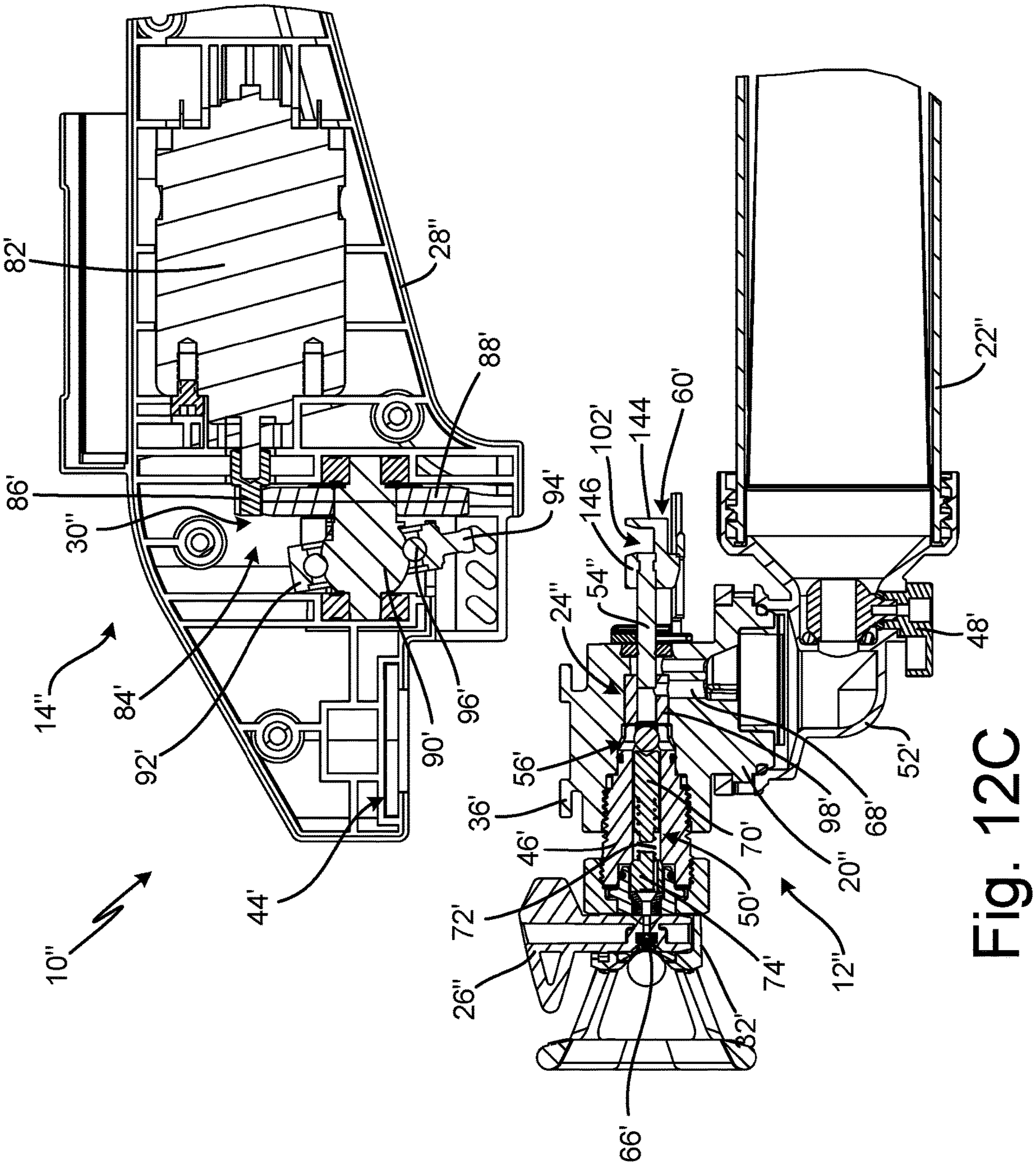
FIG. 12C is a cross-sectional, exploded view of a portion of the handheld sprayer

FIG. 12A is an isometric view showing a portion of handheld sprayer 10". FIG. 12B is an exploded view of the portion of handheld sprayer 10" shown in FIG. 12A. FIG. 12C is a cross-sectional exploded view of the portion of handheld sprayer 10" shown in FIG. 12B. FIGS. 12A-12C will be discussed together. Fluid module 12" includes pump housing 20", reservoir 22", pump 24", spray tip 26", tip housing 32', priming valve 34', valve housing 46', reservoir valve 48', spray valve 50', elbow connector 52', and cylinder 98'. Pump housing 20" includes fitting 36', fluid inlet 68', apertures 152, and projection 154. Pump 24" includes piston 54', check valve 56', and receiver 60'. Spray tip 26" includes nozzle 66'. Spray valve 50' includes valve stop 70', valve spring 72', and flow regulator 74'. Socket 102', back end 144, front end 146, and side opening 150 of receiver 60' are shown. Drive housing 28", drive assembly 30", and locking mechanism 118' of drive module 14" are shown. Drive housing 28" includes slot 44' and groove 156. Drive assembly 30" includes motor 82' and mechanical drive 84'. Motor 82' includes pinion 86'. Mechanical drive 84' includes gear 88', eccentric 90', collar 92', drive connector 94', and bearings 96'. Locking mechanism 118' includes catch 122'.

Locking mechanism 118' is disposed on drive module 14" and is configured to lock static connection 16" between fluid module 12" and drive module 14. As such, locking mechanism 118' maintains fluid module 12" on drive module 14. Fitting 36 extends into slot 44' to form static connection 16. In the example shown, catch 122' is a panel that is configured to cover the open end of slot 44' when locking mechanism 118' is in the locked state (shown in FIG. 12A). One or more springs (not shown) can bias catch 122' downwards or axially over the open end of slot 44'. The user can actuate locking mechanism 118' to an unlocked state to facilitate disengagement of fluid module 12" from drive module 14" by simply pushing and/or pulling catch 122' such that catch 122' does not cover the open end of slot 44'. For example, the user can push catch 122' upwards, as indicated by arrow U in FIG. 12B, to uncover the open end of slot 44'. With catch 122' not covering the open end of slot 44', fluid module 12" can be slid laterally relative to drive module 14", as indicated by arrow L in FIG. 12B, such that fitting 36' slides out of slot 44'. In some examples, locking mechanism 118' can include detents (in addition to or in place of springs) to hold catch 122' in the down position (blocking the open end of slot 44') or to hold catch 122' in the up position (not blocking the open end of slot 44).

Projection 154 extends from a lower rear end of pump housing 20". Fitting 36' projects from a top side of pump housing 20". With fluid module 12" mounted on drive module 14", projection 154 is disposed in groove 156 formed in drive housing 28", and fitting 36' is disposed in slot 44'. Connecting pump housing 20" to drive housing 28" at both the slot 44'/fitting 36' interface and the groove 156/projection 154 interface provides balance between fluid module 12" and drive module 14" to ensures a steady connection between drive assembly 30" and pump 24" as piston 54' is driven through each of the pump stroke (FIG. 10B) and the suction stroke (FIG. 10C). As such, static connection 16" can be formed by both a forward connection (at the slot 44'/fitting 36' interface) and an aft connection (at the groove 156/projection 154 interface).

Apertures 152 extend through a side of pump housing 20" adjacent receiver 60'. Apertures 152 allow the user to view the relative position of drive connector 94' (best seen in FIGS. 10A-10C) to side opening 150 of receiver 60' as fluid module 12" is mounted on drive module 14". As such, the user can pull or push receiver 60' to adjust the position of receiver 60' to ensure proper alignment between receiver 60' and drive connector 94' during installation.

It is noted that fluid module 12" slides sideways to mount on and dismount from drive module 14". Such side-sliding motion engages and disengages drive connector 94' from receiver 60'. In various other embodiments, fluid module 12" can be vertically installed on drive module 14" from a bottom of drive module 14". As such, fluid module 12" can slide vertically to mount and dismount from drive module 14". Such embodiments can include a vertically oriented fitting 36' (on either of pump housing 20" or drive housing 28") sliding into a vertically oriented slot 44' (on either the other of pump housing 20" or drive housing 28), or can include any other desired attachment mechanism. In addition, in such examples socket 102' of reservoir 22" can be fully enclosed while still receiving drive connector 94'. As discussed above, fluid module 12" can also be configured to slide axially to mount from a front end of drive module 14".

Figure 13:
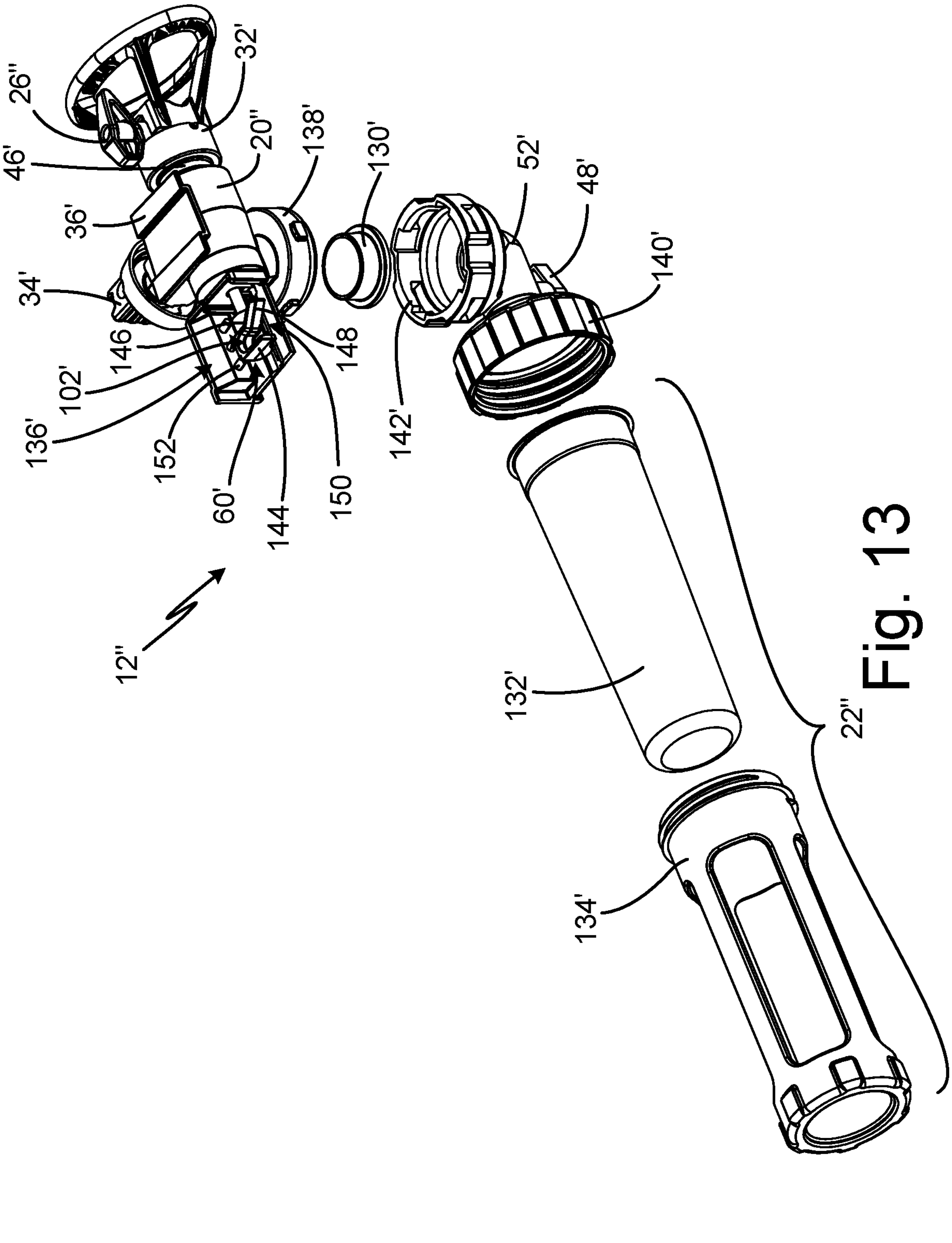
FIG. 13 is a partially exploded view of a fluid module.

FIG. 13 is a partially exploded view of fluid module 12". Pump housing 20", reservoir 22", spray tip 26", tip housing 32', priming valve 34', valve housing 46', reservoir valve 48', elbow connector 52', receiver 60', and spacer 130' are shown. Reservoir 22" includes liner 132' and cage 134'. Pump housing 20" includes fitting 36', open groove 136', lower coupling 138', and apertures 152. Elbow connector 52' includes cap 140' and housing coupling 142'. Receiver 60' includes socket 102', back end 144, front end 146, slanted wall 148, and side opening 150.

Tip housing 32' is mounted to valve housing 46'. Spray tip 26" is rotatably disposed in tip housing 32'. Valve housing 46' is mounted to pump housing 20". Priming valve 34' is also mounted to pump housing 20" and can be actuated by the user to facilitate priming of pump 24" (best seen in FIG. 10A).

Fitting 36' projects from a top of pump housing 20" and is configured to connect with slot 44' (best seen in FIGS. 12A-12B) to facilitate the static connection between fluid module 12" and drive module 14" (best seen in FIGS. 9A-9C). Open groove 136' is disposed at a rear end of pump housing 20", opposite an end of pump housing 20" connected to valve housing 46'. Receiver 60' is disposed within open groove 136'. Open groove 136' is open at a side and top of pump housing 20" to facilitate side loading of fluid module 12" onto drive module 14". As shown, open groove 136' is further open on a rear end of pump housing 20".

Receiver 60' is disposed at a rear end of pump housing 20" within open groove 136'. Receiver 60' is mounted to piston 54' and is configured to transmit driving forces from drive assembly 30" (best seen in FIG. 10A) to piston 54' to power pump 24". Side opening 150 extends between front end 146 and back end 148 of receiver 60'. Side opening 150 facilitates side mounting of fluid module 12" on drive module 14". Socket 102' of receiver 60' is configured to receive drive connector 94' (best seen in FIGS. 10A-10C) through side opening 150 as fluid module 12" is mounted on drive module 14". Slanted wall 148 extends from front end 146 of receiver 60'. Slanted wall 148 is configured to guide drive connector 94' into socket 102' during mounting of fluid module 12". Apertures 152 extend through a portion of pump housing 20" defining open groove 136'. Apertures 152 allow the user to view the position of receiver 60' within open groove 136' from outside of pump housing 20".

Lower coupling 138' projects from a lower end of pump housing 20". Lower coupling 138' is configured to engage with housing coupling 142' of elbow connector 52' to secure elbow connector 52' to pump housing 20". The connection between lower coupling 138' and housing coupling 142' can be a bayonet type connection. It is understood, however, that other couplings can be utilized, such as a threaded or press-fit connection. Spacer 130' is disposed within elbow connector 52' and at the interface between lower coupling 138' and housing coupling 142'.

Reservoir 22" includes liner 132', which can be a flexible, collapsible polymer container for contacting and holding paint or other fluids. As paint is withdrawn, liner 132' collapses. A collapsible liner 132' can prevent air from entering into the paint channel and into the pump to maintain priming of the pump. Liner 132' sits within cage 134'. Cage 134' has side apertures to allow the exterior of liner 132' to be exposed to atmospheric pressure and to avoid a vacuum condition from forming between the outside of liner 132' and the inner surface of cage 134'. Cap 140' is formed on elbow connector 52' and is configured to connect to cage 134'. For example, cap 140' can connect to cage 134' by interfaced threading, and a lip of liner 132' can be pinched and sealed between cap 140' and cage 134'. While reservoir 22" is described as including liner 132' and cage 134', it is understood that any suitable container for storing a fluid supply can be utilized. For example, reservoir 22" can be a bottle (e.g., without liner 132'), the bottle being formed from polymer and having a single opening that is threaded that screws into cap 140'. Such a bottle can be a single piece instead of the multi-piece reservoir 22" shown. In other examples, reservoir 22" can include a bag holding the paint, and cage 134' may not be present. In such an example, the bag can connect directly to cap 140'.

Figure 14A:
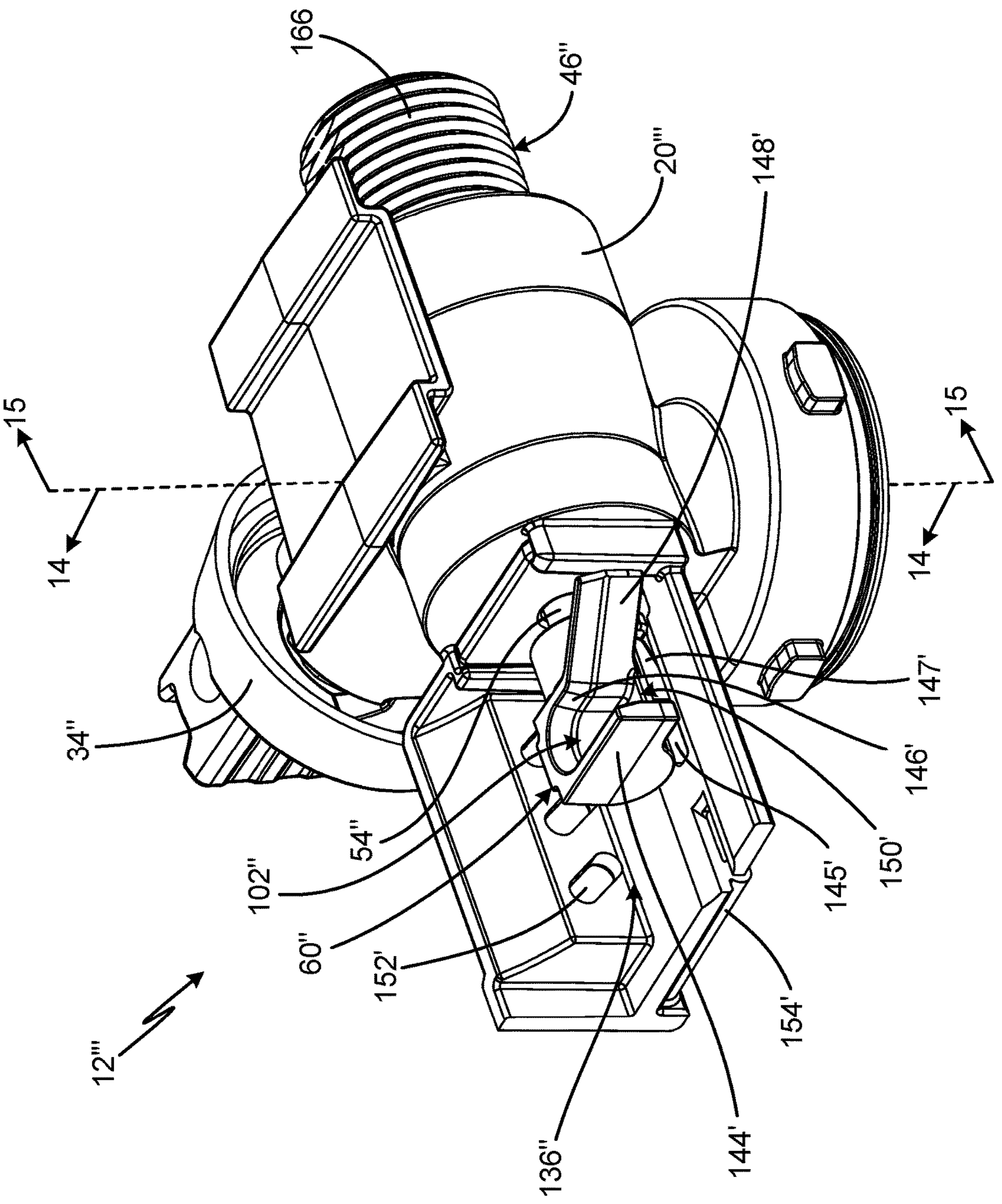
FIG. 14A is an isometric view of a portion of a fluid module.
Figure 14B:
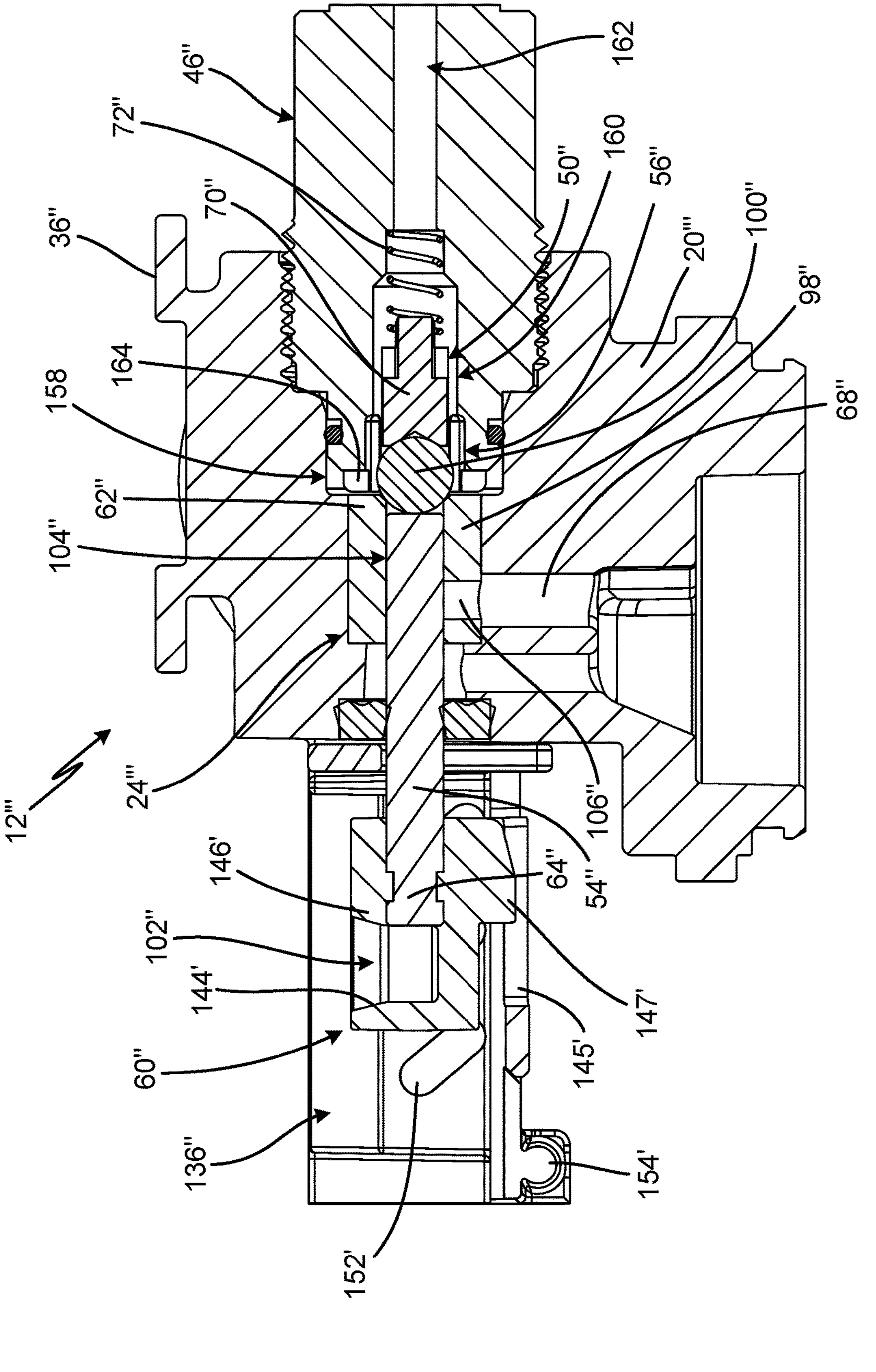
FIG. 14B is a cross-sectional view taken along line 14-14 in FIG. 14A.

FIG. 14A is an isometric view of a portion of fluid module 12'". FIG. 14B is a cross-sectional view taken along line 14-14 in FIG. 14A. FIGS. 14A and 14B will be discussed together. Pump housing 20'", pump 24'", priming valve 34", valve housing 46", spray valve 50", check valve 56", and cylinder 98" of fluid module 12'" are shown. Pump 24'" includes piston 54" and receiver 60". Piston 54" includes first end 62" and second end 64". Receiver 60" includes socket 102", front end 146', back end 144', lower fin 147', slanted wall 148', and side opening 150'. Pump housing 20'" includes fluid inlet 68", open groove 136", lower slot 145', apertures 152', projection 154', and prime chamber 158. Valve housing 46' includes upstream bore 160, downstream bore 162, priming ports 164, and threading 166. Check valve 56" includes ball 100". Spray valve 50" includes valve stop 70" and valve spring 72". Cylinder 98" defines chamber 104" and includes port 106".

Figure 15:
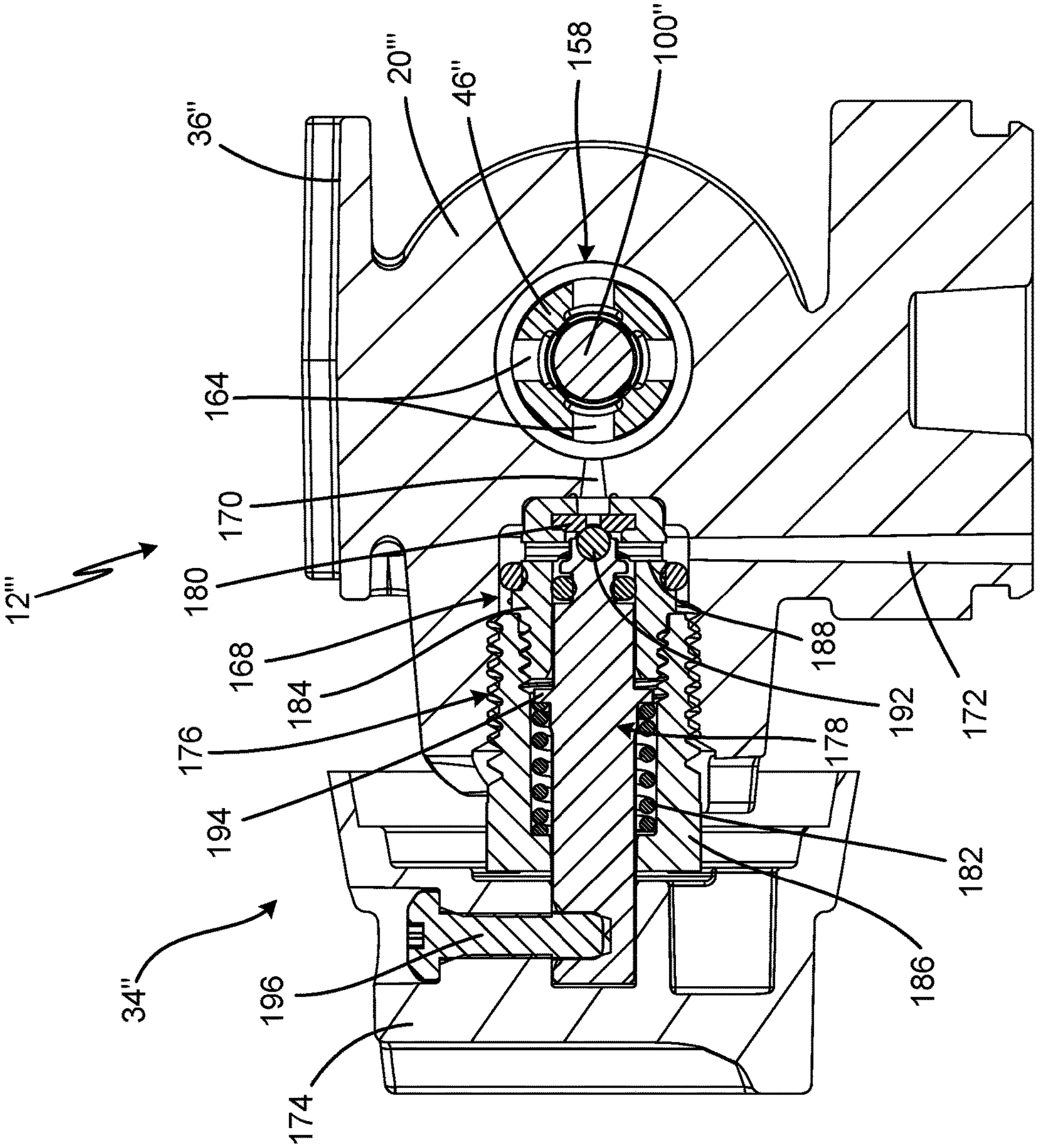
FIG. 15 is a cross-sectional view taken along line 15-15 in FIG. 14A.

Common reference numbers are used for similar components. Components having common base reference numbers (e.g. 12, 12', 12", 12'") can be identical unless shown and/or described to be different. For the sake of brevity, descriptions of components, features, functions, and benefits of the embodiments of FIGS. 1-13 that are similar to that of the embodiments shown in FIGS. 14A-15 are not repeated herein but are equally applicable.

Pump housing 20'" is configured to connect to elements of a drive module; such as drive module 14 (FIG. 1), drive module 14' (best seen in FIGS. 2A-2B), or drive module 14" (best seen in FIGS. 9A-9B), such as drive housing 28 (FIG. 1), drive housing 28' (best seen in FIGS. 2A and 2B), or drive housing 28" (best seen in FIGS. 9A and 9B), to form handheld sprayer 10 (FIG. 1), handheld sprayer 10' (FIGS. 2A-7B), or handheld sprayer 10" (FIG. 9A-12C). Other elements of fluid modules (such as elbow connectors 52, reservoirs 22, tip housings 32, and spray tips 28) are not shown, but it is understood that such elements can be connected to pump housing 20'" to form a full fluid module 12'". Projection 154' extends downward from a rear of pump housing 20'". Projection 154' is configured to mount within groove 156 (FIG. 12B) formed in drive housing 28'. The connection of projection 154' and groove 156 can form part of a static connection between fluid module 12'" and the drive module 14. In some examples, the connection between projection 154' and groove 156 can be referred to as the aft connection of the static connection.

Fitting 36" projects from a top of pump housing 20'". Fitting 36" is configured to be received in a slot, such as slot 44' (best seen in FIGS. 12A and 12B), of drive housing 28" to mount fluid module 12'" to drive module 14". The connection between fitting 36" and slot 44' can form all or part of the static connection 16 between fluid module 12'" and a drive module. In the example shown, the connection between fitting 36" and slot 44' can form the forward connection (with projection 154' and groove 156 forming the aft connection) of the static connection. In the example shown, fitting 36" is oriented transverse to spray axis A-A, to facilitate side mounting of fluid module 12'". It is understood, however, that fitting 36" can be oriented in any desired manner to facilitate various mounting arrangements. For example, fitting 36" can be oriented axially to facilitate front mounting of fluid module 12''' on drive module 14". Fitting 36" can alternatively be oriented vertically to facilitate vertical mounting of fluid module 12''' on a drive module. While pump housing 20''' is described as including fitting 36", it is understood that pump housing 20''' can include a slot, similar to slot 44', that receives a fitting of the drive housing.

Pump 24''' is at least partially disposed in pump housing 20''' and is supported by pump housing 20'''. Cylinder 98" is disposed in pump housing 20''' and is secured within pump housing 20''' by valve housing 46". Fluid inlet 68" extends through a portion of pump housing 20''' and is configured to provide a flowpath for fluid to flow to pump 24''' from a reservoir, such as reservoir 22. Port 106" is aligned with fluid inlet 68" to provide a flowpath for fluid to flow into chamber 104" defined by cylinder 98". Piston 54" is configured to reciprocate relative to pump housing 20''' on spray axis A-A. First end 62" of piston 54" is disposed in chamber 104" of cylinder 98" and is configured to reciprocate within cylinder 98". Second end 64" of piston extends out of the internal bore within pump housing 20" and is connected to receiver 60".

Receiver 60" is disposed outside of the internal passages in pump housing 20" and is mounted on second end 64" of piston 54". Receiver 60" is disposed in open groove 136" of pump housing 20". Receiver 60" can be mounted to piston 54" in any desired manner. In some examples, receiver 60" can be overmolded on second end 64" of piston 54". In other examples, receiver 60" and piston 54" can be formed as a unitary assembly.

Socket 102" is defined between front end 146' and back end 144' of receiver 60'. Socket 102" is configured to receive a drive connector 94' (best seen in FIGS. 10A-10C) of drive assembly 30" (best seen in FIG. 10A). Slanted wall 148' extends laterally and forward from front end 146'. Slanted wall 148' is configured to guide drive connector 94' into socket 102" as fluid module 12''' is mounted on drive module 14'''. While receiver 60" is shown as including slanted wall 148' extending from front end 146', it is understood that receiver 60' can additionally or alternatively include a slanted wall 148' extending laterally and rearward from back end 144'. Side opening 150' extends between front end 146' and back end 144'. Side opening 150' provides a passage through which drive connector 94' can enter and exit socket 102" as fluid module 12''' is mounted and dismounted from drive module 14'''. While receiver 60" is described as including side opening 150', it is understood that in other examples socket 102" can be fully enclosed and include a top opening to receive drive connector 94'. For example, fluid module 12''' can be configured to mount vertically on a drive module such that connector enters and exits socket 102" through the top opening. In other examples, socket 102" can be open through back end 144' to facilitate front, axial mounting of fluid module 12''' on drive module 14'.

With both back end 144' and front end 146' defining socket 102", receiver 60" can transmit both compressive forces received from the drive connector, to push piston 54" through a pump stroke, and tensile forces received from the drive connector, to pull piston 54" through a suction stroke. As such, receiver 60" transmits the linear reciprocating motion received from the drive connector to piston 54" to drive piston 54" through each of the pump stroke and the suction stroke.

Lower fin 147' extends from a bottom of receiver 60" into lower slot 145' through pump housing 20'''. Lower fin 147' reciprocates within lower slot 145' as receiver 60" reciprocates during operation. Lower fin 147' being within lower slot 145' prevents undesired rotation of receiver 60" during operation and ensures that each of receiver 60" and piston 54" are properly aligned on spray axis A-A during reciprocation. Apertures 152' extend through a lateral wall at the rear of pump housing 20'''. Apertures 152' provide viewing ports that allow the user to visually align receiver 60" with the drive connector during mounting.

Valve housing 46" is mounted to a front end of pump housing 20'''. Valve housing 46" maintains cylinder 98" within pump housing 20'''. In some examples, valve housing 46" can be permanently attached to pump housing 20''' to prevent disassembly, such as by high-torqueing, adhesive, press fitting, and/or welding. In some examples, valve housing 46" and pump housing 20''' can be formed as a unitary assembly. Upstream bore 160 extends into valve housing 46" and receives various components of check valve 56" and spray valve 50". Downstream bore 162 extends downstream from upstream bore 160 and provides a flowpath for fluid to exit valve housing 46" through the downstream face of valve housing 46". Threading 166 extends around the portion of valve housing 46" disposed outside of pump housing 20'''. Threading 166 is configured to interface with threading in a tip housing, such as tip housing 32' (best seen in FIG. 10A)) to facilitate mounting of a spray tip on fluid module 12'''.

Check valve 56" is disposed within pump housing 20''' at the downstream end of cylinder 98". In the example shown, check valve 56" includes ball 100" that is configured to seat on the downstream end of cylinder 98" when check valve 56" is closed. Valve stop 70" is disposed on a downstream side of ball 100" within upstream bore 160 of valve housing 46". Valve spring 72" is disposed within upstream bore 160 of valve housing 46" and is configured to bias valve stop 70" upstream towards cylinder 98". As such, valve spring 72" and valve stop 70" bias ball 100" towards cylinder 98" and can maintain check valve 56" in a closed state. During a pump stroke, first end 62" of piston 54" generates high pressure in chamber 104" of cylinder 98". The pressure overcomes the force on ball 100" generated by valve spring 72" and valve stop 70" and lifts ball off of cylinder 98", thereby driving the fluid downstream through check valve 56" and out of valve housing 46" through downstream bore 162. During the suction stroke, piston 54" draws fluid into chamber 102" through fluid inlet 68" and port 106".

As discussed in more detail below, priming valve 34" is mounted to pump housing 20'''. Prime chamber 158 is defined within pump housing 20''' and is in fluid communication with priming valve 34". Priming ports 164 extend through the upstream end of valve housing 46" at a location downstream of ball 100". Priming ports 164 provide a flowpath for fluid to flow to prime chamber 158.

FIG. 15 is a cross-sectional view taken along line 15-15 in FIG. 14A. Pump housing 20''', priming valve 34", valve housing 46", and check valve 56" are shown. Ball 100" of check valve 56" is shown. Prime chamber 158, prime valve bore 168, prime inlet 170, and prime outlet 172 of pump housing 20''' are shown. Priming ports 164 of valve housing 46" are shown. Priming valve 34" includes knob 174, prime housing 176, valve member 178, seat 180, and prime spring 182. Prime housing 176 includes first member 184 and second member 186. First member 184 includes flow ports 188. Valve member 178 includes valve body 190 and prime ball 192, and valve body 190 includes flange 194.

Priming valve 34" is mounted to pump housing 20''' and is actuatable between a prime state, where a flowpath is open between prime inlet 170 and prime outlet 172, and a spray state, where the flowpath is closed between prime inlet 170 and prime outlet 172. Prime valve bore 168 extends into pump housing 20''' and each of prime inlet 170 and prime outlet 172 are connected to prime valve bore 168. Prime inlet 170 extends from prime chamber 158 to prime valve bore 168. Prime outlet 172 extends from prime valve bore 168 to a lower end of pump housing 20''', where prime outlet 172 is fluidly connected to a fluid supply, such as elbow connector 52' (best seen in FIG. 13) and reservoir 22' (best seen in FIG. 13).

Prime housing 176 is mounted within prime valve bore 168 of pump housing 20'''. First member 184 is attached to second member 186. Second member 186 is attached to pump housing 20''' by interfaced threading, through it is understood that prime housing 176 can be connected to pump housing 20''' in any desired manner.

Seat 180 is disposed in first member 184. Flow ports 188 extend through first member 184 and provide a flowpath for fluid entering first member 184 from prime inlet 170 to exit first member 184 and flow to prime outlet 172. Valve member 178 is at least partially disposed in prime housing 176. Valve body 190 is at least partially disposed in each of first member 184 and second member 186. Prime ball 192 is disposed at a first end of valve body 190 and is configured to engage seat 180 when priming valve 34 is in the spray state. Knob 174 is attached to a second end of valve body 190 by fastener 196. Flange 194 projects radially from valve body 190. Prime spring 182 is disposed within second member 186 around valve body 190, and prime spring 182 engages flange 194. Prime spring 182 is configured to bias valve body 190 towards the position shown in FIG. 15, where prime ball 192 engages seat 180.

Valve member 178 is movable between a closed position, shown in FIG. 15, and an open position. With valve member 178 in the closed position, prime ball 192 engages seat 180 to seal the flowpath between prime inlet 170 and prime outlet 172. Knob 174 is pulled and/or rotated to pull valve body 190 rearward away from seat 180 and shift valve member 178 from the closed position to the open position. For example, pump housing 20''' can include a ramped surface disposed beneath knob 174, and rotating knob 174 can cause knob 174 to lift on the ramped surface away from pump housing 20''', thereby pulling valve member 178 to the open position. The interface between knob 174 and pump housing 20''' can also include detents to maintain the position of knob 174 relative to pump housing 20''', thereby maintaining priming valve 34" in the spray state or the prime state.

In the open position, prime ball 192 is spaced from seat 180. With prime ball 192 spaced from seat 180, the paint can flow from prime chamber 158, through prime inlet 170, and into first member 184. The fluid can exit first member 184 through flow ports 188 and flow to prime outlet 172. The fluid flows through prime outlet 172 and back to a location upstream of piston 54" (FIG. 14B).

During operation, priming valve 34 is initially placed in the prime state, such that valve member 178 is in the open position, to prime pump 24''' (FIG. 14B). Priming pump 24''' eliminates air from pump 24''' to ensure a uniform, consistent spray is delivered by pump 24'''. With priming valve 34" in the prime state, the fluid pumped by pump 24''' flows through priming ports 164 in valve housing 46" and into prime chamber 158. The fluid flows from prime chamber 158 through prime inlet 170 and enters first member 184 through the orifice in seat 180. The fluid exits first member 184 through flow ports 188 and flows to prime outlet 172. The fluid flows through prime outlet 172 and back to a location upstream of pump 24'''. Once air is eliminated from pump 24''', pump 24''' is considered primed and priming valve 34" can be actuated back to the spray state prior to initiating spraying. With priming valve 34" in the spray state, valve member 178 is in the closed position, and prime ball 192 is engaged with and seals on seat 180. Prime spring 182 maintains valve member 178 in the closed position throughout spraying. With valve member 178 in the closed position, prime inlet 170 is fluidly disconnected from prime outlet 172. Instead of flowing back to a location upstream of pump 24''', the fluid is driven downstream through valve housing 46" and ejected as a spray, as previously discussed.

FIGS. 16-22 show an application for a handheld sprayer 10'''. The handheld sprayer 10''' can be the same as that shown elsewhere herein (e.g., 10, 10', 10") except where shown and/or described to be different. While handheld sprayer 10''' may have all of the modular functionality previously described, some versions of handheld sprayer 10''' may not have such modular functionality (e.g., the pumping mechanism may be permanently attached to the powered drive mechanism and controls) or other features and functionality previously described. Likewise, the particular features demonstrated in FIGS. 16-22 could be practiced with an entirely different handheld sprayer than that shown herein. Common reference numbers are used for similar components. For the sake of brevity, descriptions of components, features, functions, and benefits of the embodiment of FIGS. 16-22 that are similar to that of the previous embodiments are not repeated herein but are equally applicable.

Figure 16:
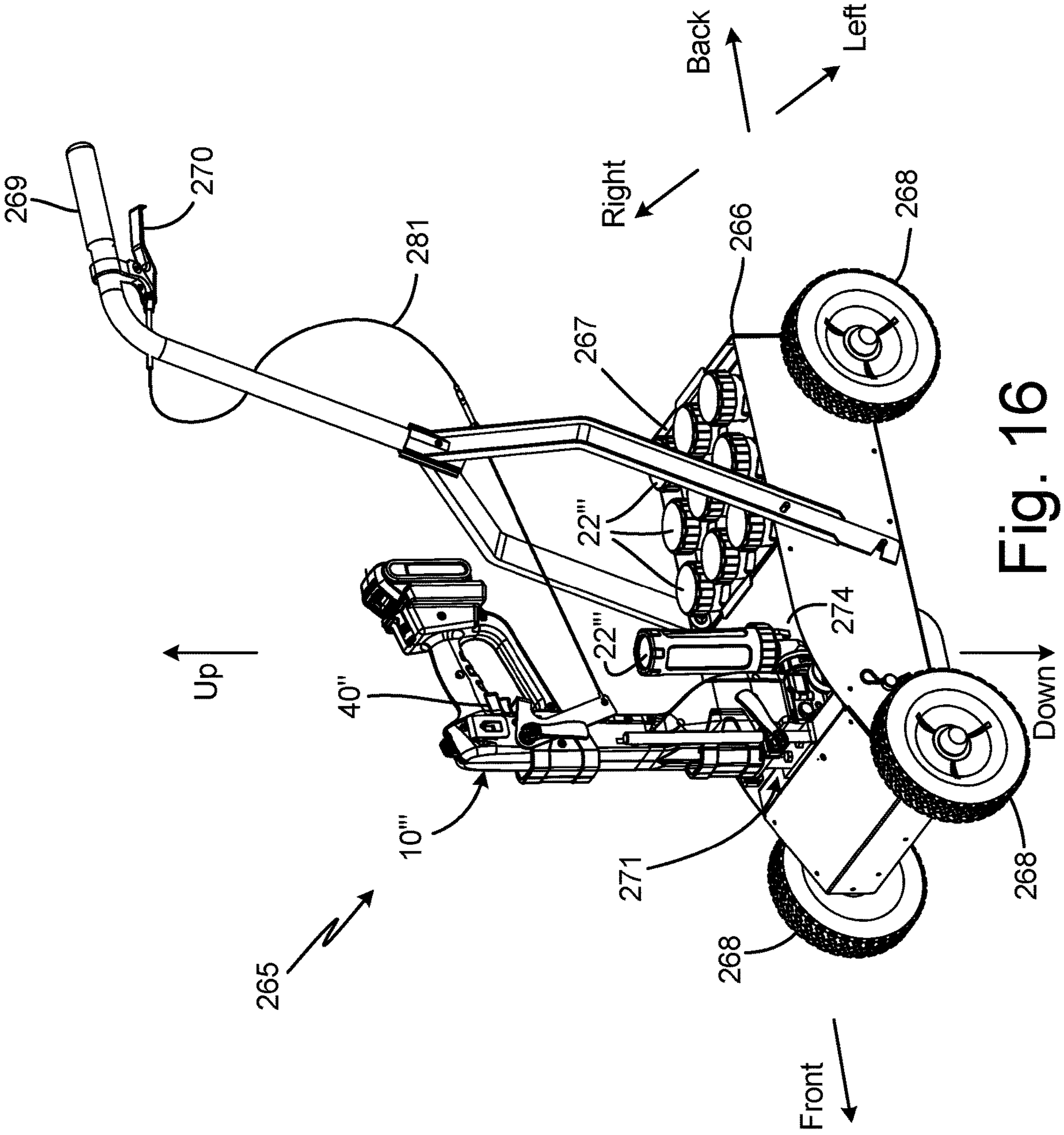
FIG. 16 is an isometric view of a wheeled ground striper system.

FIG. 16 is a perspective view of a wheeled ground striper system 265. The wheeled ground striper system 265 can be used for spraying stripes or other patterns of paint on the ground. Such grounds spraying can be used for utility marking, marking of athletic fields, marking of roads, markings of parking lots, and painting ground signage, amongst other uses.

The wheeled ground striper system 265 includes cart 266. The cart 266 can be formed from metal and/or polymer. Cart 266 includes wheels 268. Although four wheels 268 are shown in this embodiment, other embodiments can include one, two, three, five, six, or other number of wheels 268. The cart 266 includes a reservoir storage bay 267. The reservoir storage bay 267 is shown as containing multiple reservoirs 22''' which can represent a large supply of paint and/or multiple colors of paint for spraying by the handheld sprayer 10'''.

The wheeled ground striper system 265 further includes a handle 269. Handle 269 can be a single handlebar, dual handlebars, a crossbar, a steering wheel, or other structure for hand gripping. The wheeled ground striper system 265 further includes actuator control 270. Actuator control 270 includes a lever which can be pulled by a hand gripping the handle 269.

The cart 266 further includes support 273. The support 273 can be a panel or bar of the same material that forms the housing of the cart 266. A sprayer mount 271 is fixed to the support 273. In this embodiment, the sprayer mount 271 is bolted to the support 273. Attached to the sprayer mount 271 is the handheld sprayer 10". When attached to the sprayer mount 271, at least part of the handheld sprayer 10''' extends into a sprayer bay 274 of the cart 266.

Mounted to the handheld sprayer 10''' is actuator 272. The actuator 272 causes the handheld sprayer 10''' to spray and to cease spraying, depending on the state of the actuator control 270. The actuator 272 pulls the trigger 40''' of the handheld sprayer 10'''. The actuator 272 is operatively connected to actuator control 270. More specifically, cable 281 operatively connects the actuator control 270 to the actuator 272. A first end of the cable 281 is attached to the actuator control 270. A second end of the cable 281 is attached to the actuator 272. The cable 281 can include a wire that is movable within a sleeve. The sleeve is used for bracing while the wire within the sleeve is pulled back-and-forth (or elongated and shortened). The wire is moved relative to the sleeve by pulling and releasing of the actuator control 270, such motion moving the actuator 272 to depress and release the trigger 205.

Figure 17:
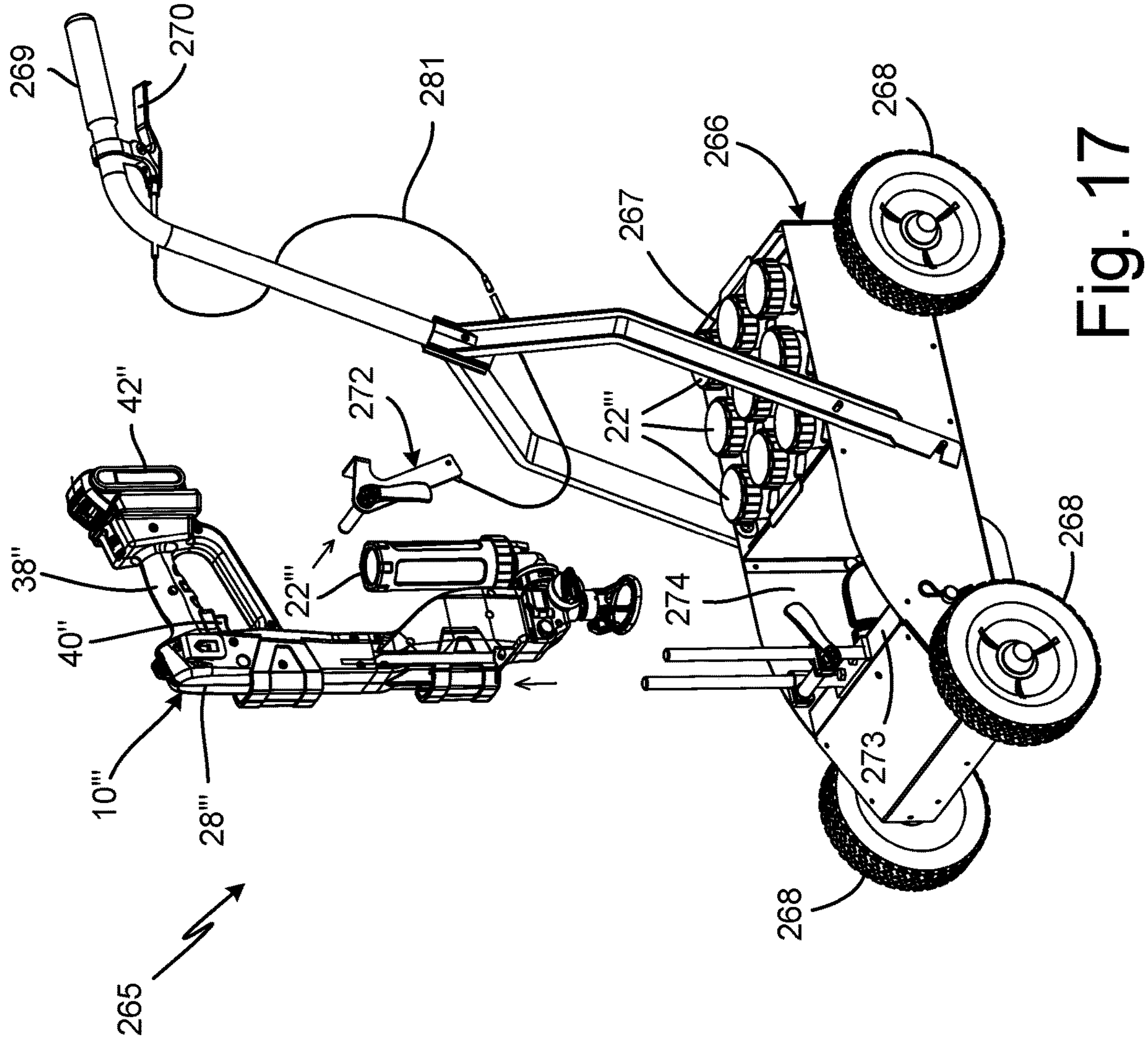
FIG. 17 is a partially exploded view of a wheeled ground striper system.

FIG. 17 is a perspective view similar to that of FIG. 16. The state shown in FIG. 17 demonstrates that the handheld sprayer 10''' is entirely removable from the cart 266. When removed, the handheld sprayer 10''' is fully capable of spraying the ground or other surfaces independent of the cart 266 or components supported by the cart 266 because the handheld sprayer 10''' includes a power source 42'', motor, mechanical drive, pump, nozzle, and reservoir 22''' (e.g., some of which can be internal to drive housing 28''', as shown in the previous embodiments). When removed from the cart 266, the handheld sprayer 10''' can be held by a handle 38'' and actuated by the trigger 40'' by a single hand of a user. When operated in this way, the handheld sprayer 10''' includes no external support or supply to spray, such as supply of paint, actuation, or power. The cart 266 can allow the handheld sprayer 10''', when mounted on the cart 266, to more easily paint straight lines on the ground as compared to the handheld sprayer 10''' being held by a hand of the user. The sprayer mount 271 allows the handheld sprayer 10''' to be mounted to paint long straight lines and then easily dismounted to paint short lines, designs, stenciling and/or other patterns, and then remounted on the cart 266 as necessary.

Figure 18B:
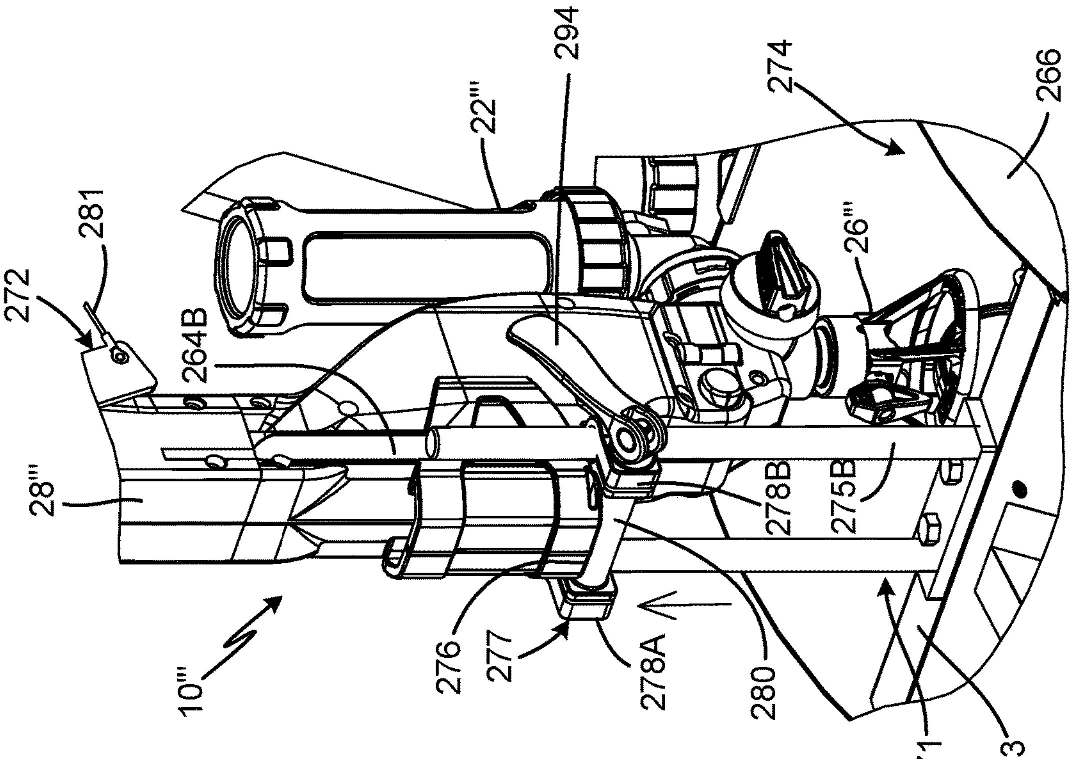
FIG. 18B is an enlarged isometric view showing a sprayer mounted at a second position on a wheeled ground striping system.
Figure 18A:
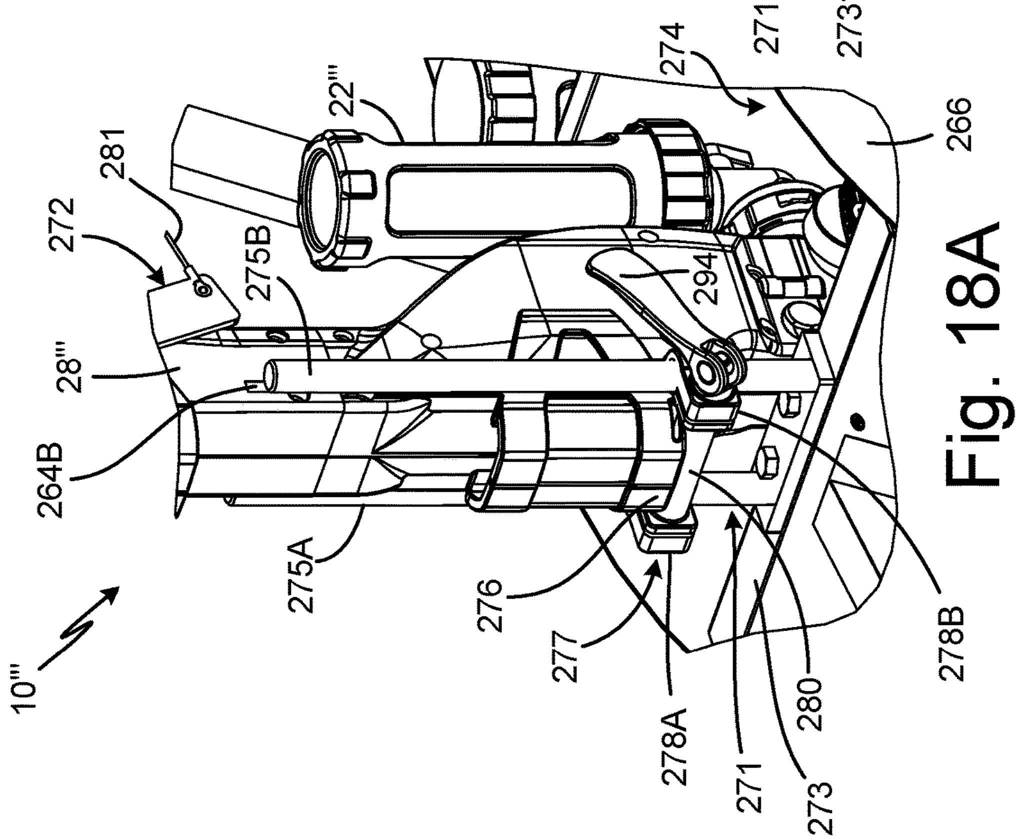
FIG. 18A is an enlarged isometric view showing a sprayer mounted at a first position on a wheeled ground striping system.

FIGS. 18A and 18B demonstrate the mounting and vertical positioning of the handheld sprayer 10''' on the cart 266. The sprayer mount 271 is located on support 273. The sprayer mount 271 includes posts 275*a*, 275*b*. Each post 275*a*, 275*b* can be a vertically orientated metal cylinder. The posts 275*a*, 275*b* are parallel with respect to each other. The posts 275*a*, 275*b* have spacing between them that allows the housing 202 of the handheld sprayer 10''' to fit between the posts 275*a*, 275*b*.

The posts 275*a*, 275*b* slide into grooves 264*a*, 264*b* formed in the drive housing 28''' of the handheld sprayer 10''' (the groove 264*a* is not shown but is located on the right side of the drive housing 28''' and is mirrored with respect to groove 264*b*). The grooves 264*a*, 264*b* extend parallel with respect to each other and are located on opposite lateral sides of the drive housing 28'''. The posts 275*a*, 275*b* fitting within the grooves 264*a*, 264*b* secures the drive housing 28''' on the sprayer mount 271 such that the handheld sprayer 10''' can only move vertically (up and down) and cannot be moved forward, backward, left, right, or be rotated as long as the posts 275*a*, 275*b* are received in the grooves 264*a*, 264*b*.

Clamps 278*a*, 278*b* are mounted on posts 275*a*, 275*b*. The clamps 278*a*, 278*b* can be independently or jointly secured to the posts 275*a*, 275*b*. In this case, handle 294 can be moved to secure and unsecure the clamps 278*a*, 278*b*. When secured, the clamps 278*a*, 278*b* are tightened about the posts 275*a*, 275*b* such that the clamps 278*a*, 278*b* cannot be moved up or down along the posts 275*a*, 275*b*. When unsecured, the clamps 278*a*, 278*b* can be moved axially along the posts 275*a*, 275*b* to a vertical position (e.g., height from the ground) as desired and then secured at the desired vertical position. In some cases, the nozzle of the handheld sprayer 10''' is pointed at the ground and held in place two to ten inches from the ground while spraying. The distance between the nozzle and the ground changes the pattern of paint landing on the ground.

The clamps 278*a*, 278*b* can be secured and unsecured by rotating handle 294 which, depending on the direction of rotation, further turns a tightening screw within bar 280 or loosens the tightening screw. Moreover, handle 294 includes cam action lockdown in which moving the handle 294 to be pivoted to axially align parallel with bar 280 loosen the clamps 278*a*, 278*b*. Pivoting the handle 294 to be perpendicular with the bar 280 tightens clamps 278*a*, 278*b* to secure the clamps 278*a*, 278*b* to the posts 275*a*, 275*b*.

A stop 276 is a surface of the handheld sprayer 10'''. In this case, stop 275 is a part of the drive housing 28'''. Stop 276 projects from the drive housing 28'''. Stop 276 engages bar 280 to prevent the stop 276 from moving lower than the bar 280 when the posts 275*a*, 275*b* are received in the grooves 264*a*, 264*b*. In other words, the handheld sprayer 10''' rests on the bar 280 by the stop 276 of the handheld sprayer 10''' engaging the bar 280. The bar 280 spans between the clamps 278*a*, 278*b*. The bar 280 also spans between the posts 275*a*, 275*b*.

As demonstrated in FIG. 18B, the height of the spray tip 26''' (which holds the nozzle out of which the paint is emitted as a spray) depends on the positioning of the bar 280 with respect to posts 275*a*, 275*b*. As previously explained, the positioning of the bar 280 depends on the location along the posts 275*a*, 275*b* that the clamps 278*a*, 278*b* are secured. Raising the bar 280 moves the spray tip 208 farther away from the ground, generally causing a wider but more dispersed spray pattern. Lowering the bar 280 moves the spray tip 26''' closer to the ground, generally causing a narrower and more concentrated spray pattern. Therefore, the sprayer mount 271 can be adjusted to raise and lower the handheld sprayer 10''' to change the paint pattern sprayed on the ground.

Figure 19:
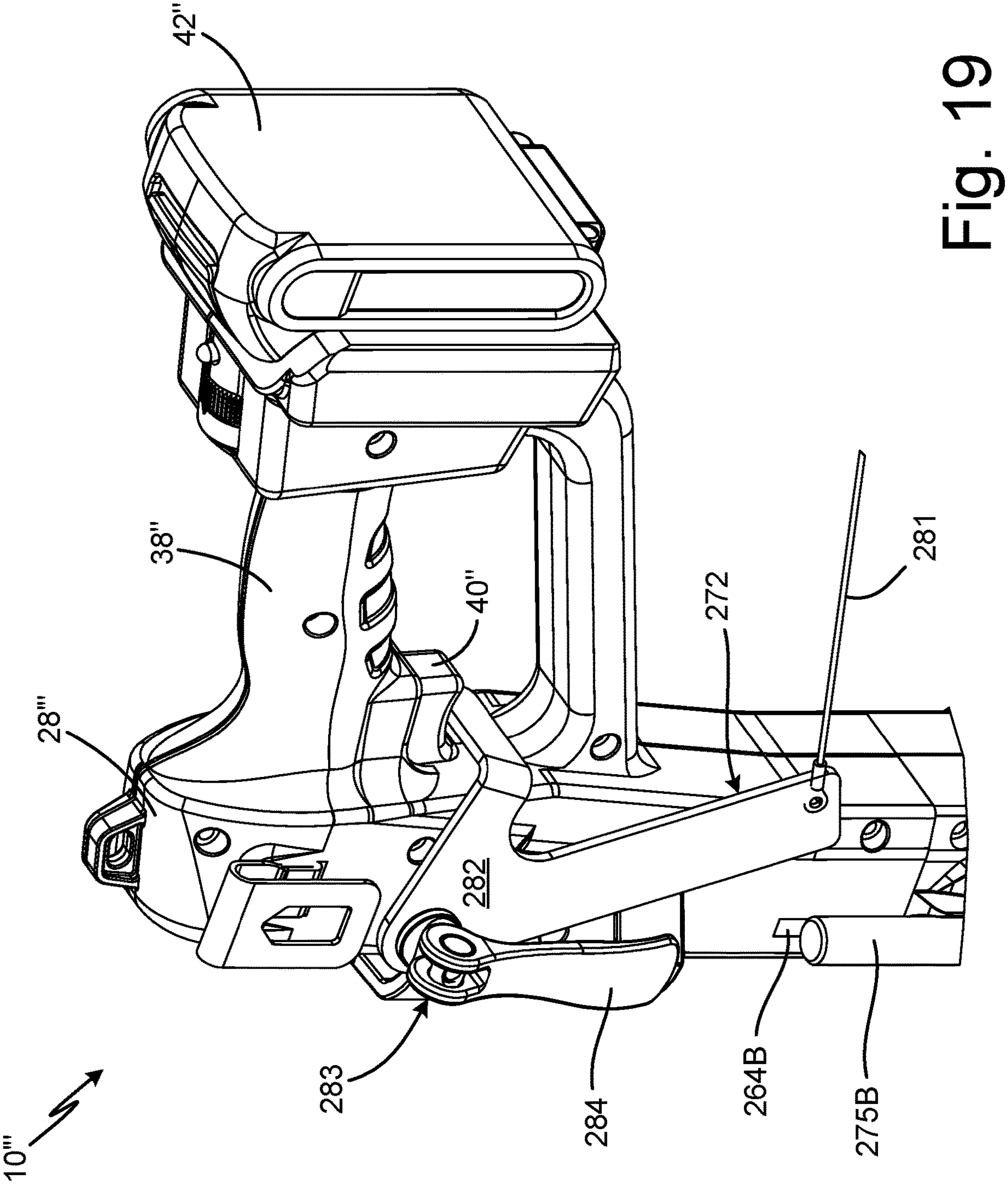
FIG. 19 is a detail isometric view of an actuator and a sprayer.

FIG. 19 is a detailed view showing the actuator 272 mounted on handheld sprayer 10'''. The actuator 272 mounts to the handheld sprayer 10'''. The actuator 272 mounts to the drive housing 28'''. The actuator 272 engages the trigger 40'' to cause the handheld sprayer 10''' to spray and to cease spraying depending on the state of the actuator control 270. The actuator 272 includes an arm 282. The arm 282 is connected to the cable 281. The arm 282 is attached to the central wire of the cable 281 and is not directly attached to the sleeve of the cable 281. The arm 282 pivots about fastener 283. The fastener 283 attaches the actuator 272 to the handheld sprayer 10''' and allows the attachment of the actuator 272 to the handheld sprayer 10'''. The fastener 283 attaches the arm 282 to the drive housing 28'''. The wire of the cable 281 pulls one end of the arm 282 to pivot the arm 282 about the fastener 283, causing a second end of the arm 282 to engage and depress trigger 40''. The trigger 40'' includes a spring (not shown) which keeps the trigger 40'' in the non-actuated position unless a force overcomes the force of the spring to cause the handheld sprayer 10''' to spray. This return force of the trigger 40'', due to the spring, pushes back on the second end of the arm 282, and when the wire of the cable 281 no longer pulls on the first end of the arm 282, the return force of the trigger 40'' rotates the arm 282 about the pivot 283 to allow the trigger 40'' to return to its non-actuated state such that the handheld sprayer 10''' no longer sprays (until re-actuated).

The actuator 272 includes a handle 284 on the fastener 283. The handle 284 is capable of a locking cam action when the handle 284 is pivoted to a first position (e.g., a down position), which tightens the fastener 283 to connect the actuator 272 to the handheld sprayer 10'''. When the handle 284 is pivoted to a second position (e.g., an up position), the fastener 283 is loosened to allow the actuator 272 to be separated from the handheld sprayer 10'''.

Figure 20:
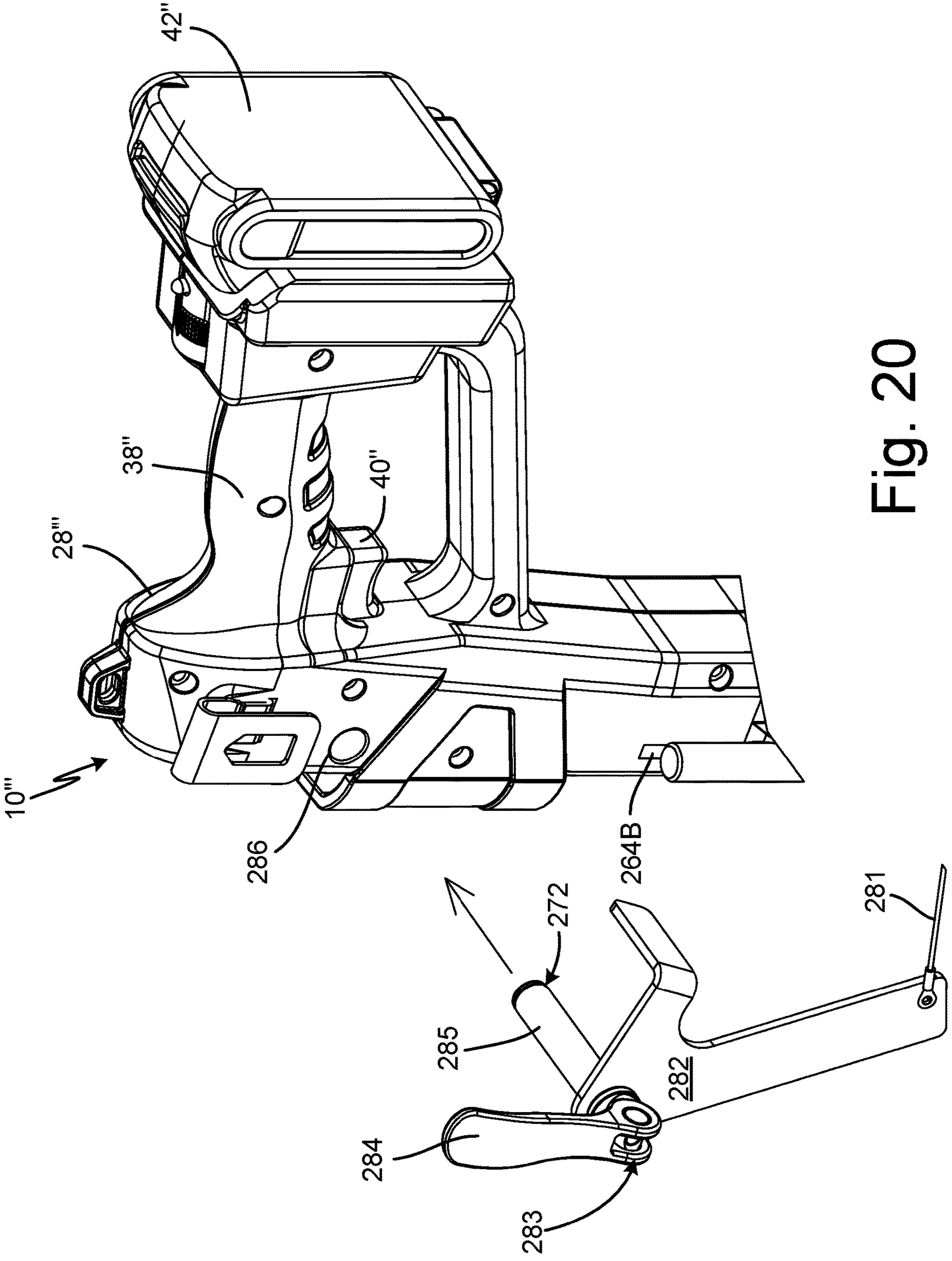
FIG. 20 is an exploded view of the actuator and the sprayer.

FIG. 20 is an exploded view that shows the actuator 272 having been separated from the handheld sprayer 10'''. As shown, the actuator 272 and its components no longer contact the handheld sprayer 10'''. FIG. 20 shows that the actuator 272 includes an insert 285. The insert 285 is inserted into cavity 286 of the handheld sprayer 10'''. Cavity 286 can be formed in the drive housing 28'''. The cavity 286 can be a cylindrical void in the drive housing 28'''. The insert 285 is received within the cavity 286 to secure the actuator 272 to the handheld sprayer 10'''. A property of the insert 285 is changed based on the position of the handle 284 to secure and unsecure the actuator 272 with respect to the handheld sprayer 10'''. It is noted that when the arm 282 pivots as previously described, the arm 282 rotates about the insert 285. Furthermore, the arm 282 rotates relative to the insert 285 due to the insert 285 being fixed to the drive housing 28''' when the actuator 272 is mounted on the handheld sprayer 10'''.

Figure 21:
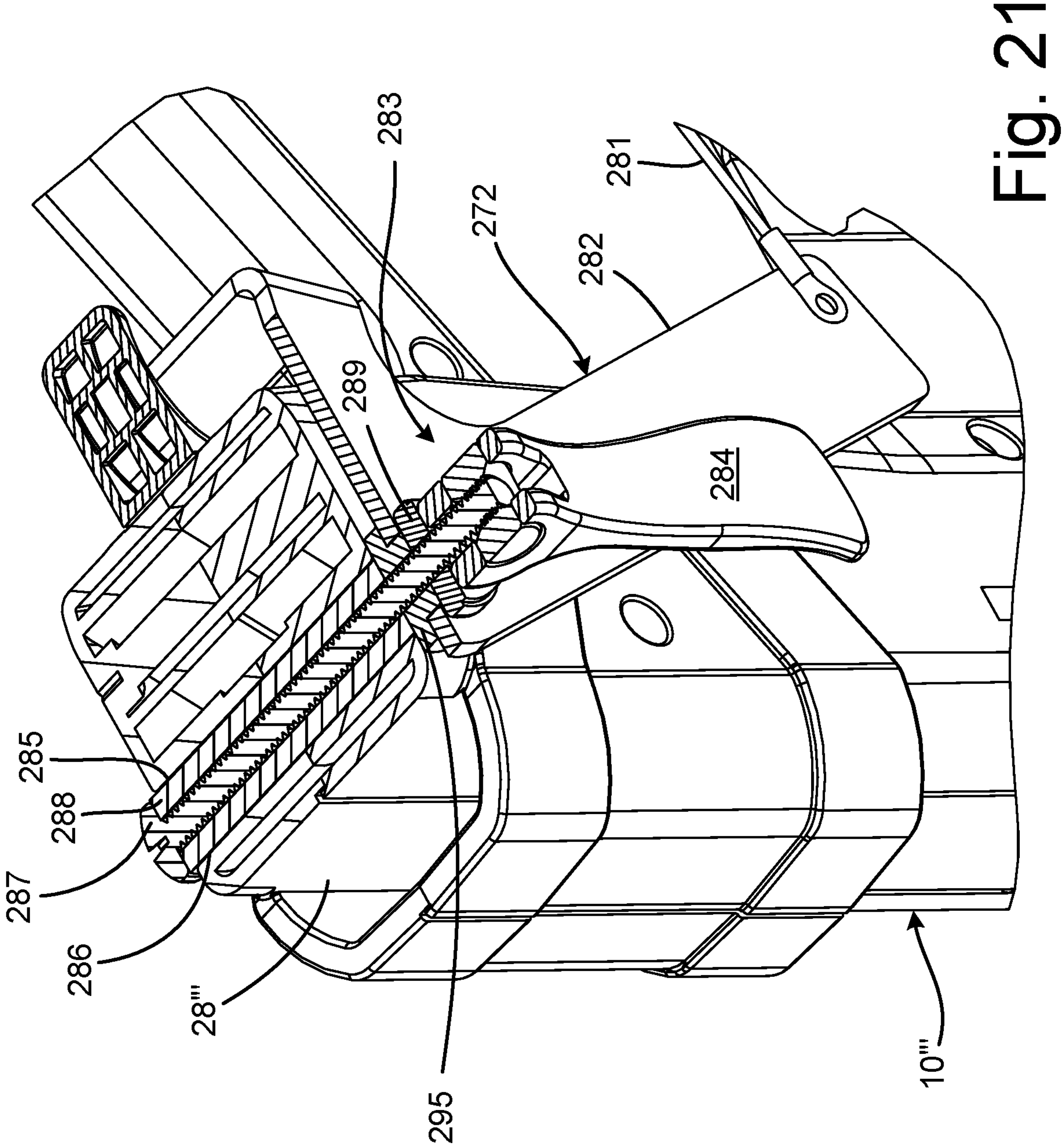
FIG. 21 is a cross-sectional view of a fastener.

FIG. 21 is a cross-sectional view of the fastener 283 extending through handheld sprayer 10'''. As shown, the insert 285 includes elongate member 287. The elongate member 287 extends through washer 289. Handle 284 engages the washer 289. Pivoting of the handle 284 operates cam action against the washer 289 to tighten or loosen the fastener 283. Elongate member 287 is threaded. Elongate member 287 extends through an aperture in disk 295. Disk 295 includes internal threading which interfaces with the external threading of elongate member 287. Rotation of the handle 284 rotates elongate member 287, which moves the elongate member relative to the disk 295 due to the threading engagement. Depending on the direction of rotation of the handle 284, the rotation either shortens or lengthens the distance between the far end of the elongate member 287 and the disk 295. Shortening of the distance compresses radially expansive sleeve 288 to cause it to expand to engage the inner surface of the cavity 286. Such engagement frictionally secures the fastener 283, and the actuator 272, to the drive housing 28'''. Lengthening of the distance relieves pressure on the radially expansive sleeve 288 to cause it to radially contract to disengage from the inner surface of the cavity 286 to allow the insert 285 to be easily withdrawn from the cavity 286 to decouple and separate the actuator 272 from the drive housing 28'''. The radially expansive sleeve 288 can be a rubber sleeve that radially expands when compressed and radially contracts when released. While one mechanism for coupling and decoupling the actuator 272 to the handheld sprayer 10''' is shown, other mechanisms for coupling can instead be used.

Figure 22:
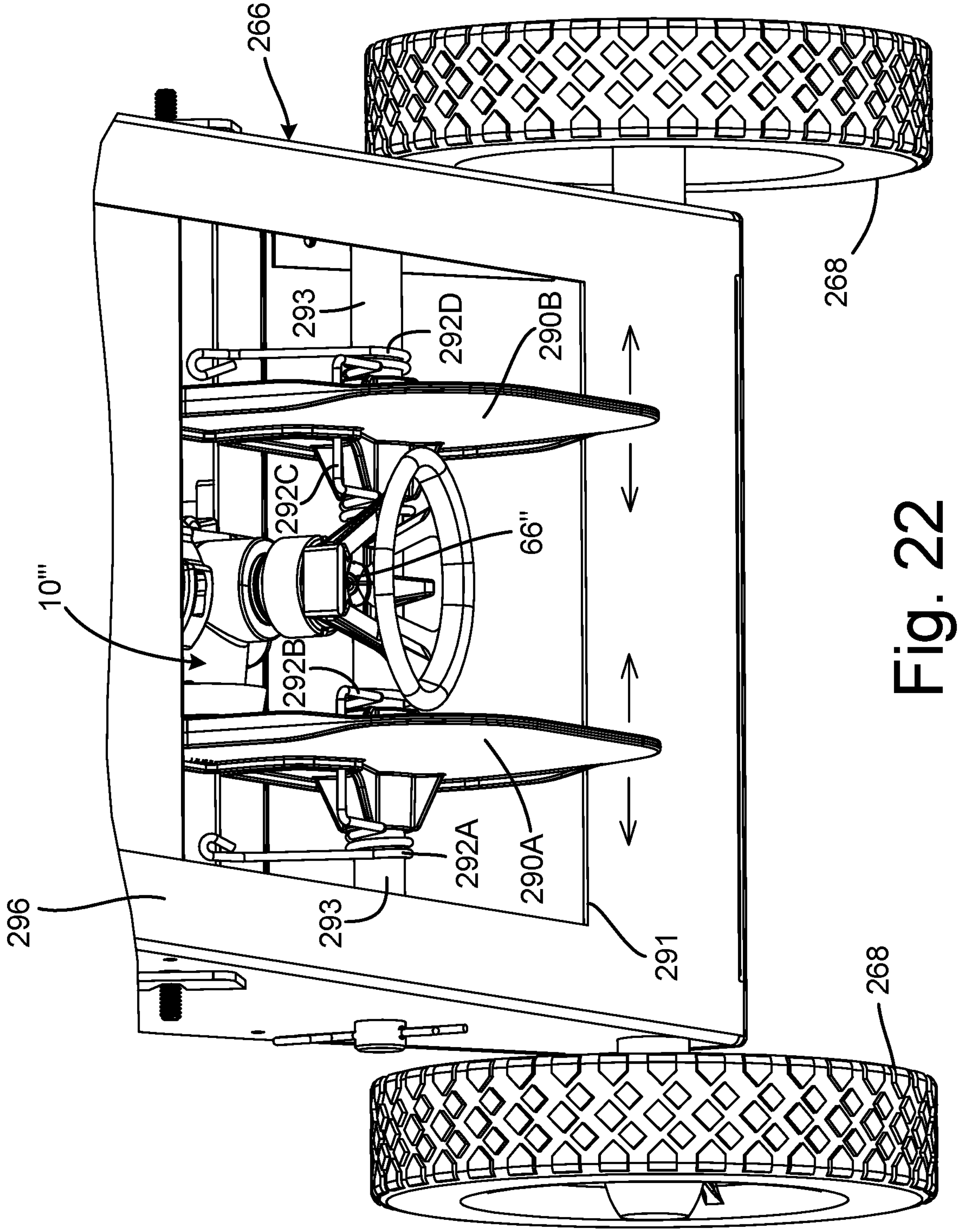
FIG. 22 is an isometric view of a bottom of a cart of a wheeled ground striper system.

FIG. 22 is an isometric view of the bottom of the cart 266. As shown, the cart 266 includes a bottom panel 296. An opening 291 in the bottom panel 296 allows the handheld sprayer 10''' to spray the ground. To control the width of the spray pattern from the nozzle 66'', shields 290*a*, 290*b* are provided. Shields 290*a*, 290*b* are located on the lateral sides of the nozzle 66''. Shields 290*a*, 290*b* can intercept and block sprayed paint from landing on the ground in a pattern wider than intended. Shields 290*a*, 290*b* can also block wind from blowing the paint being sprayed from the nozzle 66'' before it hits the ground. The shields 290*a*, 290*b* can be metal or plastic panels. The shields 290*a*, 290*b* are mounted on an axle 293. More specifically, each of the shields 290*a*, 290*b* includes a round aperture through which axle 293 extends. Each of the shields 290*a*, 290*b* is slidable along the axle 293. Clamps 292*a*-292*d* bracket the shields 290*a*, 290*b* respectively. Clamps 292*a*-292*d* hold the shields 290*a*, 290*b* in place along the axle 293 and prevent the shields 290*a*, 290*b* from moving laterally beyond their set positions. Each clamp 292*a*-292*d* includes an aperture through which the axle 293 extends. Clamps 292*a*-292*d* can be bent to expand to easily move along axle 293 and then released to clamp onto the axle 293 and fix in place along the axle 293. In some examples, clamps 292*a* and 292*b* are lateral sides of a unitary clamp assembly, such that shifting the handle loosens the full clamp assembly formed by 292*a* and 292*b*. In some examples, clamps 292*c* and 292*d* are lateral sides of a unitary clamp assembly, such that shifting the handle loosens the full clamp assembly formed by 292*c* and 292*d*.

The wheeled ground striper system described above with regard to FIGS. 16-22 can include a wheeled cart; and a handheld sprayer mountable and removable from the cart.

The wheeled ground striping system of the previous paragraph can optically include, additionally and/or alternatively any one or more of the following features, configurations and/or additional components:

The handheld sprayer includes a housing, a handle, a trigger, a power source, a motor, a pump, and a spray nozzle.

The handheld sprayer can spray entirely independent of the wheeled cart when dismounted from the wheeled cart.

The handheld sprayer is mounted vertically on the wheeled cart to spray the ground, and wherein the handheld sprayer is mounted on the cart to spray through an opening in a bottom of the cart.

The handheld sprayer is mounted vertically on the wheeled cart to spray the ground.

A handle extending from the wheeled cart and an actuator control mounted on the handle, the actuator control actuatable to control spraying of the handheld sprayer when mounted to the wheeled cart; and a cable connected to the actuator control and an actuator, the actuator connected to the cable and mounting to the handheld sprayer.

The actuator pivots to depress and release a trigger of the handheld sprayer based on estate of the actuator control.

The actuator is mounted to the handheld sprayer by been partially inserted into a hole in a housing of the handheld sprayer.

The handheld sprayer is mounted between, and in contact with, two posts of the wheeled cart.

The wheeled cart includes a handle and an actuator control mounted on the handle, the actuator control actuatable to control spraying of the handheld sprayer when mounted to the cart.

The handheld sprayer is mounted between, and in contact with, two posts of the wheeled cart, and wherein the handheld sprayer can be fixed at multiple different heights along the two posts.

The handheld sprayer can be mounted to the wheeled cart at multiple different heights relative to a surface on which the wheeled cart is supported.

A pair of spray shields located on a bottom side of the wheeled cart, wherein the spray shields are laterally adjustable relative to the wheeled cart.

The spray shields are moveable along an axle of the wheeled cart.

A plurality of clamps configured to fix the spray shields in place along the axle.

A pair of spray shields located on a bottom side of the wheeled cart.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A handheld sprayer comprising:

a fluid module comprising a fluid reservoir and a pump that includes a piston that is configured to reciprocate on an axis to pump fluid from the fluid reservoir for spraying; and a drive module comprising a motor, a handle, and a trigger, the drive module removably connected to the fluid module by a static connection and a dynamic connection, the static connection fixing the fluid module to the drive module, the drive module powering the pump of the fluid module by mechanical motion conveyed from the drive module to the fluid module through the dynamic connection;

wherein the dynamic connection is formed by a receiver interfacing with a drive connector at a dynamic interface, the receiver including a socket that moves with the receiver;

wherein the receiver and the drive connector are configured to move during reciprocation of the piston;

wherein the receiver is on one of the fluid module and the drive module and the drive connector is formed on the other one of the fluid module and the drive module;

wherein the drive connector is disposed in the socket of the receiver when the drive module is in a connected state with the fluid module, and the drive connector is removed from the socket of the receiver when the drive module is in a disconnected state with respect to the fluid module; and wherein the dynamic interface is configured to drive the piston through a pump stroke by a driving force exerted at the dynamic interface along the axis and within the socket, the driving force displacing the piston through the pump stroke.

2. The handheld sprayer of claim 1, wherein the trigger is connected to the motor, and wherein actuation of the trigger is configured to energize the motor to output rotational motion.

3. The handheld sprayer of claim 1, wherein:

the fluid module includes a pump housing supporting the pump;

the drive module includes a drive housing;

the pump housing is mounted to the drive housing by the static connection; and the drive module powers the pump by the dynamic connection.

4. The handheld sprayer of claim 1, wherein the pump is an airless positive displacement pump.

5. The handheld sprayer of claim 1, wherein the drive module further comprises:

a power source configured to provide power to the motor, the power source supported by a drive housing of the drive module.

6. The handheld sprayer of claim 5, wherein the power source is a battery.

7. The handheld sprayer of claim 1, wherein all fluid passes only though the fluid module and does not pass through the drive module.

8. The handheld sprayer of claim 1, further comprising:

a mechanical drive configured to convert a rotational output of the motor into linear reciprocating motion, wherein the mechanical drive is part of the drive module, the mechanical drive is at least partially located within a drive housing of the drive module, and the dynamic connection conveys linear reciprocating motion from the drive module to the fluid module to drive the pump.

9. The handheld sprayer of claim 8, wherein the mechanical drive is a wobble drive.

10. The handheld sprayer of claim 1, further comprising:

a mechanical drive configured to convert a rotational output of the motor into linear reciprocating motion.

11. The handheld sprayer of claim 1, wherein the receiver includes a side opening providing a passageway for the projection to enter and exit the socket of the receiver.

12. The handheld sprayer of claim 1, wherein the receiver includes a rear opening providing a passageway for the projection to enter and exit the socket of the receiver.

13. The handheld sprayer of claim 1, wherein the fluid module is mounted to the drive module by a first relative sliding motion between the fluid module and the drive module, the static connection and the dynamic connection are both connected by the first relative sliding motion, and wherein the fluid module is disconnected from the drive module by a second relative sliding motion between the fluid module and the drive module that is the reverse of the first relative sliding motion, the static connection and the dynamic connection both being broken disconnected by the second relative sliding motion.

14. The handheld sprayer of claim 13, wherein the static connection and the dynamic connection are both made simultaneously by the first relative sliding motion, and the static connection and the dynamic connection are both broken simultaneously by the second relative sliding motion.

15. The handheld sprayer of claim 1, wherein the static connection comprises a fitting formed on one of the fluid module or the drive module, the fitting slidably engaged within a slot formed on the other one of the fluid module or the drive module.

16. The handheld sprayer of claim 1, wherein the static connection and the dynamic connection are configured to be at least one of (1) made simultaneously and (2) broken simultaneously.

17. The handheld sprayer of claim 1, wherein the drive module further comprises:

a drive assembly configured to receive a rotational input from the motor and generate a reciprocating linear output configured to displace the piston through the pump stroke.

18. A fluid module for a handheld fluid sprayer configured to be powered by a drive module of the handheld fluid sprayer, the fluid module comprising:

a fluid supply;

a pump housing;

a pump supported by the pump housing, the pump configured to draw fluid from the fluid supply and pump the fluid, the pump including a piston at least partially disposed in the pump housing and configured to reciprocate along an axis relative to the pump housing;

a fluid module static connector configured to mount the pump housing to the drive module; and a fluid module dynamic connector configured to convey mechanical motion from the drive module to the fluid module to drive the pump;

wherein the fluid supply, the pump housing, the pump, the fluid module static connector, and the fluid module dynamic connector are connected together; and wherein the fluid module is configured to mount to the drive module by a static connection and a dynamic connection, wherein the fluid module can be mounted to the drive module by connecting the fluid module static connector and the fluid module dynamic connector to the drive module, and wherein the fluid module can be dismounted from the drive module by disconnecting the fluid module static connector and the fluid module dynamic connector from the drive module; and wherein the fluid module dynamic connector includes a receiver disposed at an end of the piston, the receiver including a socket configured to receive a drive connector of the drive module to drive the receiver and the piston along the axis and through a pump stroke by interfacing with the receiver within the socket, the socket including an opening through which the drive connector extends into the socket during mounting of the fluid module on the drive module, and wherein the socket is configured such that the drive connector extends away from the axis and out of the socket with the fluid module mounted on the drive module.

19. The fluid module of claim 18, wherein the opening is a side opening of the socket.

20. The fluid module of claim 18, wherein the opening is a rear opening of the socket.

21. A handheld sprayer comprising:

a fluid module comprising a fluid reservoir and a pump that includes a piston that is configured to reciprocate on an axis to pump fluid from the fluid reservoir for spraying; and a drive module comprising a motor, a handle, and a trigger, the drive module removably connected to the fluid module by a static connection and a dynamic connection, the static connection fixing the fluid module to the drive module, the drive module powering the pump of the fluid module by mechanical motion conveyed from the drive module to fluid module through the dynamic connection;

wherein the dynamic connection is formed by a receiver interfacing with a drive connector at a dynamic interface, the receiver including a socket that moves with the receiver;

wherein the receiver and the drive connector are configured to move during reciprocation of the piston;

wherein the receiver is on one of the fluid module and the drive module and the drive connector is formed on the other one of the fluid module and the drive module;

wherein the drive connector is disposed in a socket of the receiver with the drive module connected to the fluid module and the drive connector is removed from the socket of the receiver with the drive module disconnected from the fluid module; and wherein the dynamic interface is configured to drive the piston through a suction stroke by a driving force exerted at the dynamic interface along the axis and within the socket, the driving force displacing the piston through the suction stroke.

22. The handheld sprayer of claim 21, wherein the dynamic interface is configured to drive the piston through the suction stroke and a pump stroke by force exerted at the dynamic interface and within the socket.

* * * * *